US011316443B2

(12) United States Patent
Du et al.

(10) Patent No.: US 11,316,443 B2
(45) Date of Patent: Apr. 26, 2022

(54) CONTROL OF ACTIVE NEUTRAL-POINT CLAMPED THREE-LEVEL CONVERTER

(71) Applicant: Shenzhen Kstar Science and Technology Co.,Ltd., Guangdong (CN)

(72) Inventors: Chengrui Du, Shenzhen (CN); Chaoqun Liu, Shenzhen (CN); Shenjian Zou, Shenzhen (CN); Zhiqiang Zhang, Shenzhen (CN); Baisheng Chen, Shenzhen (CN)

(73) Assignee: Shenzhen Kstar Science and Technology Co., Ltd., Shenzhen (CN)

( * ) Notice: Subject to any disclaimer, the term of this patent is extended or adjusted under 35 U.S.C. 154(b) by 20 days.

(21) Appl. No.: 17/073,455

(22) Filed: Oct. 19, 2020

(65) Prior Publication Data

US 2021/0367530 A1 Nov. 25, 2021

(30) Foreign Application Priority Data

May 19, 2020 (CN) .......................... 202010423215.X

(51) Int. Cl.
*H02M 7/5387* (2007.01)
*H02M 7/487* (2007.01)
*H02M 1/32* (2007.01)

(52) U.S. Cl.
CPC .............. *H02M 7/487* (2013.01); *H02M 1/32* (2013.01); *H02M 7/53871* (2013.01); *H02M 1/325* (2021.05)

(58) Field of Classification Search
CPC .... H02M 7/487; H02M 1/32; H02M 7/53871; H02M 7/5387; H02M 1/325
See application file for complete search history.

(56) References Cited

U.S. PATENT DOCUMENTS

| 2011/0115532 A1* | 5/2011 | Roesner | H02M 7/487 |
| | | | 327/136 |
| 2014/0268967 A1* | 9/2014 | White | H02M 1/44 |
| | | | 363/133 |
| 2018/0152097 A1* | 5/2018 | Ying | H02M 7/487 |
| 2019/0294187 A1* | 9/2019 | Ying | H02M 1/096 |

* cited by examiner

*Primary Examiner* — Adolf D Berhane
(74) *Attorney, Agent, or Firm* — NZ Carr Law Office PLLC

(57) ABSTRACT

The present disclosure relates to an active neutral-point clamped (ANPC) three-level converter, and a method and controller for controlling thereof. The ANPC three-level converter includes at least one bridge leg, and a controller. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a first clamp switch, a second external switch, a second internal switch, and a second clamp switch. The method for controlling the NPC three-level converter includes a method for controlling the ANPC three-level converter to stop operating, and a method for controlling the ANPC three-level converter to start to operate.

16 Claims, 30 Drawing Sheets

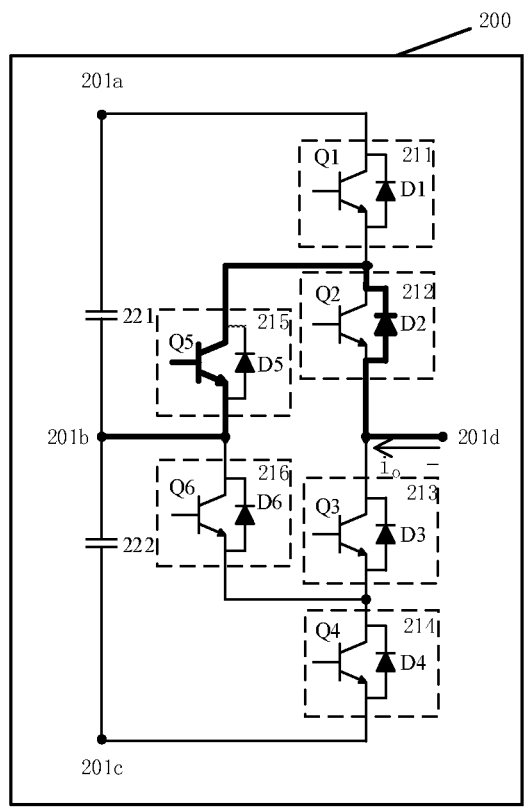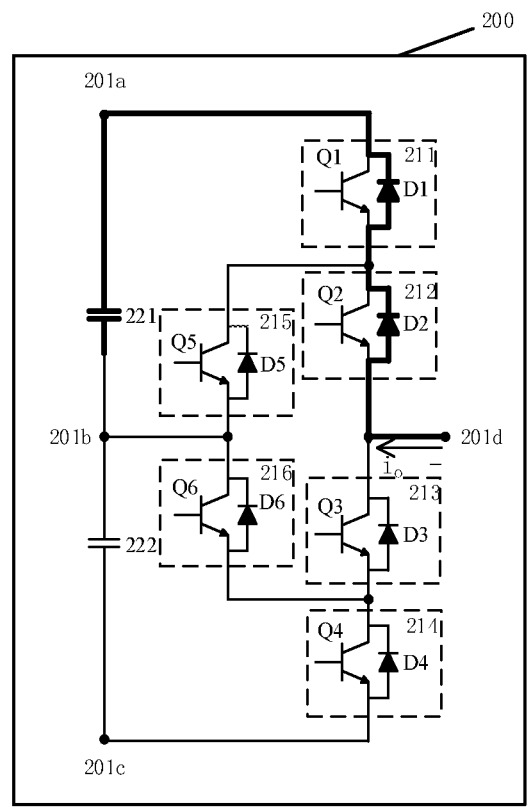
FIG. 14d                    FIG. 14e

CONTROL OF ACTIVE NEUTRAL-POINT CLAMPED THREE-LEVEL CONVERTER

RELATED APPLICATIONS

This application claims priority to Chinese Patent Application No. 202010423215.X, filed on May 19, 2020, the contents of which are hereby incorporated by reference in their entirety for all purposes.

FIELD OF THE INVENTION

The present disclosure generally relates to the field of energy conversion, and more particularly, to an active neutral-point clamped (ANPC) three-level converter, and a method and a controller for controlling the ANPC three-level converter.

BACKGROUND OF THE INVENTION

In recent years, with the development of power electronics technology, multilevel converters have been widely used in various fields of energy conversion, such as photovoltaic power generation systems, motor drive systems, and flexible power transmission systems. Compared with two-level converters, multilevel converters have many advantages such as low harmonic content of output voltage, low voltage stress of power switches, and low electromagnetic interference (EMI) noise. Among the multilevel converters, the ANPC converter is one type of the multilevel converter that is widely used.

In response to receiving an external instruction or detecting a change in its state, the multilevel converter may start to operate or stop operating. When the multilevel converter is in the working state, the switches in the multilevel converter are turned on or off according to normal control signals to output the corresponding voltage level. When the multilevel converter is in the stopped state, the switches in the multilevel converter are in the turned-off state.

Compared with the traditional two-level converter, the voltage stress of the power switches in the ANPC converter is lower. When the ANPC converter stops operating, if all switches are turned off at the same time, the voltage stress experienced by the switch may exceed the sustainable voltage stress due to the turned-off time difference, parasitic parameters, etc., resulting in the damage of switches. Similarly, when the ANPC converter starts to operate, if the normal control signals of all switches are recovered at the same time, the voltage stress experienced by the switch may exceed the sustainable voltage stress, resulting in the damage of switches.

The methods described in this section are not necessarily methods that have been previously conceived or employed. It should not be assumed that any of the methods described in this section are considered to be the prior art just because they are included in this section, unless otherwise indicated expressly. Similarly, the problem mentioned in this section should not be considered to be universally recognized in any prior art, unless otherwise indicated expressly.

SUMMARY OF THE INVENTION

Embodiments of an aspect of the present disclosure provides a method for controlling an ANPC three-level converter. The ANPC three-level converter includes at least one bridge leg. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a second internal switch, a second external switch, a first clamp switch, and a second clamp switch. The first external switch, the first internal switch, the second internal switch, and the second external switch are sequentially connected in series. An end of the first external switch is connected to the first input terminal, and another end of the first external switch is connected to the first internal switch. An end of the first clamp switch is connected to the second input terminal, and another end of the first clamp switch is connected to a connection point of the first external switch and the first internal switch. An end of the second external switch is connected to the third input terminal, and another end of the second external switch is connected to the second internal switch. An end of the second clamp switch is connected to the second input terminal, and another end of the second clamp switch is connected to a connection point of the second external switch and the second internal switch. The output terminal is connected to a connection point of the first internal switch and the second internal switch. The method includes: in response to an instruction of stopping operation, controlling the first external switch and the second external switch in each bridge leg to turn off; after a first delay time, controlling the first clamp switch and the second clamp switch in each bridge leg to turn on, and simultaneously or after a second delay time, controlling the first internal switch and the second internal switch in each bridge leg to turn off; and after a third delay time, controlling the first clamp switch and the second clamp switch in each bridge leg to turn off.

Embodiments of another aspect of the present disclosure provides a method for controlling an ANPC three-level converter. The ANPC three-level converter includes at least one bridge leg. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a second internal switch, a second external switch, a first clamp switch, and a second clamp switch. The first external switch, the first internal switch, the second internal switch, and the second external switch are sequentially connected in series. An end of the first external switch is connected to the first input terminal, and another end of the first external switch is connected to the first internal switch. An end of the first clamp switch is connected to the second input terminal, and another end of the first clamp switch is connected to a connection point of the first external switch and the first internal switch. An end of the second external switch is connected to the third input terminal, and another end of the second external switch is connected to the second internal switch. An end of the second clamp switch is connected to the second input terminal, and another end of the second clamp switch is connected to a connection point of the second external switch and the second internal switch. The output terminal is connected to a connection point of the first internal switch and the second internal switch. The method includes: in response to an instruction of starting operation, controlling the first clamp switch and the second clamp switch in each bridge leg to turn on, and simultaneously or after a first delay time, recovering normal control signals of the first internal switch and the second internal switch in each bridge leg;

after a second delay time, recovering normal control signals of the first clamp switch and the second clamp switch in each bridge leg; and after a third delay time, recovering the normal control signals of the first external switch and the second external switch in each bridge leg.

Embodiments of another aspect of the present disclosure provides a controller for controlling an ANPC three-level converter. The ANPC three-level converter includes at least one bridge leg. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a second internal switch, a second external switch, a first clamp switch, and a second clamp switch. The first external switch, the first internal switch, the second internal switch, and the second external switch are sequentially connected in series. An end of the first external switch is connected to the first input terminal, and another end of the first external switch is connected to the first internal switch. An end of the first clamp switch is connected to the second input terminal, and another end of the first clamp switch is connected to a connection point of the first external switch and the first internal switch. An end of the second external switch is connected to the third input terminal, and another end of the second external switch is connected to the second internal switch. An end of the second clamp switch is connected to the second input terminal, and another end of the second clamp switch is connected to a connection point of the second external switch and the second internal switch. The output terminal is connected to a connection point of the first internal switch and the second internal switch. The controller is configured to: in response to an instruction of stopping operation, control the first external switch and the second external switch in each bridge leg to turn off; after a first delay time, control the first clamp switch and the second clamp switch in each bridge leg to turn on, and simultaneously or after a second delay time, control the first internal switch and the second internal switch in each bridge leg to turn off; and after a third delay time, control the first clamp switch and the second clamp switch in each bridge leg to turn off.

Embodiments of another aspect of the present disclosure provides a controller for controlling an ANPC three-level converter. The ANPC three-level converter includes at least one bridge leg. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a second internal switch, a second external switch, a first clamp switch, and a second clamp switch. The first external switch, the first internal switch, the second internal switch, and the second external switch are sequentially connected in series. An end of the first external switch is connected to the first input terminal, and another end of the first external switch is connected to the first internal switch. An end of the first clamp switch is connected to the second input terminal, and another end of the first clamp switch is connected to a connection point of the first external switch and the first internal switch. An end of the second external switch is connected to the third input terminal, and another end of the second external switch is connected to the second internal switch. An end of the second clamp switch is connected to the second input terminal, and another end of the second clamp switch is connected to a connection point of the second external switch and the second internal switch. The output terminal is connected to a connection point of the first internal switch and the second internal switch. The controller is configured to: in response to an instruction of starting operation, control the first clamp switch and the second clamp switch in each bridge leg to turn on, and simultaneously or after a first delay time, recover normal control signals of the first internal switch and the second internal switch in each bridge leg; after a second delay time, recover normal control signals of the first clamp switch and the second clamp switch in each bridge leg; and after a third delay time, recover the normal control signals of the first external switch and the second external switch in each bridge leg.

Embodiments of another aspect of the present disclosure provides an ANPC three-level converter. The ANPC three-level converter includes at least one bridge leg and a controller. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a second internal switch, a second external switch, a first clamp switch, and a second clamp switch. The first external switch, the first internal switch, the second internal switch, and the second external switch are sequentially connected in series. An end of the first external switch is connected to the first input terminal, and another end of the first external switch is connected to the first internal switch. An end of the first clamp switch is connected to the second input terminal, and another end of the first clamp switch is connected to a connection point of the first external switch and the first internal switch. An end of the second external switch is connected to the third input terminal, and another end of the second external switch is connected to the second internal switch. An end of the second clamp switch is connected to the second input terminal, and another end of the second clamp switch is connected to a connection point of the second external switch and the second internal switch. The output terminal is connected to a connection point of the first internal switch and the second internal switch. The controller is configured to: in response to an instruction of stopping operation, control the first external switch and the second external switch in each bridge leg to turn off; after a first delay time, control the first clamp switch and the second clamp switch in each bridge leg to turn on, and simultaneously or after a second delay time, control the first internal switch and the second internal switch in each bridge leg to turn off; and after a third delay time, control the first clamp switch and the second clamp switch in each bridge leg to turn off.

Embodiments of another aspect of the present disclosure provides an ANPC three-level converter. The ANPC three-level converter includes at least one bridge leg and a controller. Each of the at least one bridge leg includes multiple input terminals, an output terminal, and multiple switches connected between the multiple input terminals and the output terminal. The multiple input terminals include a first input terminal, a second input terminal, and a third input terminal. The multiple switches include a first external switch, a first internal switch, a second internal switch, a second external switch, a first clamp switch, and a second clamp switch. The first external switch, the first internal switch, the second internal switch, and the second external switch are sequentially connected in series. An end of the first external switch is connected to the first input terminal, and another end of the first external switch is connected to the first internal switch. An end of the first clamp switch is connected to the second input terminal, and another end of the first clamp switch is connected to a connection point of the first external switch and the first internal switch. An end of the second external switch is connected to the third input terminal, and another end of the second external switch is connected to the second internal switch. An end of the second clamp switch is connected to the second input terminal, and another end of the second clamp switch is connected to a connection point of the second external switch and the second internal switch. The output terminal is connected to a connection point of the first internal switch and the second internal switch. The controller is configured to: in response to an instruction of starting operation, control the first clamp switch and the second clamp switch in each bridge leg to turn on, and simultaneously or after a first delay time, recover normal control signals of the first internal switch and the second internal switch in each bridge leg; after a second delay time, recover normal control signals of the first clamp switch and the second clamp switch in each bridge leg; and after a third delay time, recover the normal control signals of the first external switch and the second external switch in each bridge leg.

BRIEF DESCRIPTION OF THE FIGURES

Embodiments are shown exemplarily in the accompanying drawings and form part of the specification together with a written description of the specification to explain the exemplary implementations of the embodiments. The embodiments shown are merely for illustrative purposes and do not limit the scope of the claims. Throughout the drawings, like reference signs denote like but not necessarily identical elements.

FIGS. 14a-14e are schematic diagrams illustrating a process in which a bridge leg stops operating when the bridge leg is in a fifth state and the output current is a negative current in accordance with some embodiments, such as an exemplary embodiment;

DETAILED DESCRIPTION

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the element, and in some cases, based on contextual descriptions, they may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed Aspects.

Figure 1:
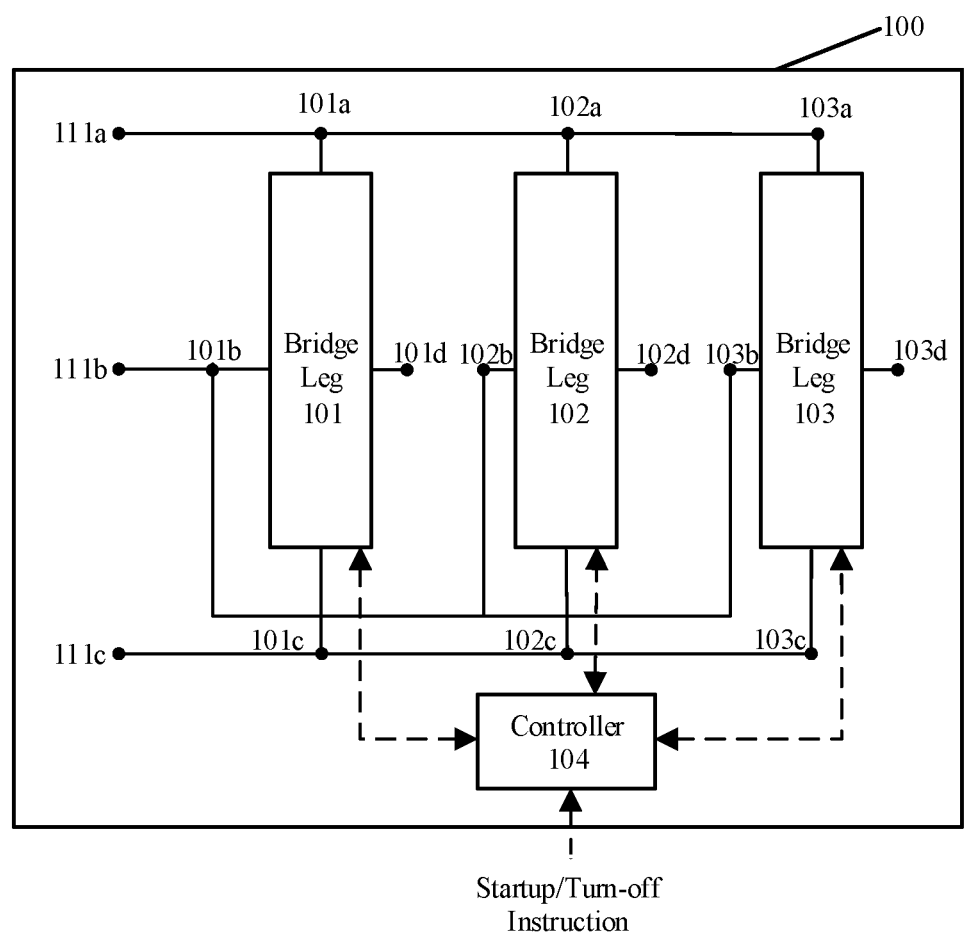
FIG. 1 is a schematic diagram illustrating an ANPC three-level converter in accordance with some embodiments, such as an exemplary embodiment.

FIG. 1 is a schematic diagram illustrating an ANPC three-level converter in accordance with some embodiments, such as an exemplary embodiment. As illustrated in FIG. 1, the ANPC three-level converter 100 includes bridge legs 101, 102 and 103, and a controller 104. According to some embodiments, the ANPC three-level converter 100 further includes main input terminals 111a, 111b, 111c.

According to some embodiments, each of the bridge legs 101-103 includes multiple input terminals, one output terminal, and multiple switches connected between the multiple input terminals and the output terminal. The bridge leg 101 includes input terminals 101a, 101b, 101c, and output terminal 101d. The bridge leg 102 includes input terminals 102a, 102b, 102c, and output terminal 102d. The bridge leg 103 includes input terminals 103a, 103b, 103c, and output terminal 103d. The input terminals 101a, 102a, 103a are connected to the same main input terminal 111a via the input bus. The input terminals 101b, 102b, 103b are connected to the same main input terminal 111b via the input bus. The input terminals 101c, 102c, 103c are connected to the same main input terminal 111c via the input bus.

According to some embodiments, each of the bridge legs 101-103 converts the received input voltage to an output voltage. According to some embodiments, each of the bridge legs 101-103 receives the input voltage from its respective input terminals, converts the received input voltage to the output voltage by controlling the on or off of the multiple switches in the bridge leg, and outputs the output voltage at its respective output terminal. According to some embodiments, the input voltage of the bridge leg is a direct current (DC) voltage, and the output voltage of the bridge leg is an alternative current (AC) voltage.

According to some embodiments, the voltage on the main input terminal 111a remains at a positive level $U_{dc}$, the voltage on the main input terminal 111b remains at a zero level 0, and the voltage on the main input terminal 111c remains at a negative level $-U_{dc}$. Correspondingly, the voltage on the input terminals 101a-103a remains at the positive level $U_{dc}$, the voltage on the input terminals 101b-103b remains at the zero level 0, and the voltage on the input terminals 101c-103c remains at the negative level $-U_{dc}$, the overall input voltage of the bridge legs 101-103 is 2 $U_{dc}$. The output voltage of the output terminals 101d-103d of the bridge legs 101-103 may be the positive level $U_{dc}$, the zero level 0, or the negative level $-U_{dc}$ according to different states of the switches of the bridge leg.

According to some embodiments, the controller 104 sends control signals to the bridge legs 101-103 respectively to control the on or off of the multiple switches in the bridge legs 101-103. When the converter 100 is in the working state, the controller 104 receives various sampling signals (such as sampling signals of input bus voltage, output voltage, output current, and temperature, etc.) of the converter 100, and generates control signals for the bridge legs 101-103 based on the sampling signals. The controller 104 may determine whether a fault occurs in the converter 100 according to the received sampling signal. When it is determined that a fault occurs, a fault shutdown instruction will be generated. When the controller 104 generates the fault shutdown instruction or receives a turn-off instruction from the outside, it may send the control signals to respective switches in the bridge legs 101-103 according to a predetermined sequence, so as to sequentially control the switches in the bridge legs 101-103 to turn off, such that the converter 100 enters a stopped state. When the controller 104 generates a fault elimination instruction in response to detecting that the fault of the converter 100 is cleared, or receives a startup instruction from the outside, it may recover the normal control signals of respective switches in the bridge legs 101-103 according to a predetermined sequence, such that the converter 100 is recovered to the normal working state.

According to some embodiments, the controller 104 may be implemented by programming a programmable hardware circuit (e.g., a programmable logic circuit including a field programmable gate array (FPGA) and/or a programmable logic array (PLA)) in an assembly language or a hardware programming language (e.g., VERILOG, VHDL, and C++). According to some other embodiments, the controller 104 may be implemented by a non-programmable hardware circuit (e.g., a circuit including an application specific integrated circuit (ASIC) and/or discrete components). According to some other embodiments, the controller 104 may be implemented by a combination of programmable hardware circuits and non-programmable hardware circuits.

Although the example of FIG. 1 merely illustrates three bridge legs and a controller, it should be understood that FIG. 1 is merely illustrative, and the number of the bridge legs or controllers included in the ANPC three-level converter 100 is not limited thereto.

Figure 2:
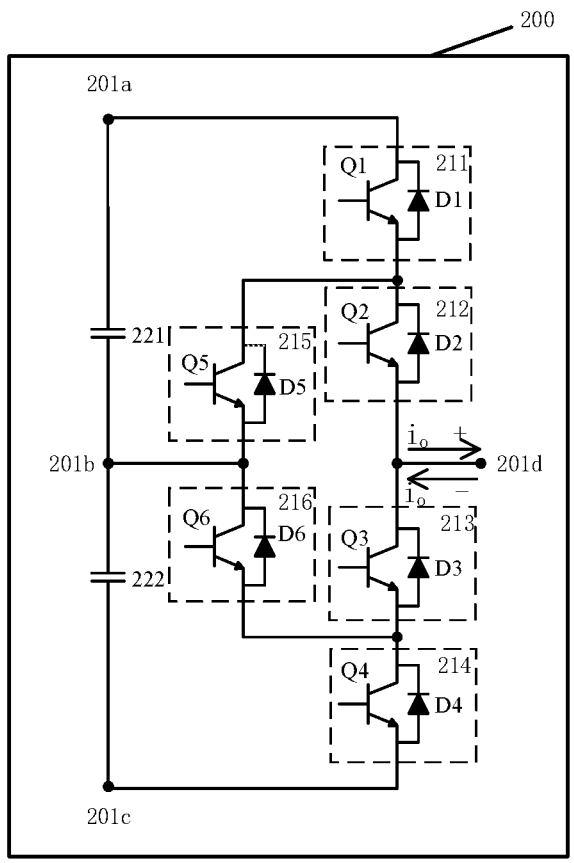
FIG. 2 is a schematic diagram illustrating a bridge leg of an ANPC three-level converter in accordance with some embodiments, such as an exemplary embodiment.

FIG. 2 is a schematic diagram illustrating a bridge leg of an ANPC three-level converter according to some exemplary embodiments of the present disclosure. The bridge leg 200 includes multiple input terminals 201a-201c, an output terminal 201d, and multiple switches 211-216 connected between the multiple input terminals and the output terminal. The multiple input terminals include a first input terminal 201a, a second input terminal 201b, and a third input terminal 201c. The multiple switches include a first external switch 211, a first internal switch 212, a second internal switch 213, a second external switch 214, a first clamp switch 215, and a second clamp switch 216.

According to some embodiments, the multiple switches 211-216 may be the same type of switching device, wherein each switch includes an active switching device and a diode anti-parallel to the active switching device. According to some embodiments, as illustrated in FIG. 2, each of the multiple switches 211-216 includes an insulated gate bipolar transistor (IGBT) and a diode anti-parallel to the IGBT, wherein the positive terminal of the diode is connected to the emitter of the IGBT, and the negative terminal of the diode is connected to the collector of the IGBT. For ease of description, the collector of the IGBT in the switch is referred to as the "positive terminal of the switch", the gate of the IGBT in the switch is referred to as the "gate of the switch", and the emitter of the IGBT in the switch is referred to as the "negative terminal of the switch". According to some other embodiments, each of the multiple switches 211-216 includes a metal oxide semiconductor field effect transistor (MOSFET) and a diode anti-parallel to the MOSFET.

According to some other embodiments, the multiple switches 211-216 may be different types of switching devices, for example, the first external switch 211, the second external switch 214, the first clamp switch 215, and the second clamp switch 216 may be a combination of MOSFET and diode, while the first internal switch 212 and the second internal switch 213 may be a combination of IGBT and diode.

According to some embodiments, the materials configured to form the switches 211-216 may include, but are not limited to, silicon (Si), germanium (Ge), silicon carbide (SiC), gallium nitride (GaN), or a combination thereof.

As illustrated in FIG. 2, the first external switch 211, the first internal switch 212, the second internal switch 213, and the second external switch 214 are sequentially connected in series. The first external switch 211 is located between the first input terminal 201a and the first internal switch 212, wherein the positive terminal of the first external switch 211 is connected to the first input terminal 201a, and the negative terminal of the first external switch 211 is connected to the positive terminal of the first internal switch 212. The first internal switch 212 is located between the first external switch 211 and the second internal switch 213, wherein the negative terminal of the first internal switch 212 is connected to the positive terminal of the second internal switch 213, and the connection point of the first internal switch 212 and the second internal switch 213 is connected to the output terminal 201d. The second internal switch 213 is located between the first internal switch 212 and the second external switch 214, and the negative terminal of the second internal switch 213 is connected to the positive terminal of the second external switch 214. The second external switch 214 is located between the second internal switch 213 and the third input terminal 201c, and the negative terminal of the second external switch 214 is connected to the third input terminal 201c. The first clamp switch 215 is located between the second input terminal 201b and the connection point of the first external switch 211 and the first internal switch 212, wherein the positive terminal of the first clamp switch 215 is connected to the connection point of the first external switch 211 and the first internal switch 212, and the negative terminal of the first clamp switch 215 is connected to the second input terminal 201b. The second clamp switch 216 is located between the second input terminal 201b and the connection point of the second internal switch 213 and the second external switch 214, wherein the positive terminal of the second clamp switch 216 is connected to the second input terminal 201b, and the negative terminal of the second clamp switch 216 is connected to the connection point of the second internal switch 213 and the second external switch 214.

According to some embodiments, the gate of each of the multiple switches 211-216 (i.e., the gate of the IGBT in the switch) receives the control signal from the controller. In response to the control signal of the controller, each of the multiple switches 211-216 is turned on or off accordingly, in which the IGBT in the switch is turned on or off accordingly. When a switch of the multiple switches 211-216 is turned on, the current flows through the IGBT in the switch when the current flows from the positive terminal of the switch to the negative terminal of the switch, and the current flows through the diode in the switch when the current flows from the negative terminal of the switch to the positive terminal of the switch. When a switch of the multiple switches 211-216 is turned off, since the IGBT in the switch is off, the current cannot flow through the IGBT in the switch, and thus the current cannot flow from the positive terminal of the switch to the negative terminal of the switch; when current flows from the negative terminal of the switch to the positive terminal of the switch, the current flows through the diode in the switch.

According to some embodiments, in response to the control signal of the controller being the high level, each of the multiple switches 211-216 is turned on; in response to the control signal of the controller being the low level, each of the multiple switches 211-216 is turned off. According to some other embodiments, in response to the control signal of the controller being the high level, each of the multiple switches 211-216 is turned off; in response to the control signal of the controller being the low level, each of the multiple switches 211-216 is turned on.

Table 1 shows a correspondence relationship between the output voltage $u_o$ and the switch state of the bridge leg, in which a switch state "1" indicates that the switch is on, and a switch state "0" indicates that the switch is off.

TABLE 1

| Switch state of bridge leg | First external switch 211 | First internal switch 212 | Second internal switch 213 | Second external switch 214 | First clamp switch 215 | Second clamp switch 216 | Output voltage $u_0$ |
|---|---|---|---|---|---|---|---|
| First state | 1 | 1 | 0 | 0 | 0 | 0 | Positive level $U_{dc}$ |
| Second state | 0 | 1 | 0 | 0 | 1 | 0 | Zero level 0 |
| Third state | 0 | 0 | 1 | 0 | 0 | 1 | Zero level 0 |
| Fourth state | 0 | 1 | 1 | 0 | 1 | 1 | Zero level 0 |
| Fifth state | 0 | 0 | 1 | 1 | 0 | 0 | Negative level −Udc |

As shown in Table 1, when the first external switch 211 and the first internal switch 212 are turned on, and the remaining switches 213-216 are turned off, the output voltage $u_o$ of the bridge leg is a positive level $U_{dc}$. The output voltage $u_o$ of the bridge leg is at zero level 0 when the switches 211-216 are in the following states: 1) the first internal switch 212 and the first clamp switch 215 are turned on, and the remaining switches 211, 213, 214, and 216 are turned off; 2) the second internal switch 213 and the second clamp switch 216 are turned on, and the remaining switches 211, 212, 214, and 215 are turned off; 3) the first internal switch 212, the second internal switch 213, the first clamp switch 215, and the second clamp switch 216 are turned on, and the remaining switches 211, 214 are turned off. When the second internal switch 213 and the second external switch 214 are turned on, and the remaining switches 211, 212, 215, and 216 are turned off, the output voltage $u_o$ of the bridge leg is at a negative level $-U_{dc}$.

According to some embodiments in the present disclosure, when the converter is in the normal working state, the controller calculates the switch state of the bridge leg 200, and sends control signals to respective switches in the bridge leg 200 according to the switch state of the bridge leg 200. For example, when it is calculated by the controller that the switch state of the bridge leg 200 is the first state, the controller sends the signal of turning on to the first external switch 211 and the second external switch 212, and sends the signal of turning off to the remaining switches 213-216.

For ease of description, hereinafter, when the output current $i_o$ flows out from the output terminal 201d, the output current $i_o$ is a positive current; when the output current $i_o$ flows into the output terminal 201d, the output current $i_o$ is a negative current.

According to some embodiments, the bridge leg 200 further includes capacitors 221, 222. As illustrated in FIG. 2, the capacitor 221 is between the first input terminal 201a and the second input terminal 201b, and the capacitor 222 is between the second input terminal 201b and the third input terminal 201c.

As described above, when it is detected that a fault occurs in the converter, the controller controls the converter to stop operating. When it is detected the fault is cleared, the controller controls the converter to start to operate. In some examples, an output current overcurrent fault is a type of fault that occurs frequently.

According to some embodiments, when the converter is in the normal working state, if it is detected that an absolute value of the output current $i_o$ is greater than or equal to a first current threshold $I_{th1}$ and this condition maintains for a first detection time $T_1$, the controller detects that an output current overcurrent fault occurs. When the converter is in the output current overcurrent fault state, if it is detected that the absolute value of the output current $i_o$ is less than a second current threshold $I_{th2}$ and a second detection time $T_2$ is maintained, the controller detects that the output current overcurrent fault is cleared. According to some embodiments, the first current threshold $I_{th1}$ and the second current threshold $I_{th2}$ are positive values, and the first current threshold $I_{th1}$ is greater than the second current threshold $I_{th2}$. According to some embodiments, the first detection time $T_1$ and the second detection time $T_2$ depend on factors such as the short-circuit capability of the switch (i.e., the capability of lasting for a certain period of time under a condition that the current in the switch exceeds the rated current) and the interference level of the detection circuit. The value of the first detection time $T_1$ and the second detection time $T_2$ may be in the range of, for example, 100 ns-100 us, but is not limited thereto. The first detection time $T_1$ may be the same as or different from the second detection time $T_2$.

Figure 3:
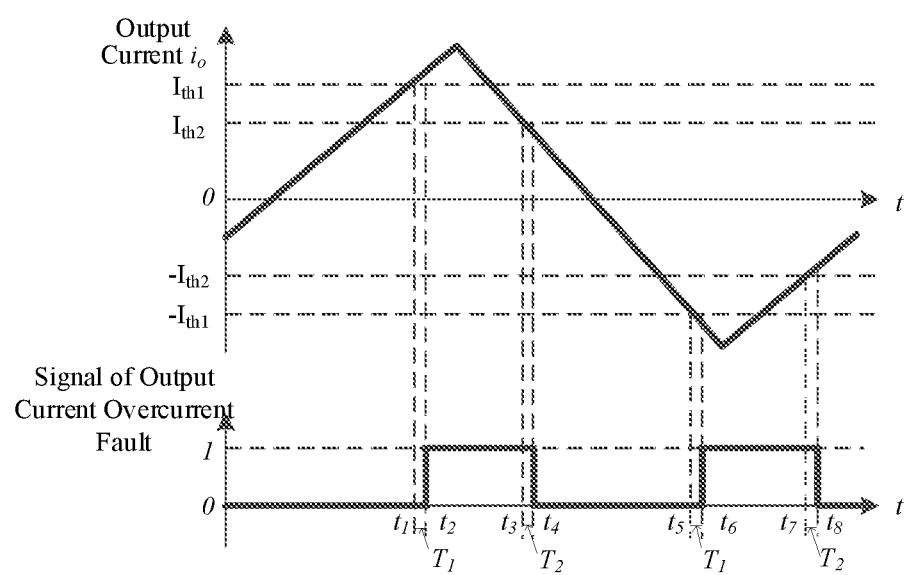
FIG. 3 is a schematic diagram illustrating the overcurrent fault detection of an ANPC three-level converter in accordance with some embodiments, such as an exemplary embodiment.

FIG. 3 is a schematic diagram illustrating the overcurrent fault detection of an ANPC three-level converter in accordance with some embodiments, such as an exemplary embodiment.

Between time $t_1$ and time $t_2$, the output current $i_o$ is a positive current. At time $t_1$, the output current $i_o$ reaches the first current threshold $I_{th1}$. Between time $t_1$ and time $t_2$, the output current $i_o$ is greater than the first current threshold $I_{th1}$. At time $t_2$, since the output current $i_o$ has been greater than or equal to the first current threshold $I_{th1}$ within the first detection time $T_1$, the signal of output current overcurrent fault is switched from "0" to "1", and the controller detects that an output current overcurrent fault occurs.

Between time $t_2$ and time $t_3$, the output current $i_o$ is a positive current, and is greater than the second current threshold $I_{th2}$, and the signal of output current overcurrent fault is "1".

Between time $t_3$ and time $t_4$, the output current $i_o$ is a positive current. At time $t_3$, the output current $i_o$ decreases to the second current threshold $I_{th2}$. Between time $t_3$ and time $t_4$, the output current $i_o$ is less than the second current threshold $I_{th2}$. At time $t_4$, since the output current $i_o$ has been less than the second current threshold $I_{th2}$ within the second detection time $T_2$, the signal of output current overcurrent fault is switched from "1" to "0", and the controller detects that the output current overcurrent fault is cleared.

Similarly, between times $t_5$ and time $t_8$, the output current $i_o$ is a negative current. At time $t_6$, since the absolute value of the output current $i_o$ has been greater than or equal to the first current threshold $I_{th1}$ within the first detection time $T_1$, the signal of output current overcurrent fault is switched from "0" to "1", and the controller detects that an output current overcurrent fault occurs. At time $t_8$, since the absolute value of the output current $i_o$ has been less than the second current threshold $I_{th2}$ within the second detection time $T_2$, the signal of output current overcurrent fault is switched from "1" to "0", and the controller detects that the output current overcurrent fault is cleared.

Figure 4:
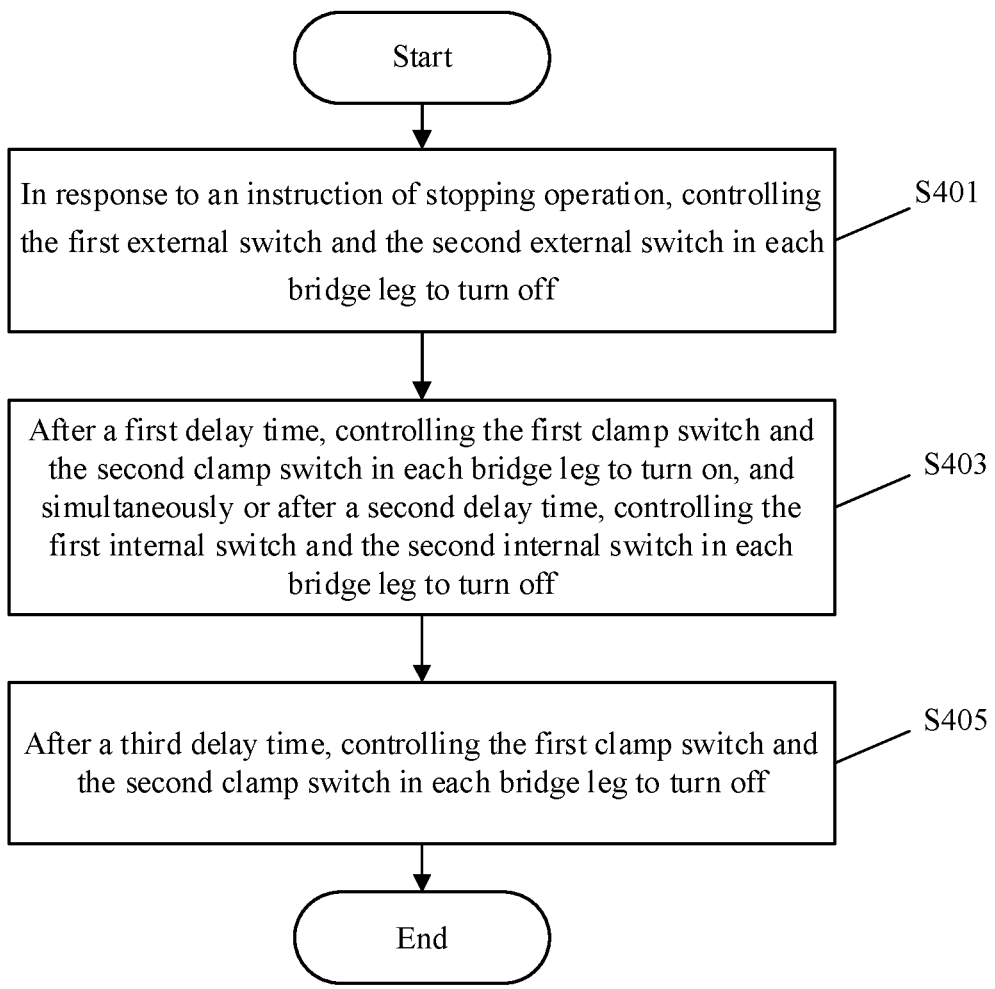
FIG. 4 is a flowchart illustrating an exemplary method for controlling an ANPC three-level converter to stop operating in accordance with some embodiments, such as an exemplary embodiment.

FIG. 4 is a flowchart illustrating an exemplary method for controlling an ANPC three-level converter to stop operating in accordance with some embodiments, such as an exemplary embodiment. The ANPC three-level converter includes at least one bridge leg as described with reference to FIG. 2.

At block S401, in response to an instruction of stopping operation, the first external switch and the second external switch in each bridge leg are controlled to turn off.

According to some embodiments, the instruction of stopping operation includes a turn-off instruction or a fault shutdown instruction corresponding to the detection of fault. In some examples, the turn-off instruction may be an instruction from outside the converter. For example, the turn-off instruction may be an instruction input by a user through a user interaction interface, or an instruction sent to the converter by a host computer through a communication interface. In some examples, the fault corresponding to the fault shutdown instruction may be an output current overcurrent fault. In some other examples, the fault corresponding to the fault shutdown instruction includes at least one of the followings: an output voltage overvoltage fault, an over-temperature fault, a bus voltage bias fault, a bus voltage overvoltage fault, and a leakage current failure.

At block S403, after a first delay time, the first clamp switch and the second clamp switch in each bridge leg are controlled to turn on, and simultaneously or after a second delay time, the first internal switch and the second internal switch in each bridge leg are controlled to turn off.

According to some embodiments, while the first clamp switch and the second clamp switch in each bridge leg are controlled to turn on, the first internal switch and the second internal switch in each bridge leg are controlled to turn off at the same time. According to some other embodiments, after the first clamp switch and the second clamp switch in each bridge leg are controlled to turn on, the first internal switch and the second internal switch in each bridge leg may be controlled to turn off after a second delay time.

At block S405, after a third delay time, the first clamp switch and the second clamp switch in each bridge leg are controlled to turn off.

According to some embodiments, the first delay time and the third delay time may be greater than the time for the active switching device in the switch to complete the process of turning off, and the second delay time may be greater than the time for the active switching device in the switch to complete the process of turning on. In an example, the first delay time, the second delay time and the third delay time may be between 0.1 us and 50 us, but are not limited to this range. The first delay time and the third delay time may be the same or different, and the second delay time may be the same as or different from the first delay time and the third delay time.

When the converter is in the normal working state, the state of the bridge leg in the converter may depend on the state of switches and the direction of the output current $i_o$. Thus, when the converter stops operating, the bridge leg may be in various states. When the converter includes multiple bridge legs, the state may be more complicated when the converter stops operating. The method for controlling the converter to stop operating described with reference to FIG. 4 may be applicable to bridge legs in various states without detecting the state of switches in the bridge leg and the direction of output current $i_o$. Thereby, the time for the converter to stop operating is shortened, the control logic for controlling the converter to stop operating is simplified, and the reliability of the process for the converter to stop operating is improved.

FIGS. 5a-5e are schematic diagrams illustrating a process in which a bridge leg stops operating when the bridge leg is in the first state and the output current is a positive current in accordance with some embodiments, such as an exemplary embodiment.

Figure 5A:
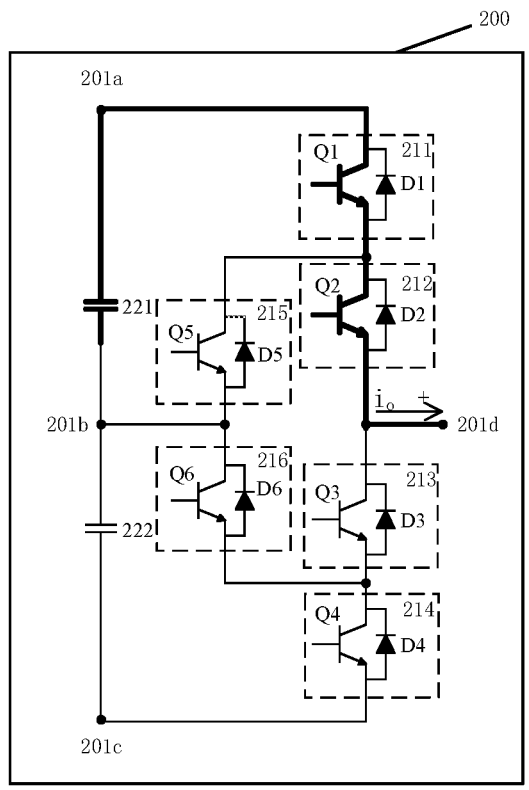
FIGS. 5a-5e are schematic diagrams illustrating a process in which a bridge leg stops operating when the bridge leg is in the first state and the output current is a positive current in accordance with some embodiments, such as an exemplary embodiment.

When the bridge leg 200 is in the first state and the output current $i_{o0}$ is a positive current, the state of the bridge leg 200 is illustrated in FIG. 5a. As described in Table 1, the first external switch 211 and the first internal switch 212 are turned on, and the remaining switches 213-216 are turned off. The output current $i_o$ flows through the first input terminal 201a, the IGBT in the first external switch 211, the IGBT in the first internal switch 212, and the output terminal 201d.

Figure 5B:
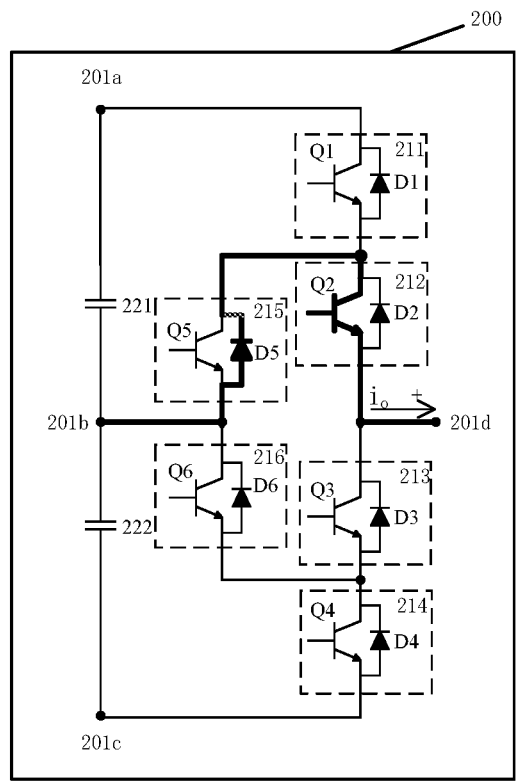

After the bridge leg 200 receives the control signal for controlling the first external switch 211 and the second external switch 214 to turn off, the state of the bridge leg 200 is illustrated in FIG. 5b. In response to receiving the signal of turning off, the first external switch 211 is switched from on to off, while the second external switch 214 remains off. In this case, the first internal switch 212 is turned on, and the remaining switches 211, 213-216 are turned off. The output current $i_o$ flows through the second input terminal 201b, the diode in the first clamp switch 215, the IGBT in the first internal switch 212, and the output terminal 201d.

As can be seen from FIG. 5a and FIG. 5b, during the process that the first external switch 211 turns off, the current is switched from the first external switch 211 to the first clamp switch 215, and the voltage stress experienced by the first external switch 211 is $U_{dc}+U_{para}$, wherein $U_{para}$ is the voltage on the parasitic inductance of the commutation loop. Since the current is switched between the first external switch 211 and the first clamp switch 215, which are on the same side as the first internal switch 212. Therefore, the commutation loop path is shorter, the parasitic inductance value in the commutation loop is reduced, and the voltage stress experienced by the first external switch 211 is further reduced.

Figure 5C:
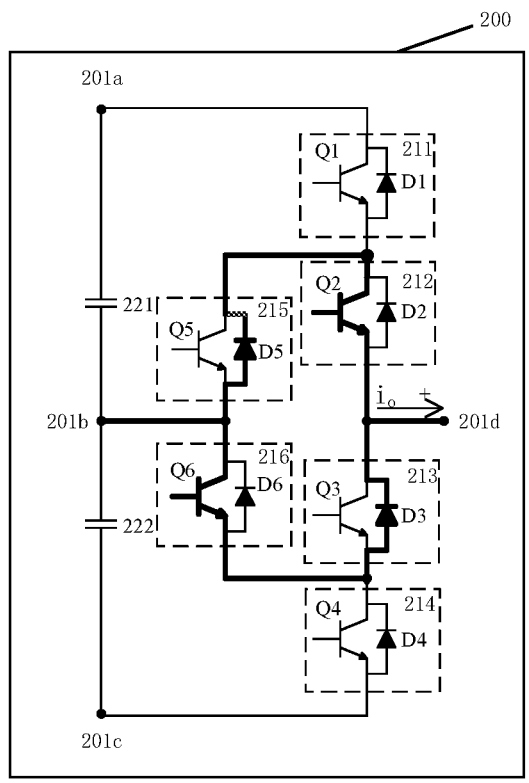

After the bridge leg 200 receives the control signal for controlling the first clamp switch 215 and the second clamp switch 216 to turn on, the state of the bridge leg 200 is illustrated in FIG. 5c. After the second delay time, and after the bridge leg 200 receives the control signal for controlling the first internal switch 212 and the second internal switch 213 to turn off, the state of the bridge leg 200 is illustrated in FIG. 5d.

As illustrated in FIG. 5c, in response to receiving the signal of turning on, the first clamp switch 215 and the second clamp switch 216 are switched from off to on. In this case, the first internal switch 212, the first clamp switch 215 and the second clamp switch 216 are turned on, and the remaining switches 211, 213, and 214 are turned off. The output current $i_o$ flows through the second input terminal 201b, two sets of switches 212, 213, 215, 216 connected in parallel, and the output terminal 201d. The output current $i_o$ flows through the diode in the first clamp switch 215 and the IGBT in the first internal switch 212, and flows through the IGBT in the second clamp switch 216 and the diode in the second internal switch 213.

Figure 5D:
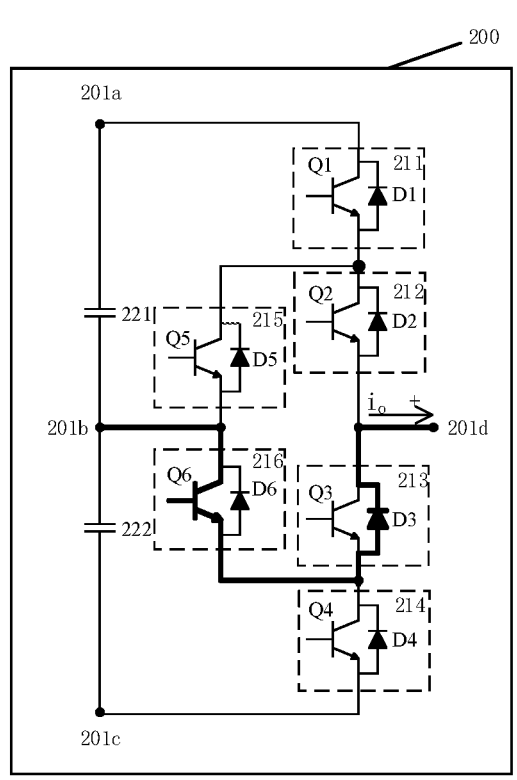

As illustrated in FIG. 5d, in response to receiving the signal of turning off, the first internal switch 212 is switched from on to off, and the second internal switch 213 remains off. The first clamp switch 215 and the second clamp switch 216 are turned on, and the remaining switches 211-214 are turned off. The output current $i_o$ flows through the second input terminal 201b, the IGBT in the second clamp switch 216, the diode in the second internal switch 213, and the output terminal 201d.

After the bridge leg 200 simultaneously receives the control signal for controlling the first clamp switch 215 and the second clamp switch 216 to turn on and the control signal for controlling the first internal switch 212 and the second internal switch 213 to turn off, the first clamp switch 215 and the second clamp switch 216 are switched from off to on, the first internal switch 212 is switched from on to off, and the second internal switch 213 remains off. In this case, the first clamp switch 215 and the second clamp switch 216 are turned on, the remaining switches 211-214 are turned off, and the state of the bridge leg 200 is illustrated in FIG. 5d. The state of the bridge leg 200 is the same as described above with reference to FIG. 5d.

Figure 5E:
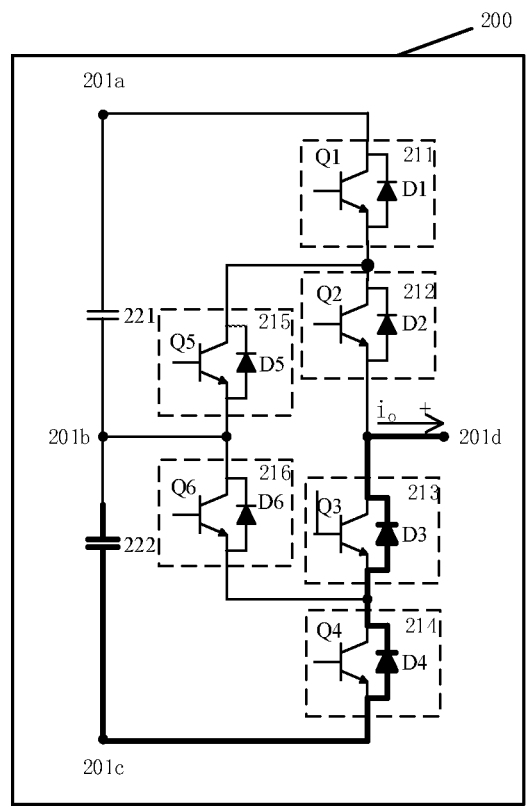

As can be seen from FIGS. 5b-5d, during the process that the first internal switch 212 is off, the current is switched from the IGBT in the first internal switch 212 and the diode in the first clamp switch 215 to the diode in the second internal switch 213 and the IGBT in the second clamp switch 216. Thus, the voltage stress experienced by the first internal switch 212 is merely from the voltage on the parasitic inductance in the commutation loop. Since the commutation loop path formed by the first internal switch 212, the first clamp switch 215, the second internal switch 213, and the second clamp switch 216 is short, the voltage stress experienced by the first internal switch 212 is also small. After the bridge leg 200 receives the control signal for controlling the first clamp switch 215 and the second clamp switch 216 to turn off, the state of the bridge leg 200 is illustrated in FIG. 5e. In response to receiving the signal of turning off, the first clamp switch 215 and the second clamp switch 216 are turned off. In this case, all switches 211-216 are turned off. The output current $i_o$ flows through the third input terminal 201c, the diode in the second external switch 214, the diode in the second internal switch 213, and the output terminal 201d.

As can be seen from FIG. 5d and FIG. 5e, during the process that the first clamp switch 215 and the second clamp switch 216 is turned off, the current is switched from the second clamp switch 216 to the second external switch 214, the voltage stress experienced by the first clamp switch 215 is zero, and the voltage stress experienced by the second clamp switch 216 is $U_{dc}+U_{para}$, wherein $U_{para}$ is the voltage on the parasitic inductance of the commutation loop. Since the current is switched between the second external switch 214 and the second clamp switch 216, which are on the same side as the second internal switch 213. Therefore, the commutation loop path is shorter, the parasitic inductance value in the commutation loop is reduced, and the voltage stress experienced by the second clamp switch 216 is further reduced.

After all switches 211-216 are turned off, the bridge leg 200 stops operating. The output current $i_o$ of the bridge leg 200 continues to flow through the diode in the second external switch 214 and the diode in the second internal switch 213, until the output current $i_o$ decays to zero.

FIGS. 6a-6e are schematic diagrams illustrating a process in which a bridge leg stops operating when the bridge leg is in the first state and the output current is a negative current in accordance with some embodiments, such as an exemplary embodiment.

Figure 6A:
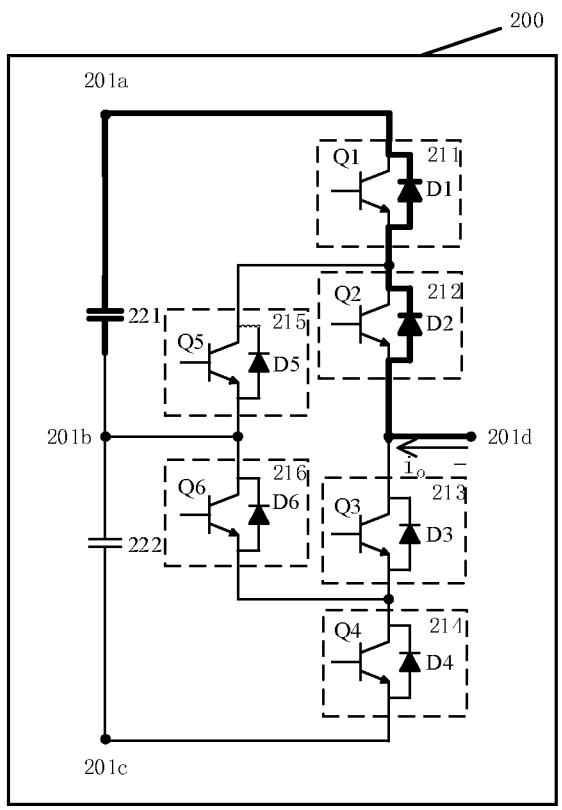
FIGS. 6a-6e are schematic diagrams illustrating a process in which a bridge leg stops operating when the bridge leg is in the first state and the output current is a negative current in accordance with some embodiments, such as an exemplary embodiment.

When the bridge leg 200 is in the first state and the output current $i_o$ is a negative current, the state of the bridge leg 200 is illustrated in FIG. 6a. As described in Table 1, the first external switch 211 and the first internal switch 212 are turned on, and the remaining switches 213-216 are turned off. The output current $i_o$ flows through the output terminal 201d, the diode in the first internal switch 212, the diode in the first external switch 211, and the first input terminal 201a.

Figure 6B:
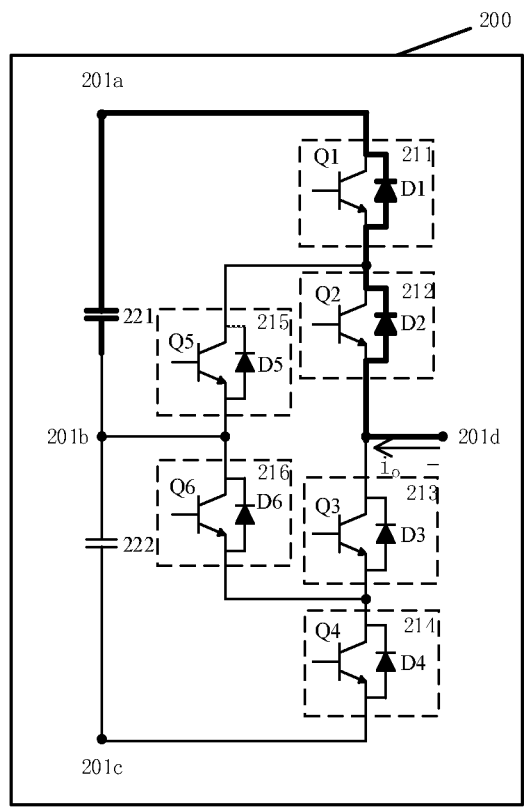

After the bridge leg 200 receives the control signal for controlling the first external switch 211 and the second external switch 214 to turn off, the state of the bridge leg 200 is illustrated in FIG. 6b. In this case, the first internal switch 212 is turned on, and the remaining switches 211, 213-216 are turned off. The output current $i_o$ still flows through the output terminal 201d, the diode in the first internal switch 212, the diode in the first external switch 211, and the first input terminal 201a.

As can be seen from FIG. 6a and FIG. 6b, before and after the first external switch 211 is turned off, the current flows through the diode in the first external switch 211, and the flowing path of the current does not change.

Figure 6C:
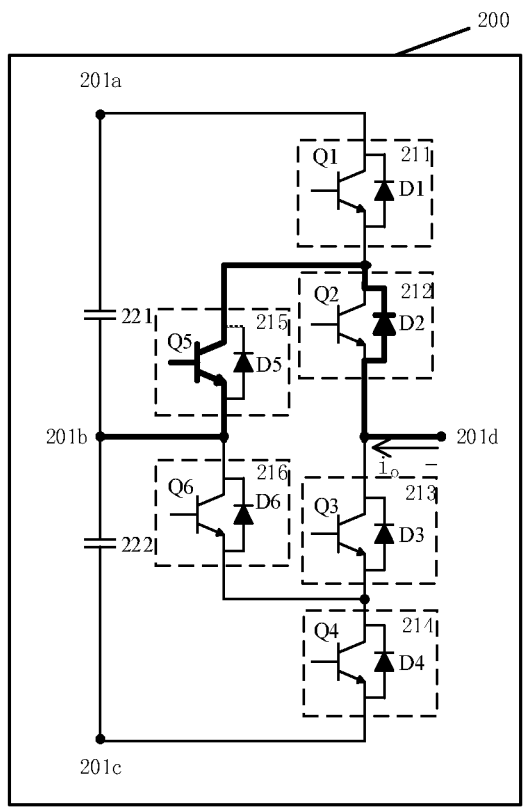

After the bridge leg 200 receives the control signal for controlling the first clamp switch 215 and the second clamp switch 216 to turn on, the state of the bridge leg 200 is illustrated in FIG. 6c. After the second delay time, and after the bridge leg 200 receives the control signal for controlling the first internal switch 212 and the second internal switch 213 to turn off, the state of the bridge leg 200 is illustrated in FIG. 6d.

After the bridge leg 200 receives the control signal for controlling the first clamp switch 215 and the second clamp switch 216 to turn on, the state of the bridge leg 200 is illustrated in FIG. 6c. In this case, the first internal switch 212, the first clamp switch 215, and the second clamp switch 216 are turned on, and the remaining switches 211, 213, and 214 are turned off. The output current $i_o$ flows through the output terminal 201d, the diode in the first internal switch 212, the IGBT in the first clamp switch 215, and the second input terminal 201b.

Figure 6D:
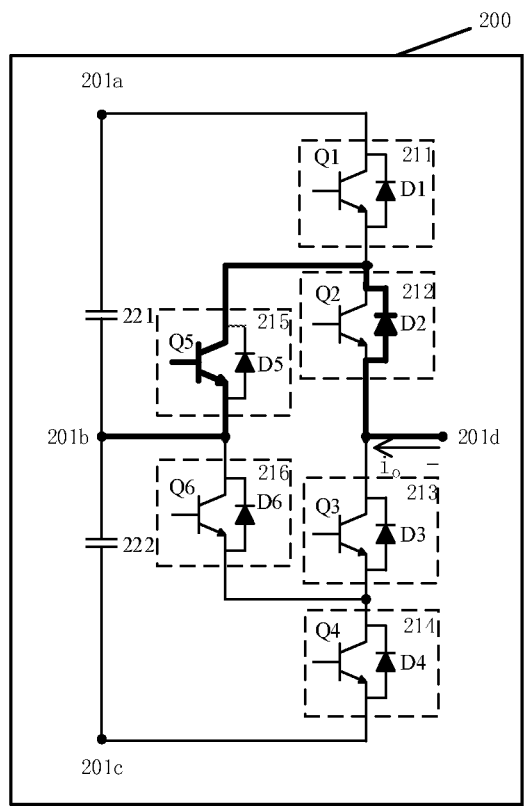

After the bridge leg 200 receives the control signal for controlling the first internal switch 212 and the second internal switch 213 to turn off, the state of the bridge leg 200 is illustrated in FIG. 6d. In this case, the first clamp switch 215 and the second clamp switch 216 are turned on, and the remaining switches 211-214 are turned off. The output current $i_o$ still flows through the output terminal 201d, the diode in the first internal switch 212, the IGBT in the first clamp switch 215, and the second input terminal 201b.

After the bridge leg 200 simultaneously receives the control signal for controlling the first clamp switch 215 and the second clamp switch 216 to turn on and the control signal for controlling the first internal switch 212 and the second internal switch 213 to turn off, the first clamp switch 215 and the second clamp switch 216 are turned on, the remaining switches 211-214 are turned off, and the state of the bridge leg 200 is illustrated in FIG. 6d. The state of the bridge leg 200 is the same as described above with reference to FIG. 6d.

As can be seen from FIGS. 6b-6d, during the process that the first clamp switch 215 is turned on, the current is switched from the first external switch 211 to the first clamp switch 215. As described with reference to FIG. 5a and FIG. 5b, the voltage stress experienced by the first external switch 211 is $U_{dc}+U_{para}$, wherein $U_{para}$ is the voltage on the parasitic inductance of the commutation loop.

Figure 6E:
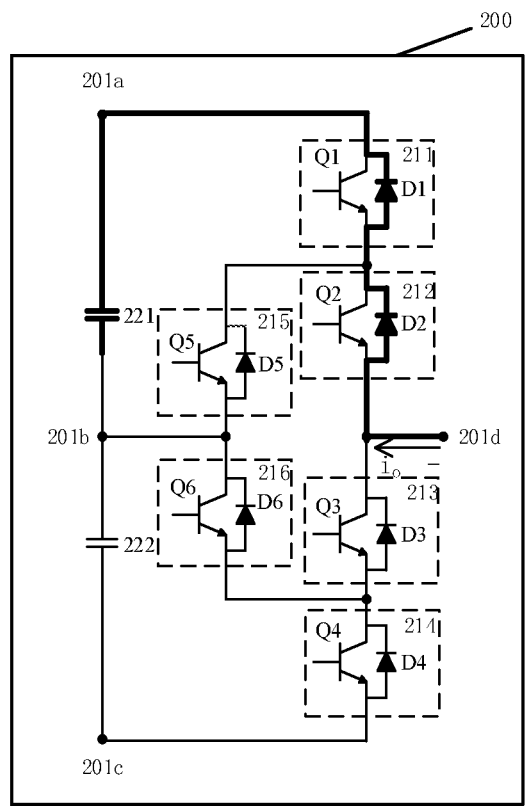

After the bridge leg 200 receives the control signal for controlling the first clamp switch 215 and the second clamp switch 216 to turn off, the state of the bridge leg 200 is illustrated in FIG. 6e. In this case, all switches 211-216 are turned off. The output current $i_o$ flows through the output terminal 201d, the diode in the first internal switch 212, the diode in the first external switch 211, and the first input terminal 201a.

As can be seen from FIG. 6d and FIG. 6e, during the process that the first clamp switch 215 and the second clamp switch 216 are turned off, the current is switched from the first clamp switch 215 to the first external switch 211, the voltage stress experienced by the first clamp switch 215 is $U_{dc}+U_{para}$, where $U_{para}$ is the voltage on the parasitic inductance of the commutation loop, and the voltage stress experienced by the second clamp switch 216 is zero. Moreover, since the current is switched between the first external switch 211 and the first clamp switch 215, which are on the same side as the first internal switch 212. Therefore, the commutation loop path is shorter, the parasitic inductance value in the commutation loop is reduced, and the voltage stress experienced by the first clamp switch 215 is further reduced.

After all switches 211-216 are turned off, the bridge leg 200 stops operating. The output current $i_o$ of the bridge leg 200 continues to flow through the diodes in the first external switch 211 and the first internal switch 212 until the output current $i_o$ decays to zero.

FIGS. 7a-7e are schematic diagrams illustrating a process in which a bridge leg stops operating when the bridge leg is in the second state and the output current is a positive current in accordance with some embodiments, such as an exemplary embodiment.

Figure 7A:
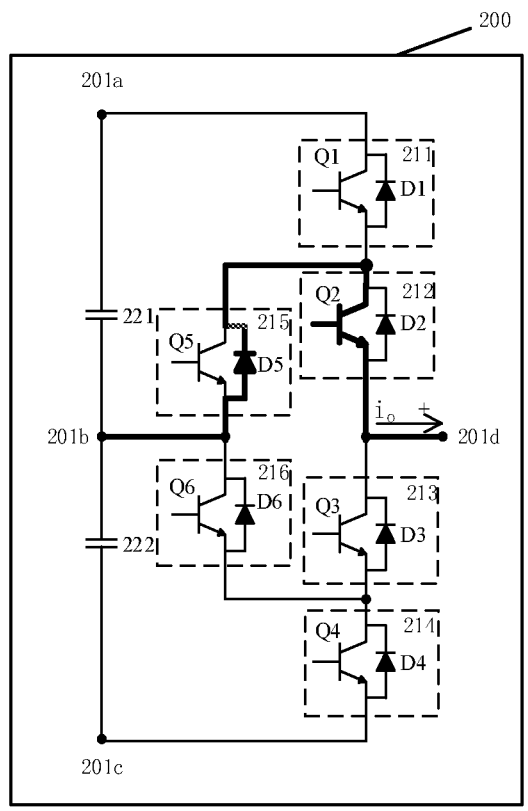
FIGS. 7a-7e are schematic diagrams illustrating a process in which a bridge leg stops operating when the bridge leg is in the second state and the output current is a positive current in accordance with some embodiments, such as an exemplary embodiment.

When the bridge leg 200 is in the second state and the output current $i_o$ is a positive current, the state of the bridge leg 200 is shown in FIG. 7a. As described in Table 1, the first internal switch 212 and the first clamp switch 215 are turned on, and the remaining switches 211, 213, 214, and 216 are turned off. In this case, the output current $i_o$ flows through the second input terminal 201b, the diode in the first clamp switch 215, the IGBT in the first internal switch 212, and the output terminal 201d.

Figure 7B:
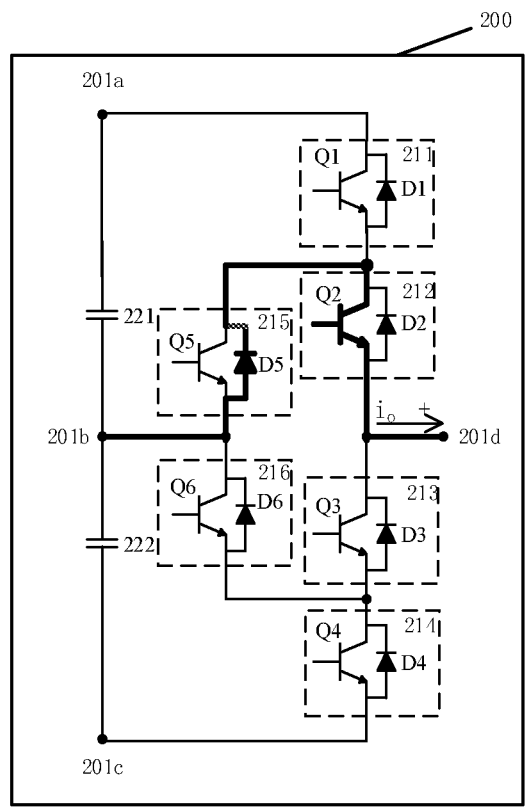

After the bridge leg 200 receives the control signal for controlling the first external switch 211 and the second external switch 214 to turn off, the state of the bridge leg 200 is illustrated in FIG. 7b. In response to receiving the signal of turning off, the first external switch 211 and the second external switch 214 remain off, and the state of the bridge leg 200 is the same as described with reference to FIG. 7a.

Figure 7C:
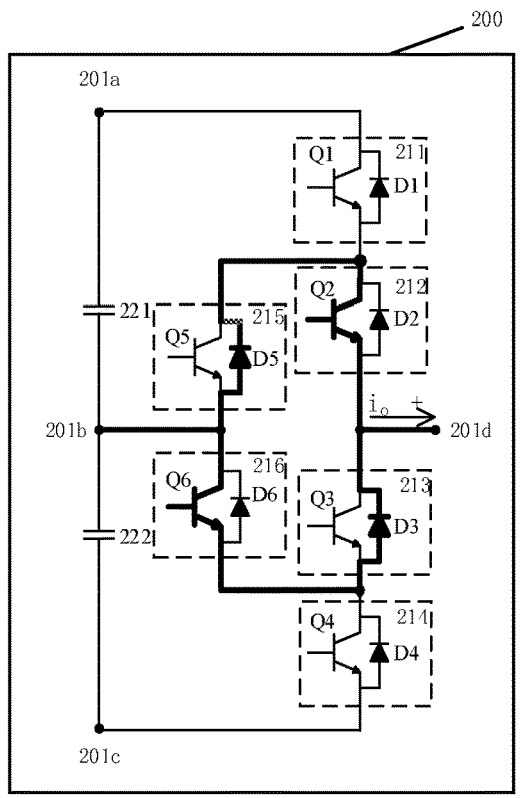

After the bridge leg 200 receives the control signal for controlling the first clamp switch 215 and the second clamp switch 216 to turn on, the state of the bridge leg 200 is illustrated in FIG. 7c. After the second delay time, and after the bridge leg 200 receives the control signal for controlling the first internal switch 212 and the second internal switch 213 to turn off, the state of the bridge leg 200 is illustrated in FIG. 7d.

As illustrated in FIG. 7c, in response to receiving the signal of turning on, the first clamp switch 215 remains on, and the second clamp switch 216 is switched from off to on. In this case, the first internal switch 212, the first clamp switch 215, and the second clamp switch 216 are turned on, and the remaining switches 211, 213, and 214 are turned off. The output current $i_o$ flows through the second input terminal 201b, two sets of switches 212, 213, 215, 216 connected in parallel, and the output terminal 201d. The output current $i_o$ flows through the diode in the first clamp switch 215 and the IGBT in the first internal switch 212, and flows through the IGBT in the second clamp switch 216 and the diode in the second internal switch 213.

Figure 7D:
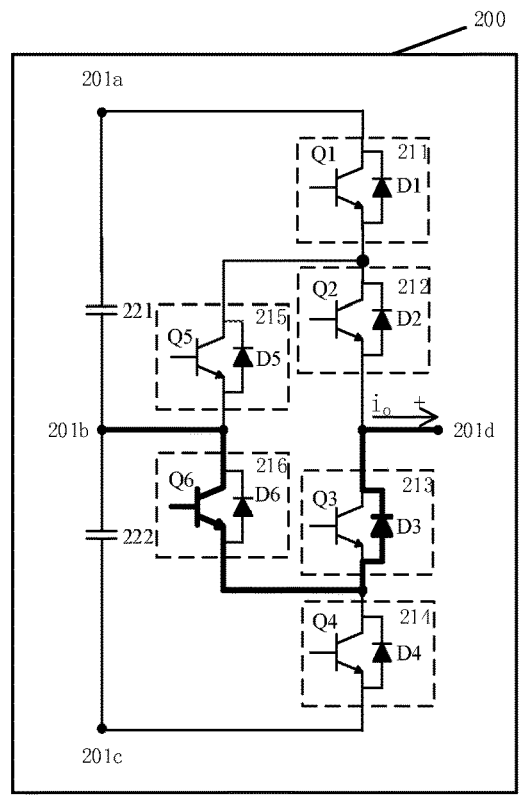

As illustrated in FIG. 7d, in response to receiving the signal of turning off, the first internal switch 212 is switched from on to off, and the second internal switch 213 remains off. In this case, the first clamp switch 215 and the second clamp switch 216 are turned on, and the remaining switches 211-214 are turned off. The output current $i_o$ flows through the second input terminal 201b, the IGBT in the second clamp switch 216, the diode in the second internal switch 213, and the output terminal 201d.

After the bridge leg 200 simultaneously receives the control signal for controlling the first clamp switch 215 and the second clamp switch 216 to turn on and the control signal for controlling the first internal switch 212 and the second internal switch 213 to turn off, the first clamp switch 215 and the second clamp switch 216 are turned on, and the remaining switches 211-214 are turned off. The state of the bridge leg 200 is the same as described with reference to FIG. 7d.

As can be seen from FIGS. 7b-7d, during the process that the first internal switch 212 is turned off, the current is switched from the IGBT in the first internal switch 212 and the diode in the first clamp switch 215 to the diode in the second internal switch 213 and the IGBT in the second clamp switch 216. Thus, the voltage stress experienced by the first internal switch 212 is merely from the voltage on the parasitic inductance in the commutation loop. Since the commutation loop path formed by the first internal switch 212, the first clamp switch 215, the second internal switch 213, and the second clamp switch 216 is short, the voltage stress experienced by the first internal switch 212 is also small.

Figure 7E:
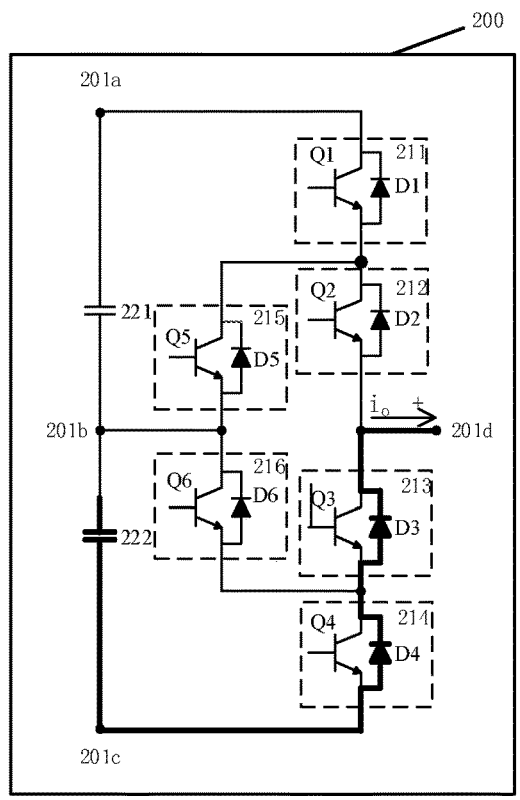

After the bridge leg 200 receives the control signal for controlling the first clamp switch 215 and the second clamp switch 216 to turn off, the state of the bridge leg 200 is illustrated in FIG. 7e. In response to receiving the signal of turning off, the first clamp switch 215 and the second clamp switch 216 are turned off. In this case, all switches 211-216 are turned off. The output current $i_o$ of the bridge leg 200 continues to flow through the diode in the second external switch 214 and the diode in the second internal switch 213 until the output current $i_o$ decays to zero.

As can be seen from FIG. 7d and FIG. 7e, during the process that the first clamp switch 215 and the second clamp switch 216 are turned off, the current is switched from the second clamp switch 216 to the second external switch 214 as in FIG. 5d and FIG. 5e. Thus, the voltage stress experienced by the first clamp switch 215 is zero, and the voltage stress experienced by the second clamp switch 216 is $U_{dc}+U_{para}$, wherein $U_{para}$ is the voltage on the parasitic inductance of the commutation loop.

FIGS. 8a-8e are schematic diagrams illustrating a process in which a bridge leg stops operating when the bridge leg is in the second state and the output current is a negative current in accordance with some embodiments, such as an exemplary embodiment.

Figure 8A:
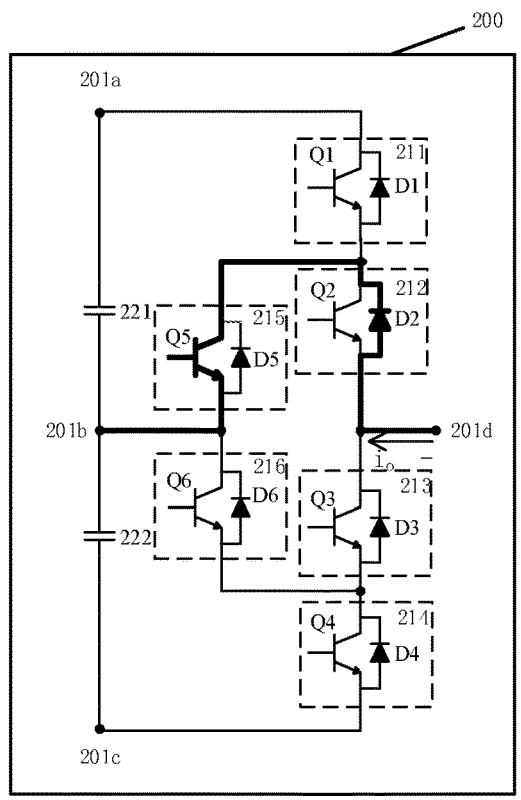
FIGS. 8a-8e are schematic diagrams illustrating a process in which a bridge leg stops operating when the bridge leg is in the second state and the output current is a negative current in accordance with some embodiments, such as an exemplary embodiment.

When the bridge leg 200 is in the second state and the output current $i_o$ is a positive current, the state of the bridge leg 200 is shown in FIG. 8a. As described in Table 1, the first internal switch 212 and the first clamp switch 215 are turned on, and the remaining switches 211, 213, 214, and 216 are turned off. In this case, the output current $i_o$ flows through the output terminal 201d, the diode in the first internal switch 212, the IGBT in the first clamp switch 215, and the second input terminal 201b.

Figure 8B:
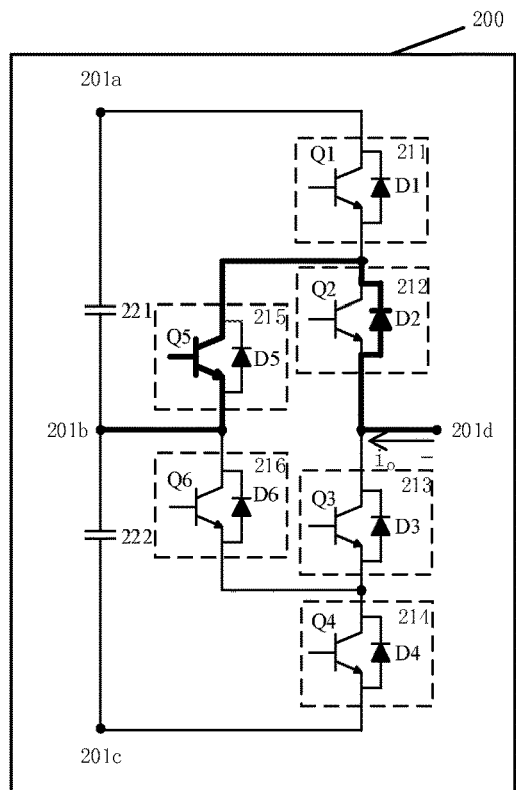

After the bridge leg 200 receives the control signal for controlling the first external switch 211 and the second external switch 214 to turn off, the state of the bridge leg 200 is illustrated in FIG. 8b. In response to receiving the signal of turning off, the first external switch 211 and the second external switch 214 remain off, and the state of the bridge leg 200 is the same as described with reference to FIG. 8a.

Figure 8C:
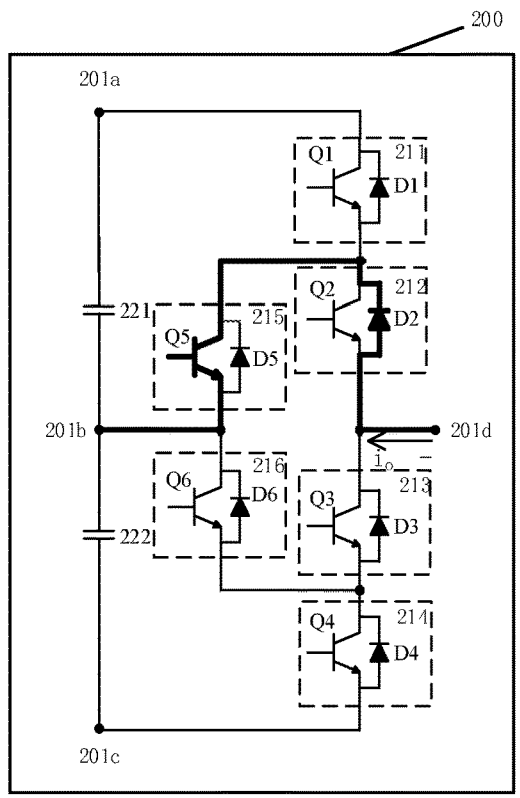

After the bridge leg 200 receives the control signal for controlling the first clamp switch 215 and the second clamp switch 216 to turn on, the state of the bridge leg 200 is illustrated in FIG. 8c. After the second delay time, and after the bridge leg 200 receives the control signal for controlling the first internal switch 212 and the second internal switch 213 to turn off, the state of the bridge leg 200 is illustrated in FIG. 8d.

As shown in FIG. 8c, in response to receiving the signal of turning on, the first clamp switch 215 remains on, and the second clamp switch 216 is switched from off to on. In this case, the first internal switch 212, the first clamp switch 215, and the second clamp switch 216 are turned on, and the remaining switches 211, 213, and 214 are turned off. The output current $i_o$ still flows through the output terminal 201d, the diode in the first internal switch 212, the IGBT in the first clamp switch 215, and the second input terminal 201b.

Figure 8D:
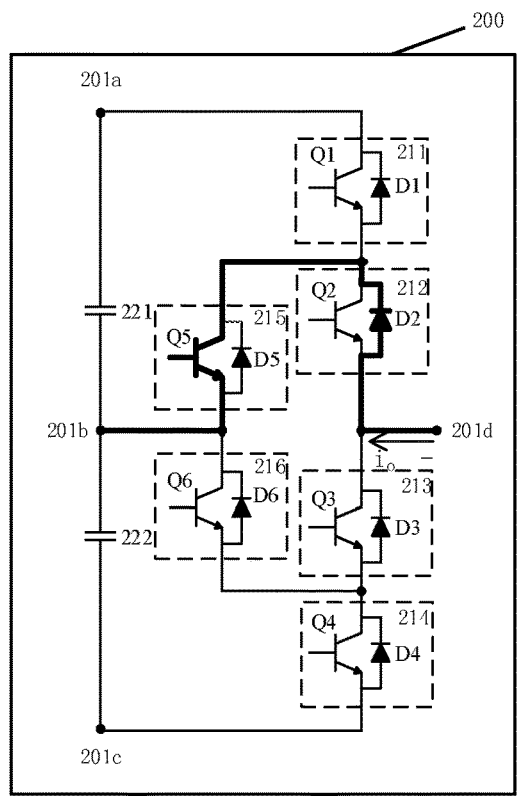

As shown in FIG. 8d, in response to receiving the signal of turning off, the first internal switch 212 is switched from on to off, and the second internal switch 213 remains off. The first clamp switch 215 and the second clamp switch 216 are turned on, and the remaining switches 211-214 are turned off. The output current $i_o$ still flows through the output terminal 201d, the diode in the first internal switch 212, the IGBT in the first clamp switch 215, and the second input terminal 201b.

After the bridge leg 200 simultaneously receives the control signal for controlling the first clamp switch 215 and the second clamp switch 216 to turn on and the control signal for controlling the first internal switch 212 and the second internal switch 213 to turn off, the first clamp switch 215 and the second clamp switch 216 are turned on, the remaining switches 211-214 are turned off, and the state of the bridge leg 200 is the same as described with reference to FIG. 8d.

With reference to FIGS. 8b-8d, the flowing path of the current does not change.

Figure 8E:
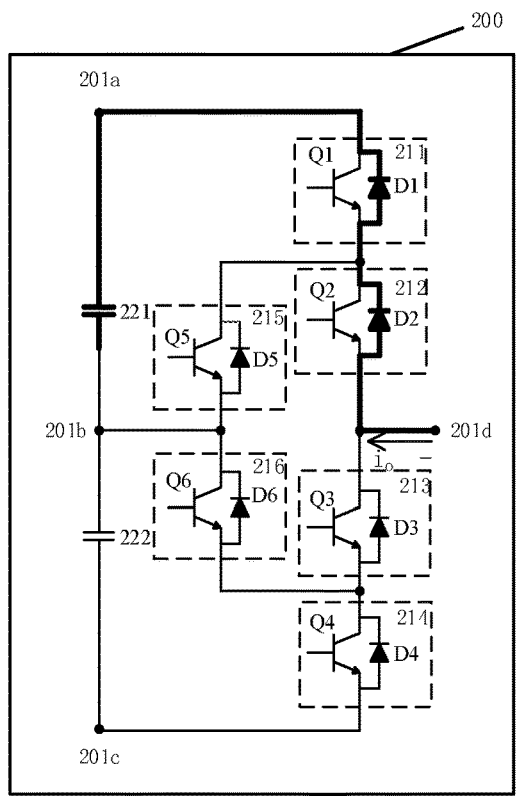
Figure 9A:
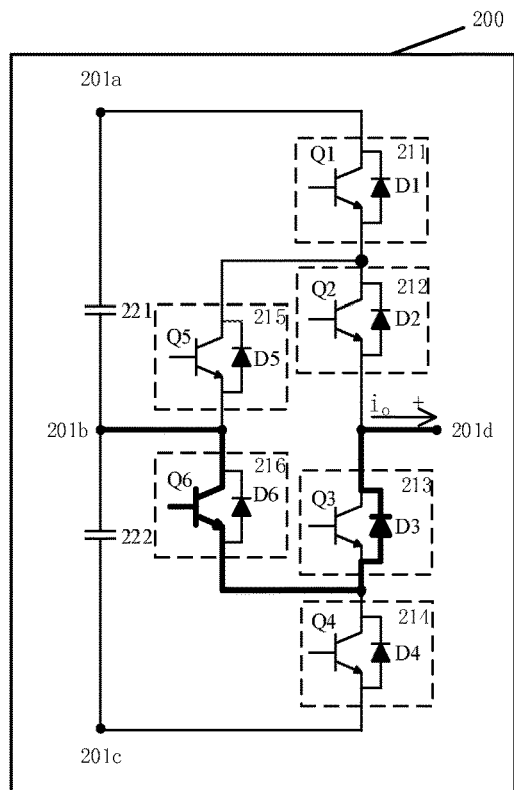
FIGS. 9a-9e are schematic diagrams illustrating a process in which a bridge leg stops operating when the bridge leg is in the third state and the output current is a positive current in accordance with some embodiments, such as an exemplary embodiment.
Figure 9B:
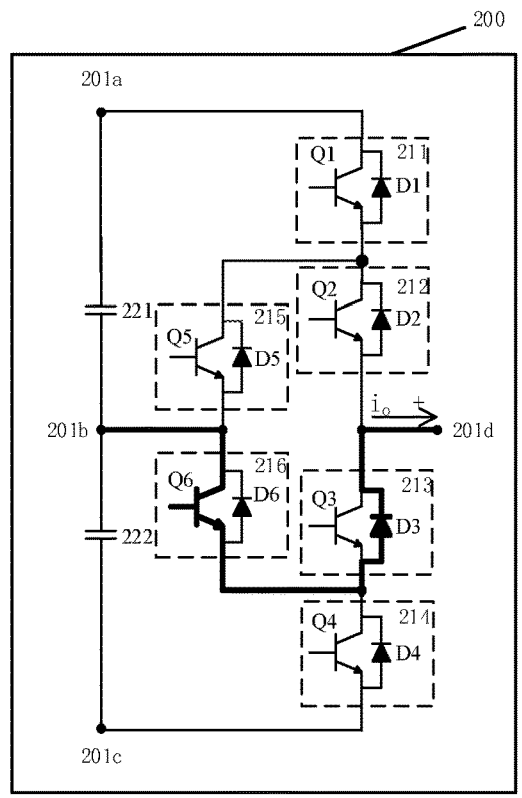
Figure 9C:
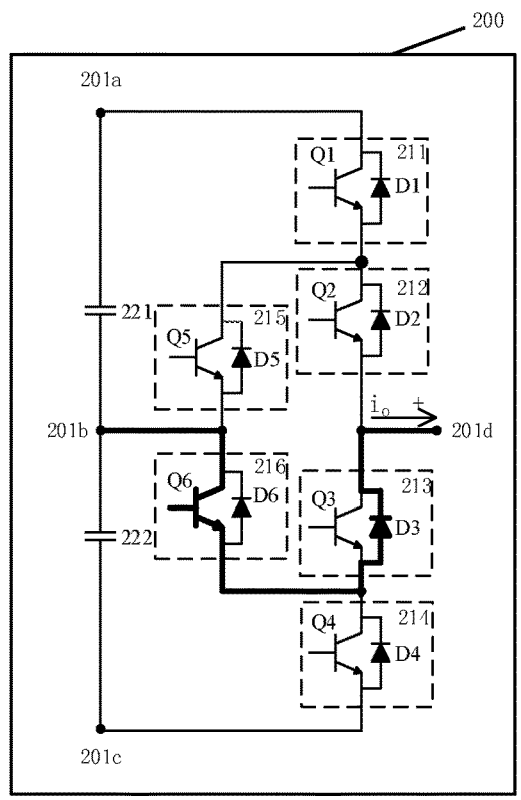
Figure 9D:
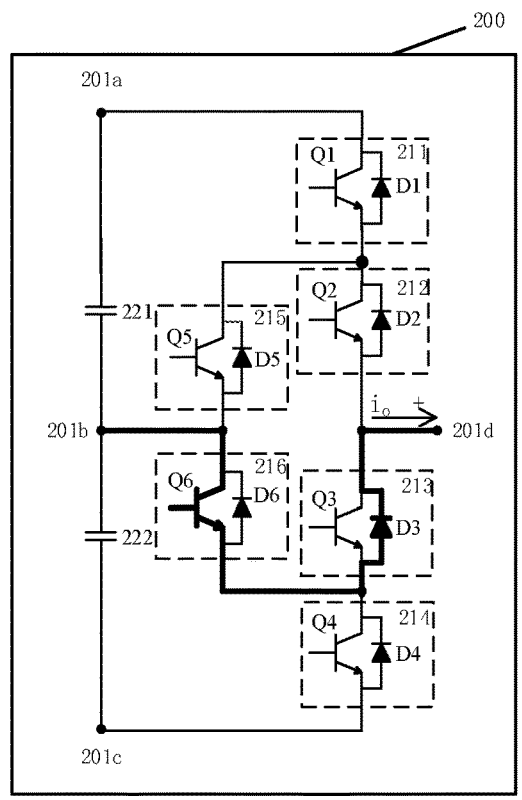
Figure 9E:
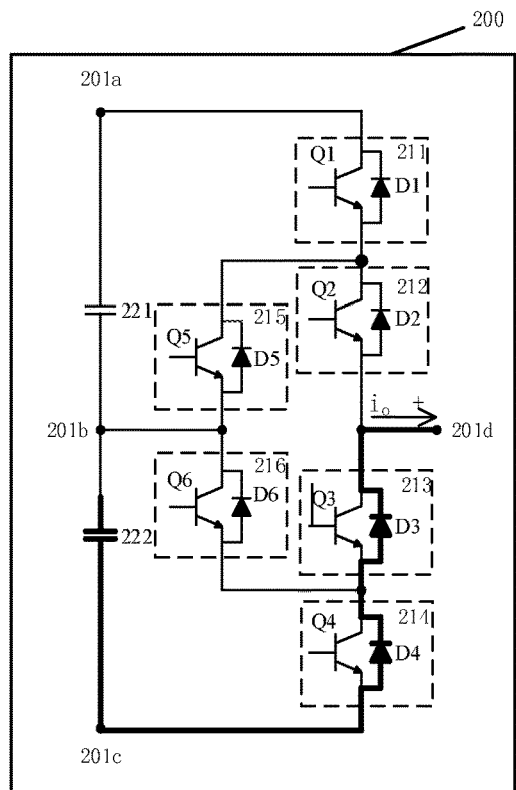
Figure 10A:
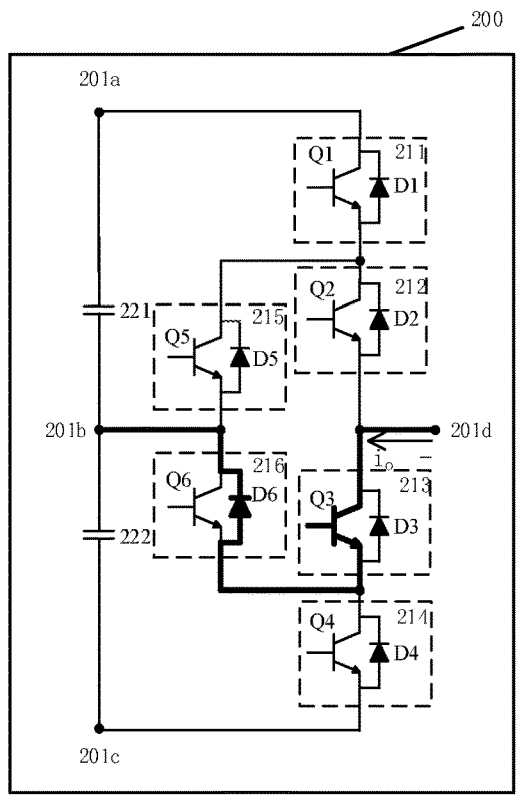
FIGS. 10a-10e are schematic diagrams illustrating a process in which a bridge leg stops operating when the bridge leg is in the third state and the output current is a negative current in accordance with some embodiments, such as an exemplary embodiment.
Figure 10B:
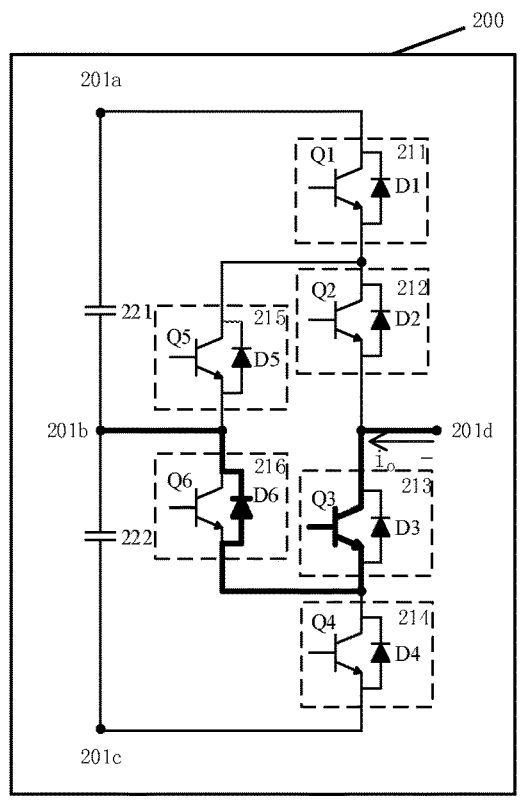
Figure 10C:
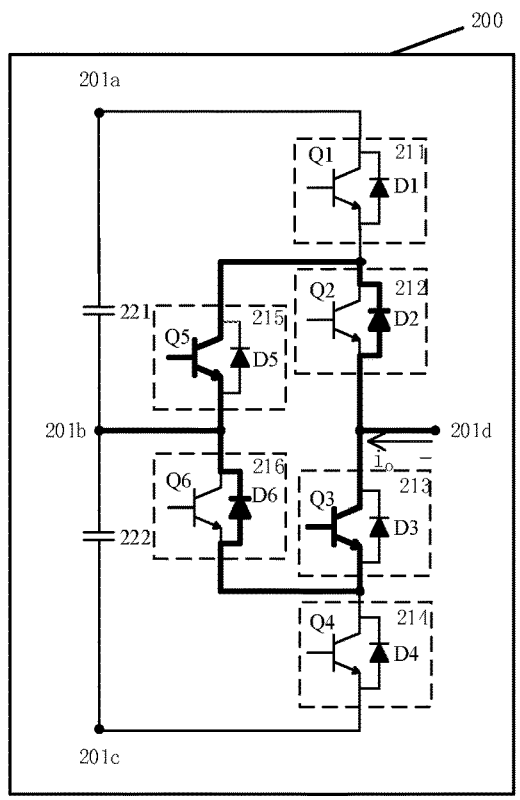
Figure 10D:
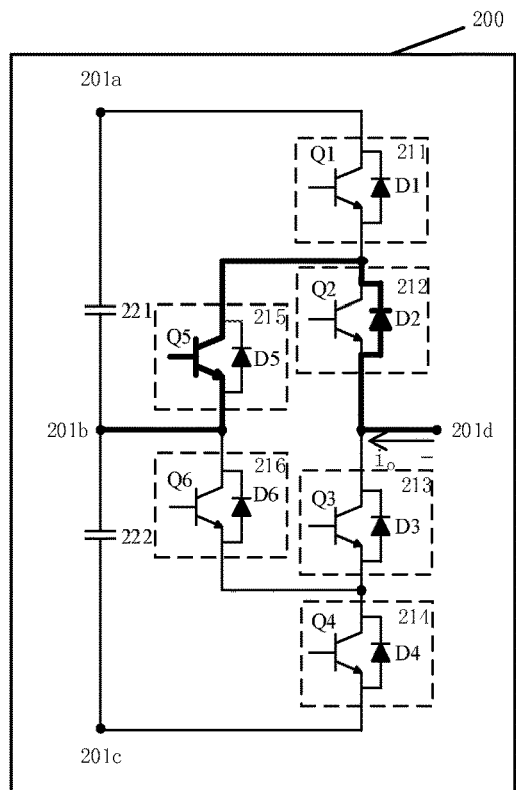
Figure 10E:
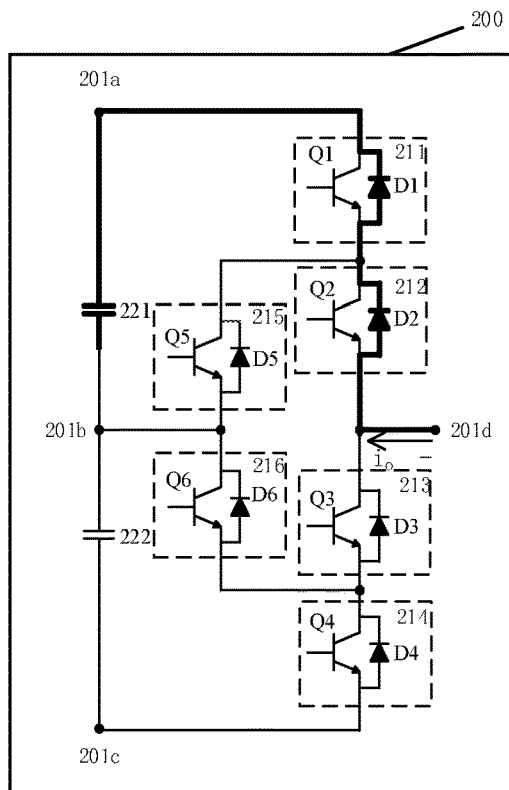

After the bridge leg 200 receives the control signal for controlling the first clamp switch 215 and the second clamp switch 216 to turn off, the state of the bridge leg 200 is illustrated in FIG. 8e. In response to receiving the signal of turning off, the first clamp switch 215 and the second clamp switch 216 are turned off. In this case, all switches 211-216 are turned off. The output current $i_o$ flows through the output terminal 201d, the diode in the first internal switch 212, the diode in the first external switch 211, and the first input terminal 201a.

As can be seen from FIG. 8d and FIG. 8e, during the process that the first clamp switch 215 and the second clamp switch 216 are turned off, the current is switched from the first clamp switch 215 to the first external switch 211 as in FIG. 6d and FIG. 6e. Thus, the voltage stress experienced by the first clamp switch 215 is $U_{dc}+U_{para}$, wherein $U_{para}$ is the voltage on the parasitic inductance of the commutation loop, and the voltage stress experienced by the second clamp switch 216 is zero.

FIGS. 9a-9e are schematic diagrams illustrating a process in which a bridge leg stops operating when the bridge leg is in the third state and the output current is a positive current in accordance with some embodiments, such as an exemplary embodiment. The process in which the bridge leg 200 stops operating is similar to the process in which the bridge leg stops operating when the bridge leg is in the second state and the output current is the negative current as described with reference to FIGS. 8a-8e.

FIGS. 10a-10e are schematic diagrams illustrating a process in which a bridge leg stops operating when the bridge leg is in the third state and the output current is a negative current in accordance with some embodiments, such as an exemplary embodiment. The process in which the bridge leg 200 stops operating is similar to the process in which the bridge leg stops operating when the bridge leg is in the second state and the output current is the positive current as described with reference to FIGS. 7a-7e.

FIGS. 11a-11e are schematic diagrams illustrating a process in which a bridge leg stops operating when the bridge leg is in the fourth state and the output current is a positive current in accordance with some embodiments, such as an exemplary embodiment.

Figure 11A:
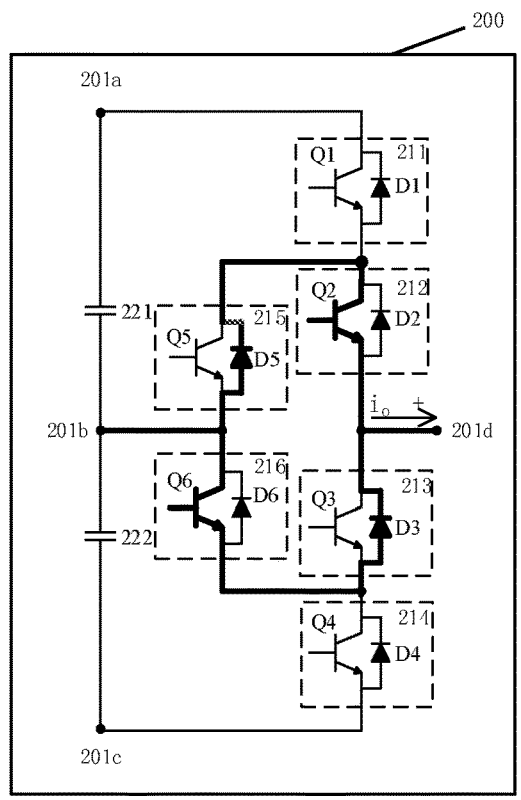
FIGS. 11a-11e are schematic diagrams illustrating a process in which a bridge leg stops operating when the bridge leg is in the fourth state and the output current is a positive current in accordance with some embodiments, such as an exemplary embodiment.

When the bridge leg 200 is in the second state and the output current $i_o$ is a positive current, the state of the bridge leg 200 is shown in FIG. 11a. As described in Table 1, the first internal switch 212, the second internal switch 213, the first clamp switch 215, and the second clamp switch 216 are turned on, and the remaining switches 211, 214 are turned off. The output current $i_o$ flows through the second input terminal 201b, two sets of switches 212, 213, 215, 216 connected in parallel, and the output terminal 201d. The output current $i_o$ flows through the diode in the first clamp switch 215 and the IGBT in the first internal switch 212, and flows through the IGBT in the second clamp switch 216 and the diode in the second internal switch 213.

Figure 11B:
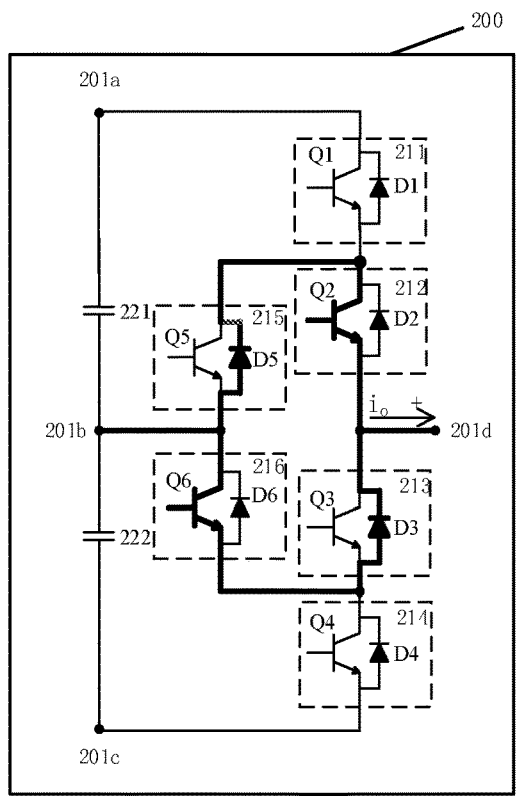

After the bridge leg 200 receives the control signal for controlling the first external switch 211 and the second external switch 214 to turn off, the state of the bridge leg 200 is illustrated in FIG. 11b. In response to receiving the signal of turning off, the first external switch 211 and the second external switch 214 remain off, and the state of the bridge leg 200 is the same as described with reference to FIG. 11a.

Figure 11C:
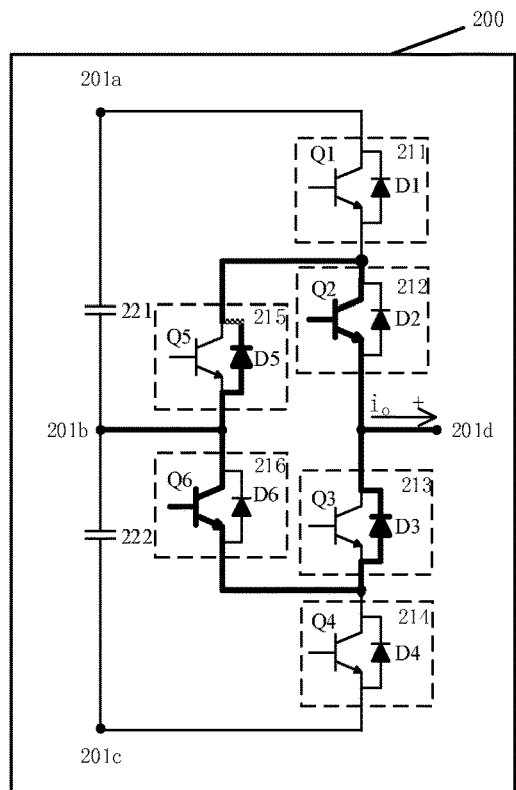

After the bridge leg 200 receives the control signal for controlling the first clamp switch 215 and the second clamp switch 216 to turn on, the state of the bridge leg 200 is illustrated in FIG. 11c. After the second delay time, and after the bridge leg 200 receives the control signal for controlling the first internal switch 212 and the second internal switch 213 to turn off, the state of the bridge leg 200 is illustrated in FIG. 11d.

As shown in FIG. 11c, in response to receiving the signal of turning on, the first clamp switch 215 and the second clamp switch 216 remain on, and the state of the bridge leg 200 is the same as described with reference to FIG. 11a.

Figure 11D:
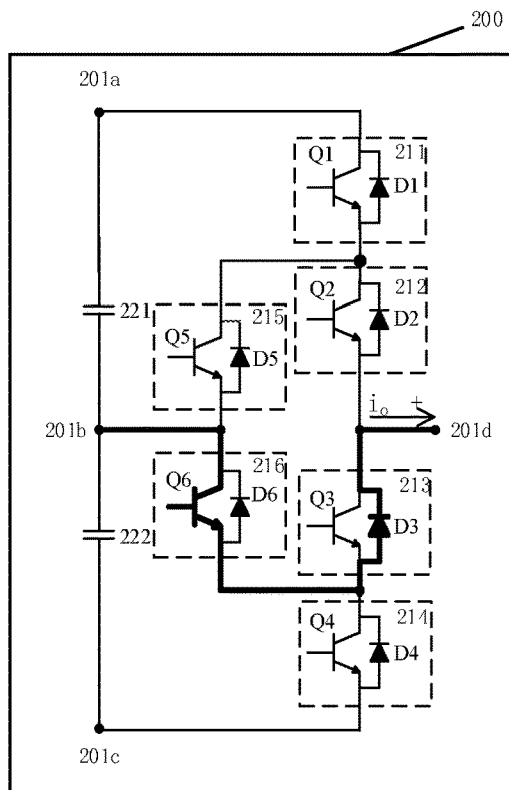

As shown in FIG. 11d, in response to receiving the signal of turning off, the first internal switch 212 and the second internal switch 213 are switched from on to off. In this case, the first clamp switch 215 and the second clamp switch 216 are turned on, and the remaining switches 211-214 are turned off. The output current $i_o$ flows through the second input terminal 201b, the IGBT in the second clamp switch 216, the diode in the second internal switch 213, and the output terminal 201d.

After the bridge leg 200 simultaneously receives the control signal for controlling the first clamp switch 215 and the second clamp switch 216 to turn on and the control signal for controlling the first internal switch 212 and the second internal switch 213 to turn off, the first clamp switch 215 and the second clamp switch 216 are turned on, the remaining switches 211-214 are turned off, and the state of the bridge leg 200 is the same as described with reference to FIG. 11d.

As can be seen from FIGS. 11b-11d, during the process that the first internal switch 212 and the second internal switch 213 are turned off, the current is switched from the IGBT in the first internal switch 212 and the diode in the first clamp switch 215 to the diode in the second internal switch 213 and the IGBT in the second clamp switch 216. Thus, the voltage stress experienced by the first internal switch 212 is merely from the voltage on the parasitic inductance in the commutation loop, while the voltage stress experienced by the second internal switch 213 is zero.

Figure 11E:
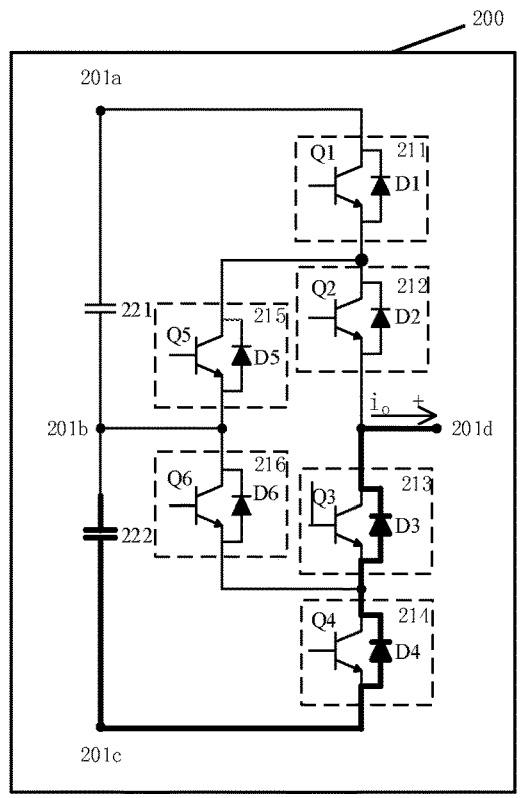

After the bridge leg 200 receives the control signal for controlling the first clamp switch 215 and the second clamp switch 216 to turn off, the state of the bridge leg 200 is illustrated in FIG. 11e. In response to receiving the signal of turning off, the first clamp switch 215 and the second clamp switch 216 are turned off. In this case, all switches 211-216 are turned off. The output current $i_o$ of the bridge leg 200 continues to flow through the diode in the second external switch 214 and the diode in the second internal switch 213 until the output current $i_o$ decays to zero.

As can be seen from FIG. 11d and FIG. 11e, during the process that the first clamp switch 215 and the second clamp switch 216 are turned off, the current is switched from the second clamp switch 216 to the second external switch 214 as in FIG. 5d and FIG. 5e. Thus, the voltage stress experienced by the first clamp switch 215 is zero, and the voltage stress experienced by the second clamp switch 216 is $U_{dc}+U_{para}$, wherein $U_{para}$ is the voltage on the parasitic inductance of the commutation loop.

FIGS. 12a-12e are schematic diagrams illustrating a process in which a bridge leg stops operating when the bridge leg is in the fourth state and the output current is a negative current in accordance with some embodiments, such as an exemplary embodiment.

Figure 12A:
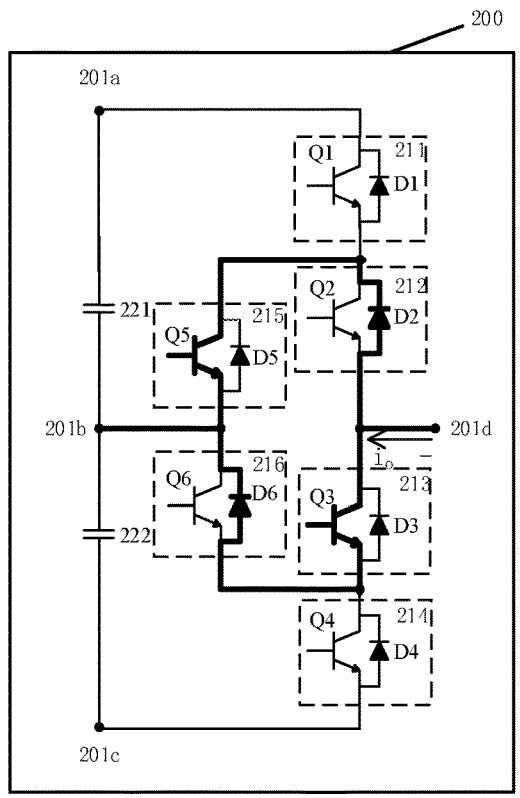
FIGS. 12a-12e are schematic diagrams illustrating a process in which a bridge leg stops operating when the bridge leg is in the fourth state and the output current is a negative current in accordance with some embodiments, such as an exemplary embodiment.

When the bridge leg 200 is in the second state and the output current $i_o$ is a negative current, the state of the bridge leg 200 is illustrated in FIG. 12a. As described in Table 1, the first internal switch 212, the second internal switch 213, the first clamp switch 215, and the second clamp switch 216 are turned on, and the remaining switches 211, 214 are turned off. The output current $i_o$ flows through the output terminal 201d, two sets of switches 212, 213, 215, 216 connected in parallel, and the second input terminal 201b. The output current $i_o$ flows through the IGBT in the first clamp switch 215 and the diode in the first internal switch 212, and flows through the diode in the second clamp switch 216 and the IGBT in the second internal switch 213.

Figure 12B:
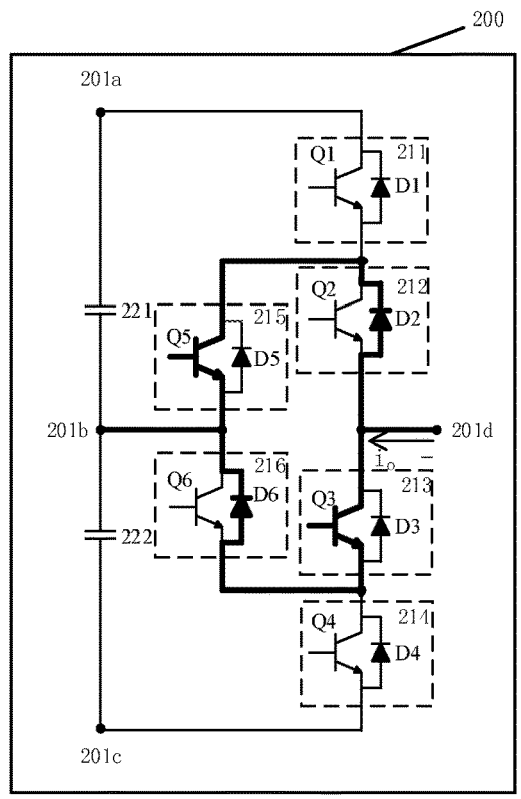

After the bridge leg 200 receives the control signal for controlling the first external switch 211 and the second external switch 214 to turn off, the state of the bridge leg 200 is illustrated in FIG. 12b. In response to receiving the signal of turning off, the first external switch 211 and the second external switch 214 remain off, and the state of the bridge leg 200 is the same as described with reference to FIG. 12a.

Figure 12C:
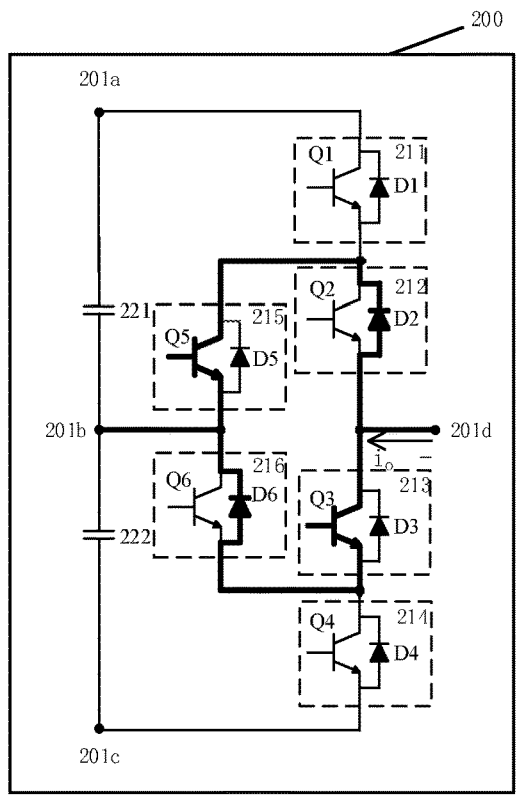

After the bridge leg 200 receives the control signal for controlling the first clamp switch 215 and the second clamp switch 216 to turn on, the state of the bridge leg 200 is illustrated in FIG. 12c. After the second delay time, and after the bridge leg 200 receives the control signal for controlling the first internal switch 212 and the second internal switch 213 to turn off, the state of the bridge leg 200 is illustrated in FIG. 12d.

As shown in FIG. 12c, in response to receiving the signal of turning on, the first clamp switch 215 and the second clamp switch 216 remain on, and the state of the bridge leg 200 is the same as described with reference to FIG. 12a.

Figure 12D:
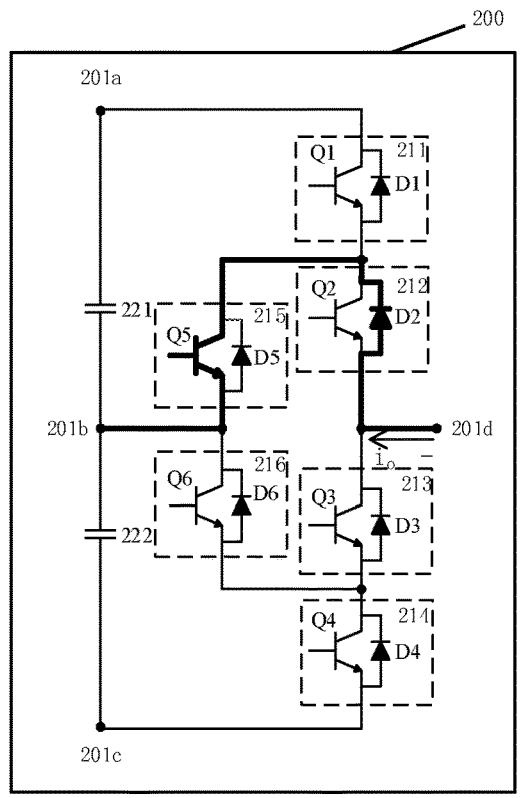

As shown in FIG. 12d, in response to receiving the signal of turning off, the first internal switch 212 and the second internal switch 213 are switched from on to off. In this case, the first clamp switch 215 and the second clamp switch 216 are turned on, and the remaining switches 211-214 are turned off. The output current $i_o$ flows through the output terminal 201d, the diode in the first internal switch 212, the IGBT in the first clamp switch 215, and the second input terminal 201b.

After the bridge leg 200 simultaneously receives the control signal for controlling the first clamp switch 215 and the second clamp switch 216 to turn on and the control signal for controlling the first internal switch 212 and the second internal switch 213 to turn off, the first clamp switch 215 and the second clamp switch 216 are turned on, the remaining switches 211-214 are turned off. The state of the bridge leg 200 is the same as described with reference to FIG. 12d.

As can be seen from FIGS. 12b-12d, during the process that the first internal switch 212 and the second internal switch 213 are turned off, the current is switched from the IGBT in the second internal switch 213 and the diode in the second clamp switch 216 to the diode in the first internal switch 212 and the IGBT in the first clamp switch 215. Thus, the voltage stress experienced by the first internal switch 212 is zero, while the voltage stress experienced by the second internal switch 213 is merely from the voltage on the parasitic inductance in the commutation loop. Since the commutation loop path formed by the first internal switch 212, the first clamp switch 215, the second internal switch 213, and the second clamp switch 216 is short, the voltage stress experienced by the second internal switch 213 is also small.

Figure 12E:
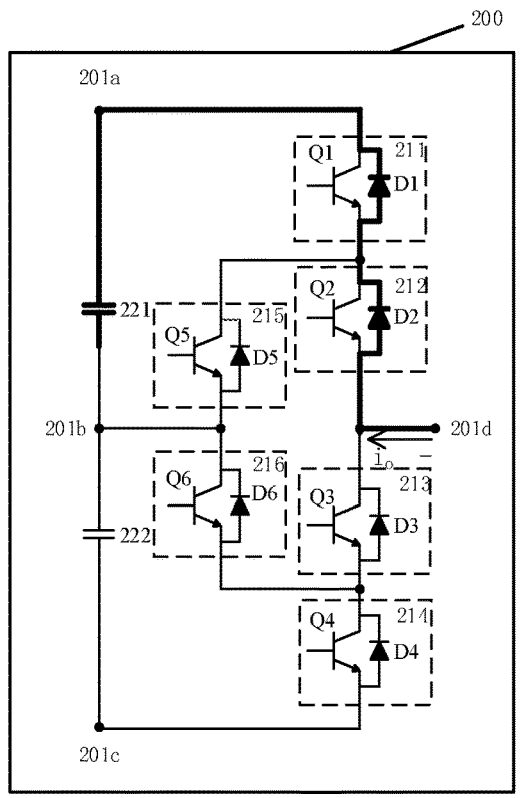
Figure 13A:
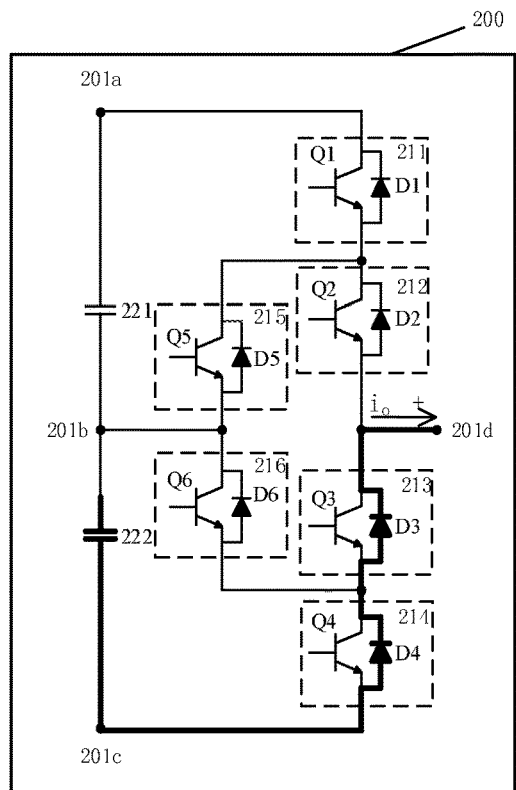
FIGS. 13a-13e are schematic diagrams illustrating a process in which a bridge leg stops operating when the bridge leg is in a fifth state and the output current is a positive current in accordance with some embodiments, such as an exemplary embodiment.
Figure 13B:
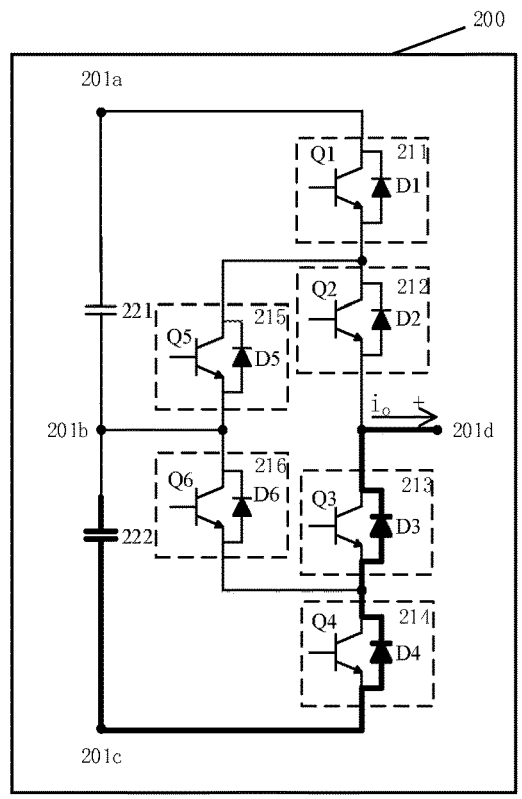
Figure 13C:
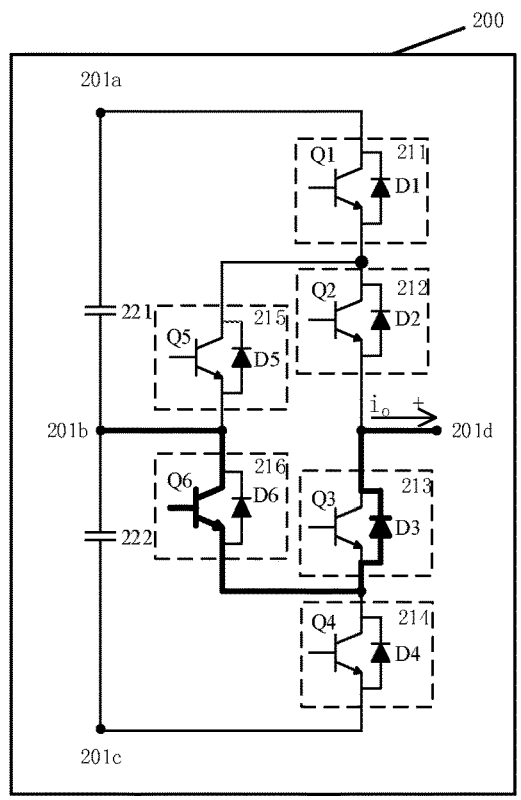
Figure 13D:
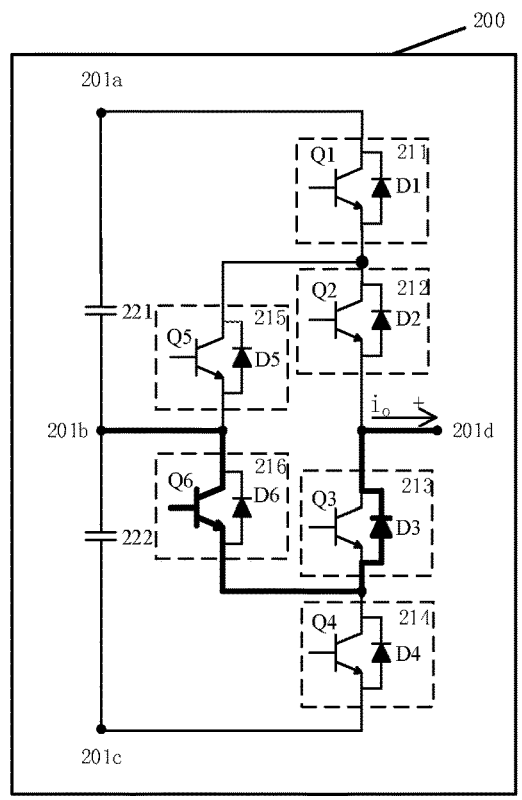
Figure 13E:
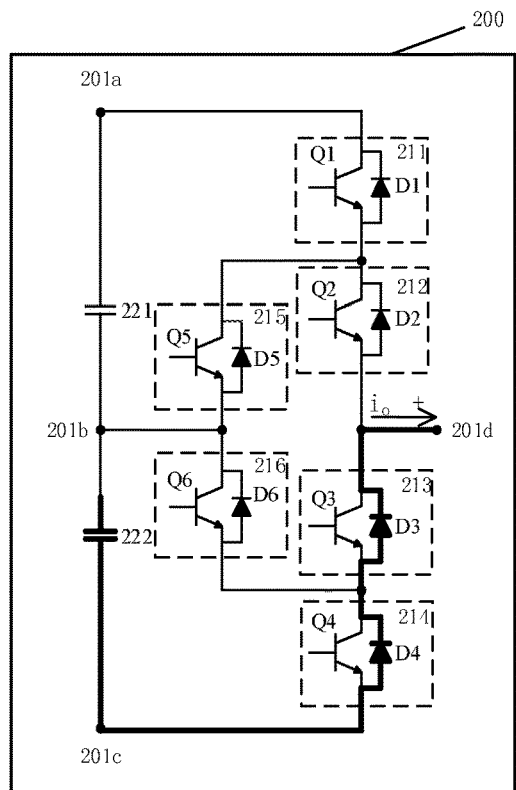
Figure 14A:
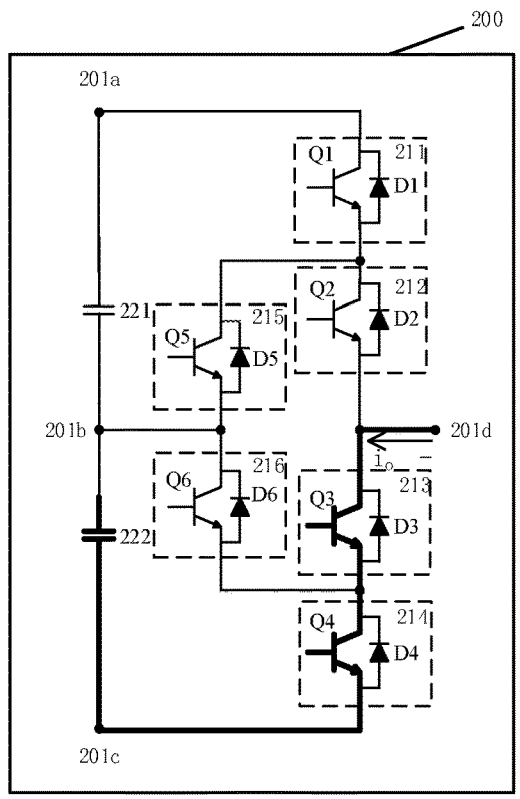
Figure 14B:
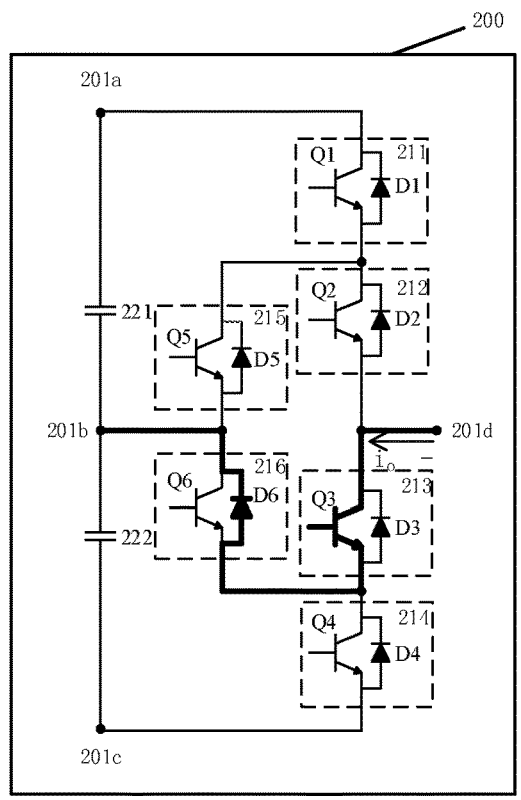
Figure 14C:
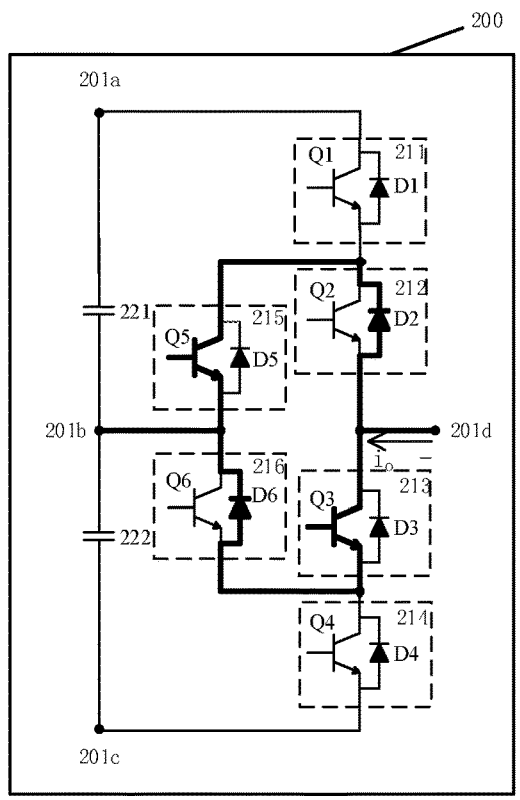

After the bridge leg 200 receives the control signal for controlling the first clamp switch 215 and the second clamp switch 216 to turn off, the state of the bridge leg 200 is illustrated in FIG. 12e. In response to receiving the signal of turning off, the first clamp switch 215 and the second clamp switch 216 are turned off. In this case, all switches 211-216 are turned off. The output current $i_o$ flows through the output terminal 201d, the diode in the first internal switch 212, the diode in the first external switch 211, and the first input terminal 201a.

As can be seen from FIG. 12d and FIG. 12e, during the process that the first clamp switch 215 and the second clamp switch 216 are off, the current is switched from the first clamp switch 215 to the first external switch 211 as in FIGS. 6d and 6e. Thus, the voltage stress experienced by the first clamp switch 215 is $U_{dc}+U_{para}$, where $U_{para}$ is the voltage on the parasitic inductance of the commutation loop, and the voltage stress experienced by the second clamp switch 216 is zero.

FIGS. 13a-13e are schematic diagrams illustrating a process in which a bridge leg stops operating when the bridge leg is in a fifth state and the output current is a positive current in accordance with some embodiments, such as an exemplary embodiment. The process in which the bridge leg 200 stops operating is similar to the process in which the bridge leg stops operating when the bridge leg is in the first state and the output current is the negative current as described with reference to FIGS. 6a-6e.

FIGS. 14a-14e are schematic diagrams illustrating a process in which a bridge leg stops operating when the bridge leg is in a fifth state and the output current is a negative current in accordance with some embodiments, such as an exemplary embodiment. The process in which the bridge leg 200 stops operating is similar to the process in which the bridge leg stops operating when the bridge leg is in the first state and the output current is the positive current as described with reference to FIGS. 5a-5e.

As described above with reference to FIGS. 5a-14e, when the converter stops operating, the current switching in the bridge leg is one of the following two cases.

(1) The current in the bridge leg is switched between the external switch and the clamp switch on the same side (for example, between the first external switch 211 and the first clamp switch 215), in this case, the voltage stress experienced by the switch $U_{dc}+U_{para}$, wherein $U_{para}$ is the voltage on the parasitic inductance of the commutation loop.

(2) The current in the bridge leg is switched from the internal switch and the clamp switch on the same side to the internal switch and the clamp switch on the other side (for example, from the first internal switch 212 and the first clamp switch 215 to the second internal switch 213 and second clamp switch 216), in this case, the voltage stress experienced by is merely the voltage on the parasitic inductance of the commutation loop.

In the above two cases, the commutation loop of the current in the bridge leg is short. Thus, no matter which state the bridge leg is in before it stops operating, the commutation loop path of the current is short, the voltage stress experienced by the switch is small, and the switch can be protected from the damage caused by excessive voltage stress during the switching process of the switch. Thereby, the method for controlling the ANPC three-level converter to stop operating according to embodiments of the present disclosure can control switches in the bridge leg to be safely turned off without detecting the state of the bridge leg of the converter.

In particular, when an output current overcurrent fault occurs, the voltage stress caused by the parasitic inductance in the commutation loop may be more serious due to the large value of output current, thus by applying the method for controlling the ANPC three-level converter to stop operating according to embodiments of the present disclosure, the voltage stress experienced by the switches can be reduced.

As described above with reference to FIGS. 5a-14e, if the first internal switch 212 and the second internal switch 213 are controlled to turn off at the same time when the first clamp switch 215 and the second clamp switch 216 in the bridge leg are controlled to turn on, the converter will enter the state of stopping operation more quickly. If the first internal switch 212 and the second internal switch 213 are controlled to turn off after a second delay time passes after the first clamp switch 215 and the second clamp switch 216 in the bridge arm are controlled to turn on, since the state of merely two switches are changed each time, the control logic of the switches is simpler. Moreover, in the transition stage where the first clamp switch 215 and the second clamp switch 216 are already turned on and the first internal switch 212 and the second internal switch 213 are not yet turned off, since the first clamp switch 215 and the second clamp switch 216 are already turned on, the output level of the bridge leg 200 is zero level 0, the output power of the bridge leg 200 is 0, and the output current $i_o$ decays correspondingly, thereby protecting the safety of the converter.

As mentioned above, after the converter stops operating, respective switches in the converter is in the off state, and the output current of the converter flows through the diodes in the first external switch and the first internal switch in the bridge leg, or through the diodes in the second external switch and in the second internal switch of the bridge leg until the current decays to zero. If the converter starts to operate again within a short time period after the last time of stopping operation, the current in the converter may not decays to zero when the converter starts operating. For example, after an output current overcurrent fault occurs in the converter, the converter stops operating, and the output current of the converter begins to decay; when the output current of the converter decreases to the second current threshold $I_{th2}$ and the second detection time $T_2$ is maintained, the output current overcurrent fault is cleared, and the converter starts to operate again. Thus, during the process that the converter starts to operate, the switches in the converter should be controlled to recover the normal control signals at a reasonable timing, to avoid excessive voltage caused by the parasitic inductance of the commutation loop during the switching of the converter.

Figure 15:
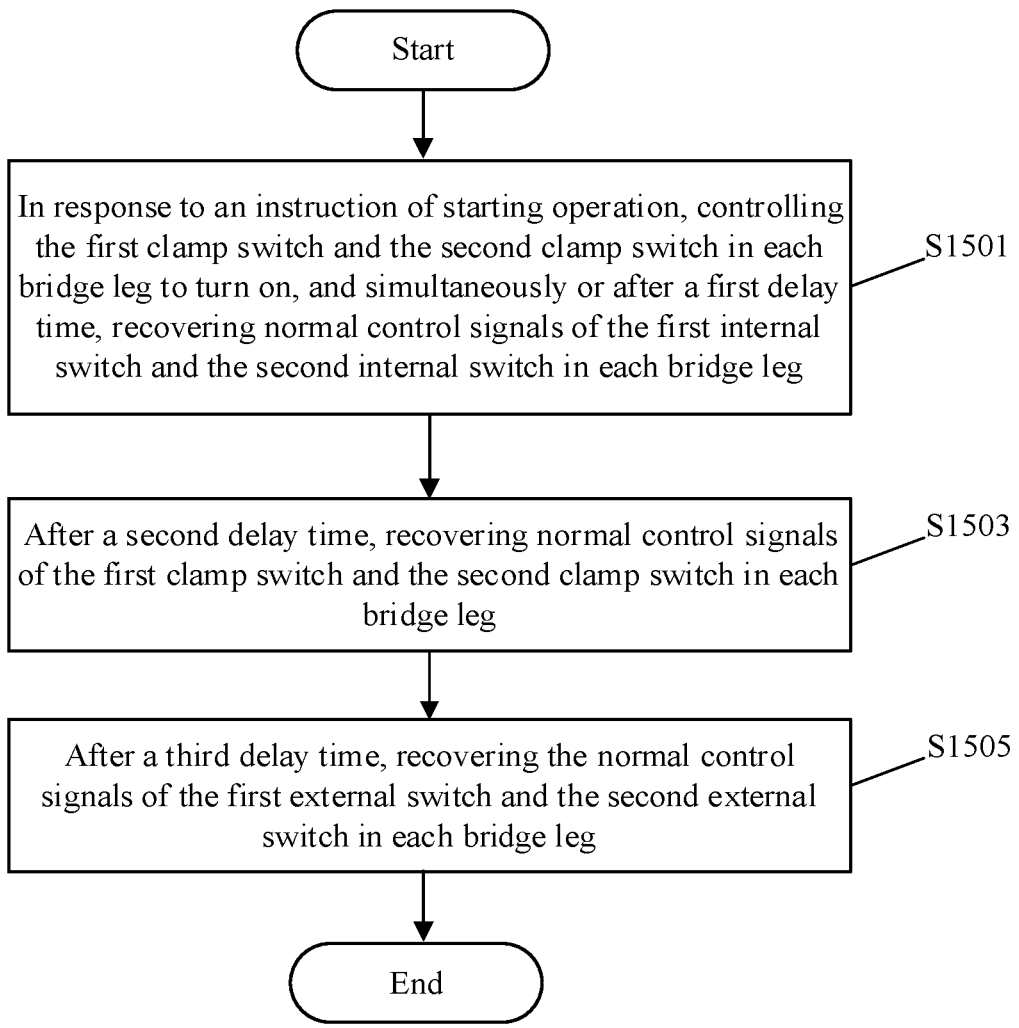
FIG. 15 is a flowchart illustrating an exemplary method of controlling an ANPC three-level converter to start to operate in accordance with some embodiments, such as an exemplary embodiment.

FIG. 15 is a flowchart illustrating an exemplary method of controlling an ANPC three-level converter to start to operate in accordance with some embodiments, such as an exemplary embodiment. The ANPC three-level converter includes at least one bridge leg as described with reference to FIG. 2.

At block S1501, in response to an instruction of starting operation, the first clamp switch and the second clamp switch in each bridge leg are controlled to be switched on, and simultaneously or after a first delay time, normal control signals of the first internal switch and the second internal switch in each bridge leg are recovered.

According to some embodiments, the instruction of starting operation includes a startup instruction or a fault elimination instruction. In some examples, similar to the shutdown instruction, the startup instruction may be an instruction from the outside. For example, the startup instruction may be an instruction input by a user through a user interaction interface, or an instruction sent to the converter by a host computer through a communication interface. In some examples, the fault corresponding to the fault elimination instruction may be an output current overcurrent fault. In some other examples, the fault corresponding to the fault elimination instruction includes at least one of the followings: an output voltage overvoltage fault, an over-temperature fault, a bus voltage bias fault, a bus voltage overvoltage fault, and a leakage current failure.

According to some embodiments, the normal control signals of the first internal switch and the second internal switch in each bridge leg are recovered at the same time when the first clamp switch and the second clamp switch in each bridge leg are controlled to turn on. According to some other embodiments, after the first clamp switch and the second clamp switch in each bridge leg are controlled to turn on, the normal control signals of the first internal switch and the second internal switch in each bridge leg are recovered after the first delay time.

According to some embodiments, recovering the normal control signal of the internal switches may refer to controlling the internal switches according to the control signal after the normal operation of the converter. For example, when it is calculated that a certain bridge leg should be in the first state after normal operation, the controller controls the first internal switch of the bridge leg to turn on and the second internal switch to turn off.

At block S1503, after a second delay time, the normal control signals of the first clamp switch and the second clamp switch in each bridge leg are recovered. The recovery of the normal control signals of the clamp switches is consistent with the recovery of the normal control signals of the internal switches, i.e., the clamp switch is controlled according to the control signal after the normal operation of the converter.

At block S1505, after a third delay time, the normal control signals of the first external switch and the second external switch in each bridge leg are recovered. The recovery of the normal control signal of the external switch is consistent with the recovery of the normal control signal of the internal switch, i.e., the external switch is controlled according to the control signal after the normal operation of the converter.

According to some embodiments, the first delay time and the second delay time may be greater than the time for the active switching device in the switch to complete the on process, and the third delay time may be greater than the time for the active switching device in the switch to complete the off process. In an example, the first delay time, the second delay time and the third delay time may be between 0.1 us and 50 us, but are not limited to this range. The first delay time and the second delay time may be the same or different, and the third delay time may be the same as or different from the first delay time or the second delay time.

As described in Table 1, when the bridge leg is in the first state after normal operation, the first external switch 211 and the first internal switch 212 are turned on, and the remaining switches 213-216 are turned off, thus the normal control signals of the first external switch 211 and the first internal switch 212 are the signals of turning on, and the normal control signals of the remaining switches 213-216 are the signals of turning off.

FIGS. 16a-16e are schematic diagrams illustrating a process in which a bridge leg starts to operate when the bridge leg will be in the first state and the output current will be a positive current in the normal working state in accordance with some embodiments, such as an exemplary embodiment.

Figure 16A:
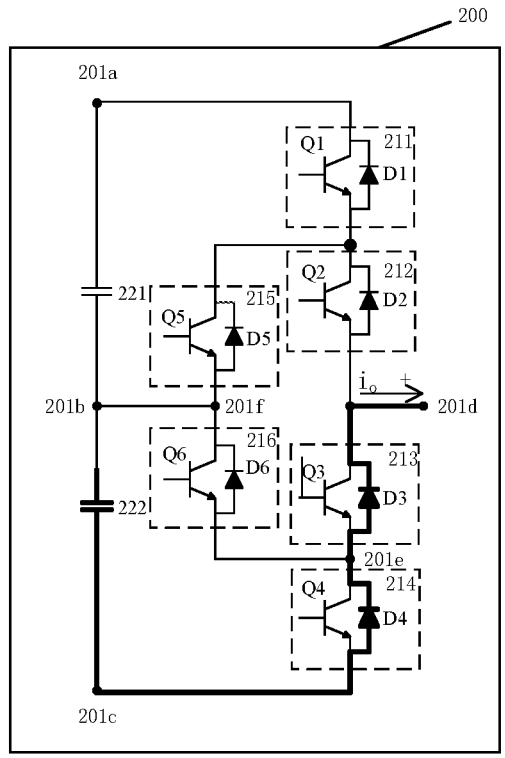
FIGS. 16a-16e are schematic diagrams illustrating a process in which a bridge leg starts to operate when the bridge leg will be in the first state and the output current will be a positive current in the normal working state in accordance with some embodiments, such as an exemplary embodiment.

When the bridge leg 200 is in the state of stopping operation and the output current $i_o$ is a positive current, the state of the bridge leg 200 is shown in FIG. 16a. In this case, the output current $i_o$ of the bridge leg 200 flows through the third input terminal 201c, the diode in the second external switch 214, the diode in the second internal switch 213, and the output terminal 201d.

Figure 16B:
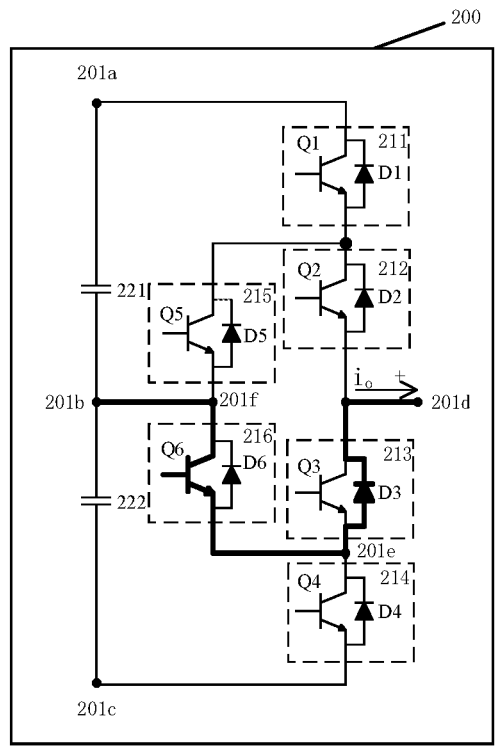

After the bridge leg 200 receives the control signal for controlling the first clamp switch 215 and the second clamp switch 216 to turn on, the state of the bridge leg 200 is illustrated in FIG. 16b. After the first delay time, and after the bridge leg 200 receives the control signal for controlling the first internal switch 212 and the second internal switch 213 to turn off, the state of the bridge leg 200 is shown in FIG. 16c.

As shown in FIG. 16b, in response to receiving the signal of turning on, the first clamp switch 215 and the second clamp switch 216 are switched from off to on. In this case, the first clamp switch 215 and the second clamp switch 216 are turned on, and the remaining switches 211-214 are turned off. The output current $i_o$ flows through the second input terminal 201b, the IGBT in the second clamp switch 216, the diode in the second internal switch 213, and the output terminal 201d.

As can be seen from FIG. 16a and FIG. 16b, during the process that the first clamp switch 215 and the second clamp switch 216 are turned on, the current is switched from the second external switch 214 to the second clamp switch 216. Thus, the voltage stress experienced by the second external switch 214 is $U_{dc}+U_{para}$, where $U_{para}$ is the voltage on the parasitic inductance of the commutation loop. The commutation loop is node 201f-node 201e-third input terminal 201c-second input terminal 201b-node 201f.

Figure 16C:
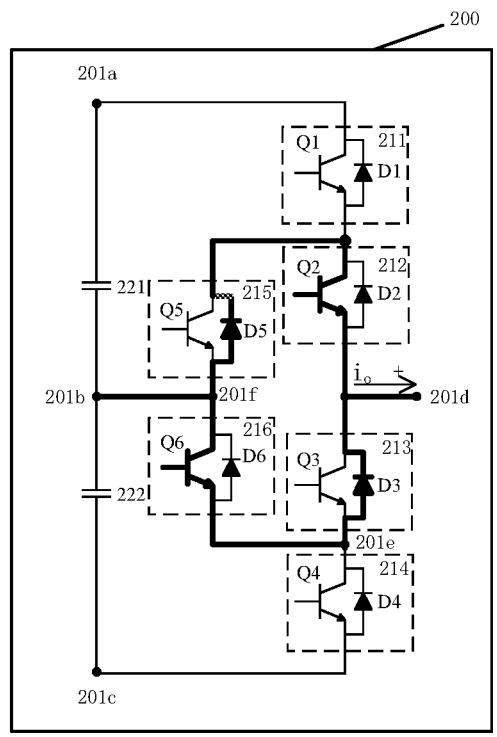

As shown in FIG. 16c, in response to receiving the signal of turning on, the first internal switch 212 is switched from off to on; in response to receiving the signal of turning off, the second internal switch 213 remains off. In this case, the first internal switch 212, the first clamp switch 215, and the second clamp switch 216 are turned on, and the remaining switches 211, 213, and 214 are turned off. The output current $i_o$ flows through the second input terminal 201b, two sets of switches 212, 213, 215, 216 connected in parallel, and the output terminal 201d. The output current $i_o$ flows through the diode in the first clamp switch 215 and the IGBT in the first internal switch 212, and flows through the IGBT in the second clamp switch 216 and the diode in the second internal switch 213.

After the bridge leg 200 simultaneously receives the control signal for controlling the first internal switch 212, the first clamp switch 215, and the second clamp switch 216 to turn on, and the control signal for controlling the second internal switch 213 to turn off, the first internal switch 212, the first clamp switch 215 and the second clamp switch 216 are switched from off to on, and the remaining switches 211, 213, and 214 remain off. The state of the bridge leg 200 is the same as described with reference to FIG. 16c.

As can be seen from FIG. 16a and FIG. 16c, during the process that the first internal switch 212, the first clamp switch 215, and the second clamp switch 216 are turned on, the current is switched from flowing through the second external switch 214 and the second internal switch 213 to flowing through two sets of internal switches and clamp switches connected in parallel. Based on Kirchhoff voltage law, the voltage stress experienced by the second external switch 214 is $U_{dc}+U_{para1}+U_{para2}$, where $U_{para1}$ is the voltage of the parasitic inductance on the path of node 201f-node 201e, and $U_{para2}$ is the voltage of the parasitic inductance on the path of node 201e-the third input terminal 201c-the second input terminal 201b-node 201f.

Compared with the case where the current is switched from the second external switch 214 and the second internal switch 213 to the second clamp switch 216 and the second internal switch 213 as described with reference to FIG. 16a and FIG. 16b, when the current is switched from flowing through the second external switch 214 and the second internal switch 213 to flowing through two sets of internal switches and clamp switches connected in parallel, the voltage of the parasitic inductance on the path of the node 201e-the third input terminal 201c-the second input terminal 201b-the node 201f is the same. Since the current is merely partially switched to the second clamp switch 216, the voltage of the parasitic inductance on the path of node 201f-node 201e is reduced. Thus, when the current is switched from flowing through the second external switch 214 and the second internal switch 213 to flowing through two sets of internal switches and clamp switches connected in parallel, the voltage stress experienced by the second external switch 214 should be less than that of the second external switch 214 when the current is switched from flowing through the second external switch 214 and the second internal switch 213 to flowing through the second clamp switch 216 and the second internal switch 213.

Figure 16D:
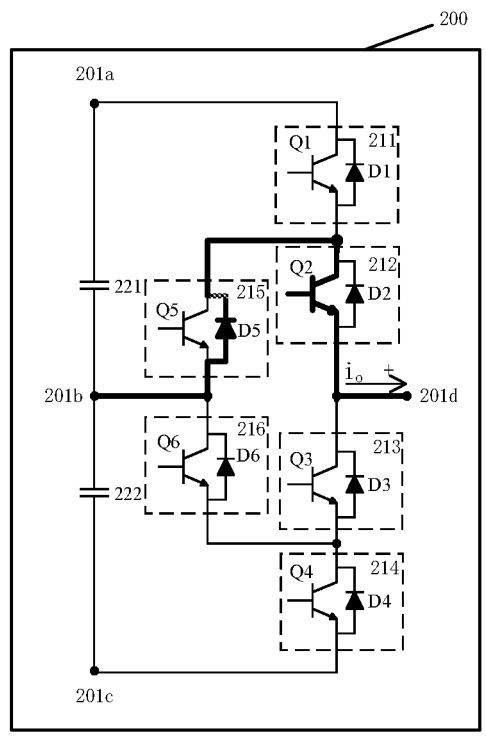

After the bridge leg 200 receives the control signal for controlling the first clamp switch 215 and the second clamp switch 216 to turn off, the state of the bridge leg 200 is shown in FIG. 16d. In response to receiving the signal of turning off, the first clamp switch 215 and the second clamp switch 216 are switched from on to off. In this case, the first internal switch 212 is turned on, and the remaining switches 211, 213-216 are turned off. The output current $i_o$ flows through the second input terminal 201b, the diode in the first clamp switch 215, the IGBT in the first internal switch 212, and the output terminal 201d.

As can be seen from FIG. 16c and FIG. 16d, during the process that the first clamp switch 215 and the second clamp switch 216 are turned off, the current is switched from the diode in the second internal switch 213 and the IGBT in the second clamp switch 216 to the IGBT in the first internal switch 212 and the diode in the first clamp switch 215, thus the voltage stress experienced by the first internal switch 212 is merely from the voltage on the parasitic inductance in the commutation loop.

Figure 16E:
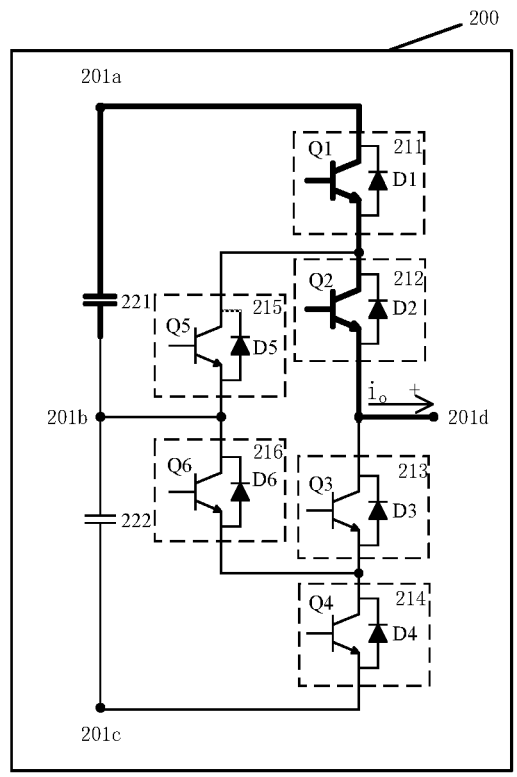

After the bridge leg 200 receives the control signal for controlling the first external switch 211 to turn on and the second external switch 214 to turn off, the state of the bridge leg 200 is shown in FIG. 16e. In response to receiving the signal of turning on, the first external switch 211 is switched from off to on; in response to receiving the signal of turning off, the second external switch 214 remains off. In this case, the first external switch 211 and the first internal switch 212 are turned on, and the remaining switches 213-216 are turned off. The output current $i_o$ flows through the first input terminal 201a, the IGBT in the first external switch 211, the IGBT in the first internal switch 212, and the output terminal 201d.

As can be seen from FIG. 16d and FIG. 16e, during the process that the first external switch is on, the current is switched from the first clamp switch 215 to the first external switch 211, and the voltage stress experienced by the first clamp switch 215 is $U_{dc}+U_{para}$, where $U_{para}$ is the voltage on the parasitic inductance of the commutation loop.

FIGS. 17a-17e are schematic diagrams illustrating a process in which a bridge leg starts to operate when the bridge leg will be in the first state and the output current will be a negative current in the normal working state in accordance with some embodiments, such as an exemplary embodiment.

Figure 17A:
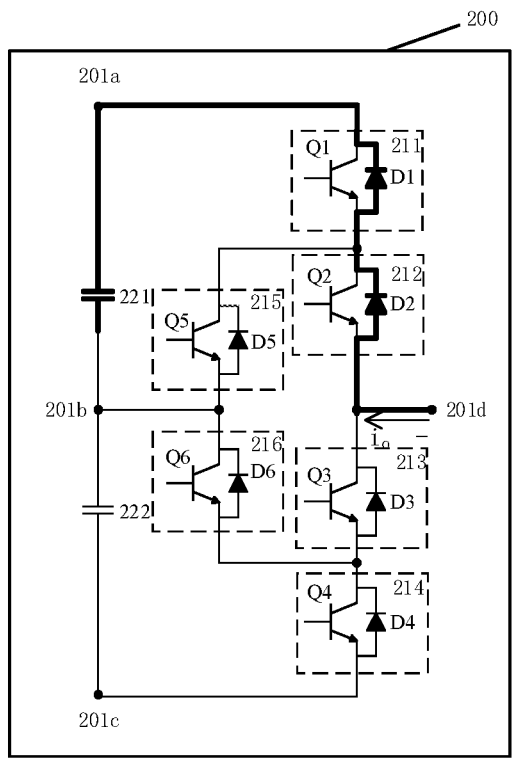
FIGS. 17a-17e are schematic diagrams illustrating a process in which a bridge leg starts to operate when the bridge leg will be in the first state and the output current will be a negative current in the normal working state in accordance with some embodiments, such as an exemplary embodiment.

When the bridge leg 200 is in the state of stopping operation and the output current $i_o$ is a negative current, the state of the bridge leg 200 is shown in FIG. 17a. In this case, the output current $i_o$ of the bridge leg 200 flows through the output terminal 201d, the diode in the first internal switch 212, the diode in the first external switch 211, and the first input terminal 201a.

Figure 17B:
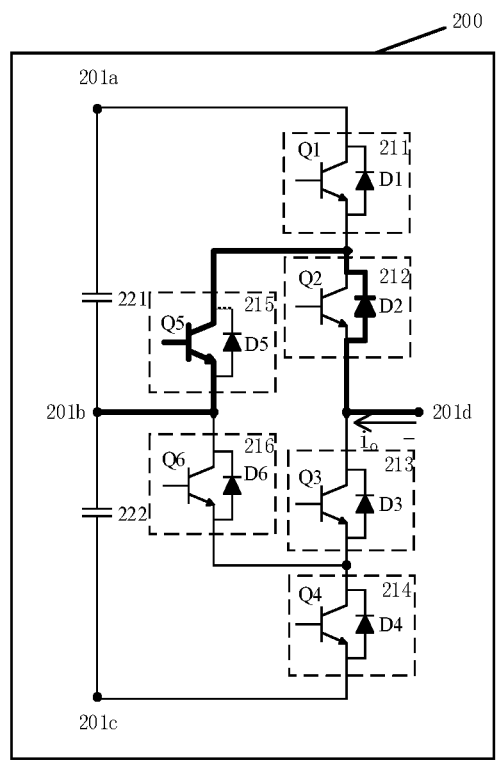

After the bridge leg 200 receives the control signal for controlling the first clamp switch 215 and the second clamp switch 216 to turn on, the state of the bridge leg 200 is shown in FIG. 17b. After the first delay time, after the bridge leg 200 receives the control signal for controlling the first internal switch 212 and the second internal switch 213 to turn off, the state of the bridge leg 200 is shown in FIG. 17c.

As shown in FIG. 17b, in response to receiving the signal of turning on, the first clamp switch 215 and the second clamp switch 216 are switched from off to on. In this case, the first clamp switch 215 and the second clamp switch 216 are turned on, and the remaining switches 211-214 are turned off. The output current $i_o$ flows through the output terminal 201d, the diode in the first internal switch 212, the IGBT in the first clamp switch 215, and the second input terminal 201b.

As can be seen from FIG. 17a and FIG. 17b, during the process that the first clamp switch 215 and the second clamp switch 216 are turned on, the current is switched from the first external switch 211 to the first clamp switch 215, and the voltage stress experienced by the first external switch 211 is $U_{dc}+U_{para}$, where $U_{para}$ is the voltage on the parasitic inductance of the commutation loop.

Figure 17C:
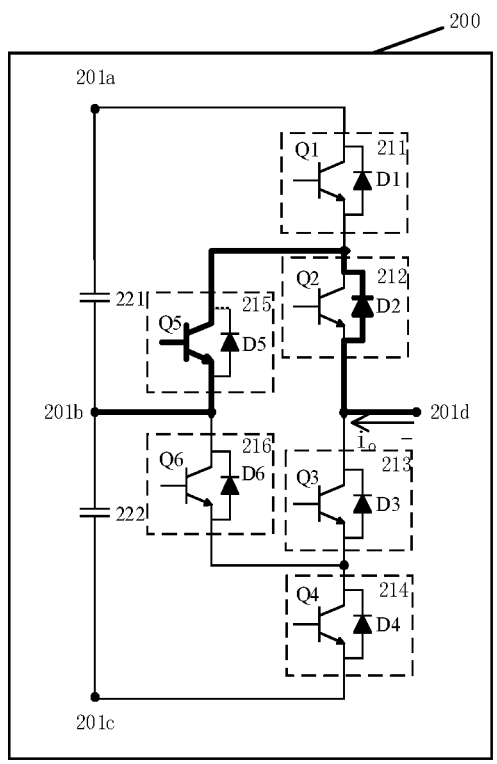

As shown in FIG. 17c, in response to receiving the signal of turning on, the first internal switch 212 is switched from off to on; in response to receiving the signal of turning off, the second internal switch 213 remains off. In this case, the first internal switch 212, the first clamp switch 215, and the second clamp switch 216 are turned on, and the remaining switches 211, 213, and 214 are turned off. The output current $i_o$ still flows through the output terminal 201d, the diode in the first internal switch 212, the IGBT in the first clamp switch 215, and the second input terminal 201b.

After the bridge leg 200 simultaneously receives the control signal for controlling the first internal switch 212, the first clamp switch 215, and the second clamp switch 216 to turn on, and the control signal for controlling the second internal switch 213 to turn off, the first internal switch 212, the first clamp switch 215 and the second clamp switch 216 are switched from off to on, and the remaining switches 211, 213, and 214 remain off. The state of the bridge leg 200 is the same as described with reference to FIG. 17c.

As can be seen from FIG. 17a and FIG. 17c, during the process that the first internal switch 212, the first clamp switch 215, and the second clamp switch 216 are turned on, the current is switched from the first external switch 211 to the first clamp switch 215. The voltage stress experienced by the external switch 211 is $U_{dc}+U_{para}$, where $U_{para}$ is the voltage on the parasitic inductance of the commutation loop.

Figure 17D:
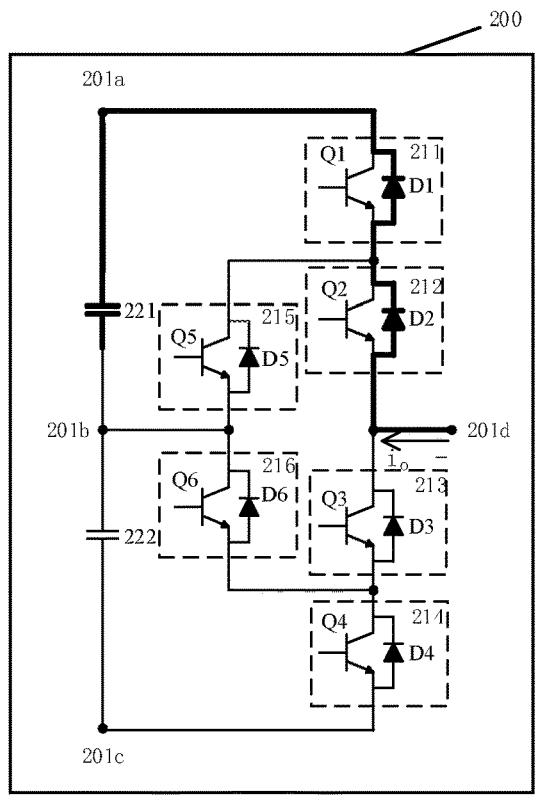

After the bridge leg 200 receives the control signal for controlling the first clamp switch 215 and the second clamp switch 216 to turn off, the state of the bridge leg 200 is shown in FIG. 17d. In response to receiving the signal of turning off, the first clamp switch 215 and the second clamp switch 216 are switched from on to off. In this case, the first internal switch 212 is turned on, and the remaining switches 211, 213-216 are turned off. The output current $i_o$ flows through the output terminal 201d, the diode in the first internal switch 212, the diode in the first external switch 211, and the first input terminal 201a.

As can be seen from FIG. 17c and FIG. 17d, during the process that the first clamp switch 215 and the second clamp switch 216 are turned off, the current is switched from the first clamp switch 215 to the first external switch 211, and the voltage stress experienced by the first clamp switch 215 is $U_{dc}+U_{para}$, wherein $U_{para}$ is the voltage on the parasitic inductance of the commutation loop.

Figure 17E:
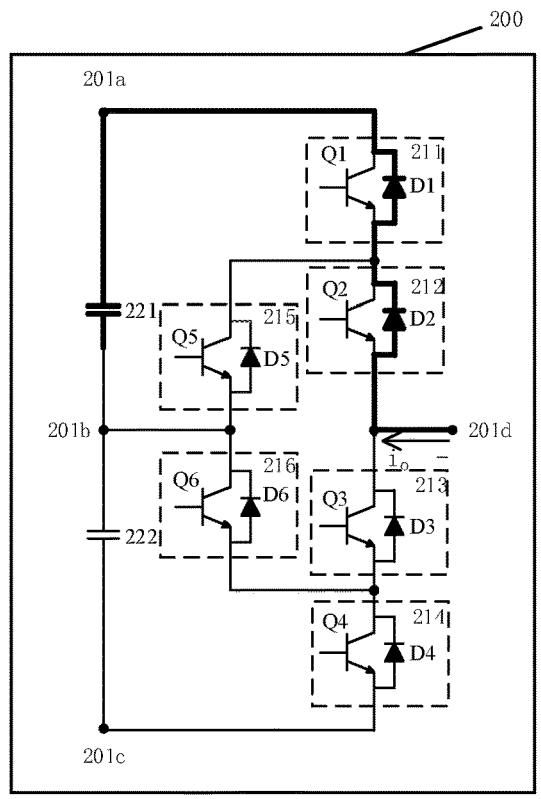

After the bridge leg 200 receives the control signal for controlling the first external switch 211 to turn on, and the control signal for controlling the second external switch 214 to turn off, the state of the bridge leg 200 is shown in FIG. 17e. In response to receiving the signal of turning on, the first external switch 211 is switched from off to on; in response to receiving the signal of turning off, the second external switch 214 remains off. In this case, the first external switch 211 and the first internal switch 212 are turned on, and the remaining switches 213-216 are turned off. The output current $i_o$ still flows through the output terminal 201d, the diode in the first internal switch 212, the diode in the first external switch 211, and the first input terminal 201a.

As described in Table 1, when the bridge leg is in the first state after normal operation, the first external switch 211 and the first internal switch 212 are turned on, the remaining switches 213-216 are turned off, thus the normal control signals of the first external switch 211 and the internal switch 212 are the signals of turning on, and the normal control signals of the remaining switches 213-216 are the signals of turning off; when the bridge leg is in the second state after normal operation, the first internal switch 212 and the first clamp switch 215 are turned on, and the remaining switches 211, 213, 214, and 216 are turned off, thus the normal control signals of the first internal switch 212 and the first clamp switch 215 are the signals of turning on, and the normal control signals of the remaining switches 211, 213, 214, and 216 are the signals of turning off.

Because when the bridge leg is in the first state or the second state after normal operation, the normal control signals of the first internal switch 212 and the second internal switch 213 are the same (i.e., the normal control signal of the first internal switch 212 is the signal of turning on, and the normal control signal of the second internal switch 213 is the signal of turning off). Therefore, when the bridge leg is in the first state or the second state after normal operation, thus the process from the start of operation of the bridge leg to the recovery of the normal control signal of the internal switch is the same.

FIGS. 18a-18e are schematic diagrams illustrating a process in which a bridge leg starts to operate when the bridge leg will be in the second state and the output current will be a positive current in the normal working state according to some exemplary embodiments of the present disclosure.

Figure 18A:
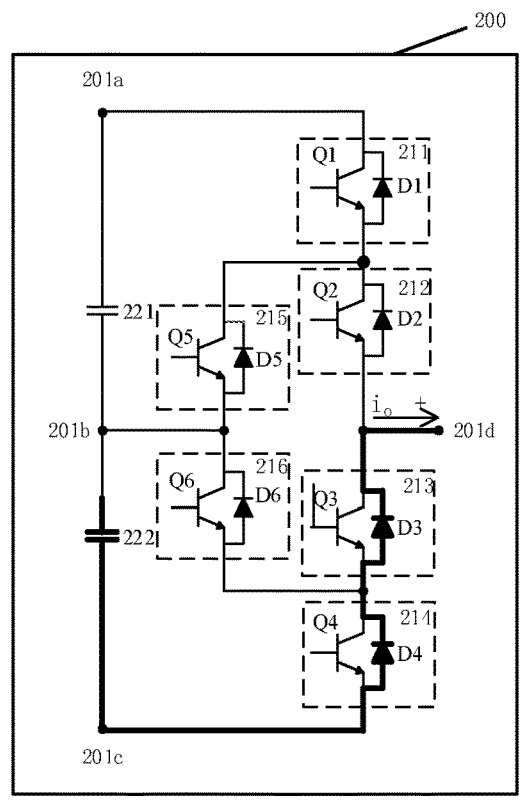
FIGS. 18a-18e are schematic diagrams illustrating a process in which a bridge leg starts to operate when the bridge leg will be in the second state and the output current will be a positive current in the normal working state according to some exemplary embodiments of the present disclosure.
Figure 18B:
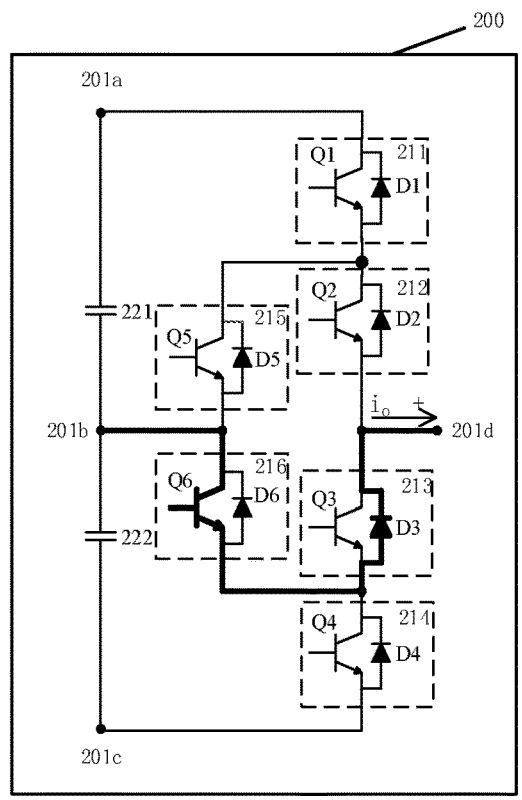
Figure 18C:
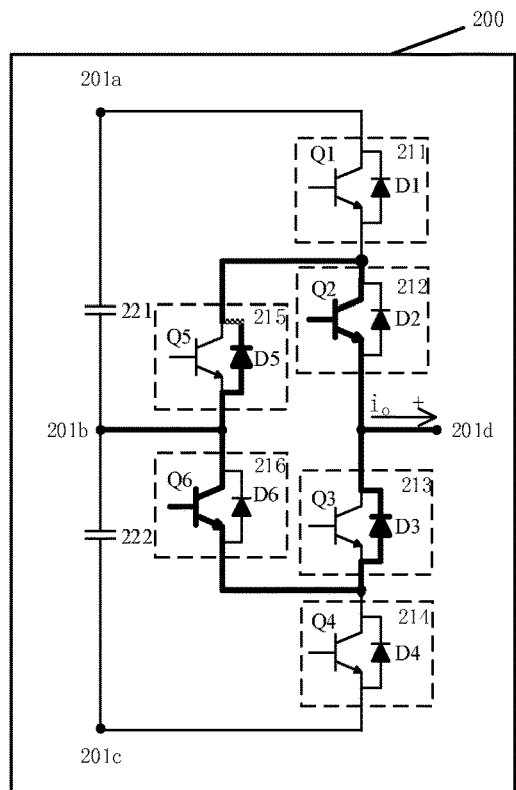

FIGS. 18a-18c illustrate the process from the start of the operation of the bridge leg to the recovery of the normal control signal of the internal switch. FIG. 18a shows the state where the output current is a positive current when the bridge leg starts to operate. FIG. 18b shows the state where the bridge leg receives the control signal for controlling the first clamp switch 215 and second clamp switch 216 to turn on. FIG. 18c shows the state where the bridge leg receives the control signal for controlling the first internal switch 212 to turn on and the second internal switch 213 to turn off. The state of bridge leg 200 in FIGS. 18a-18c is the same as the state of bridge leg 200 in FIG. 16a-16c.

Figure 18D:
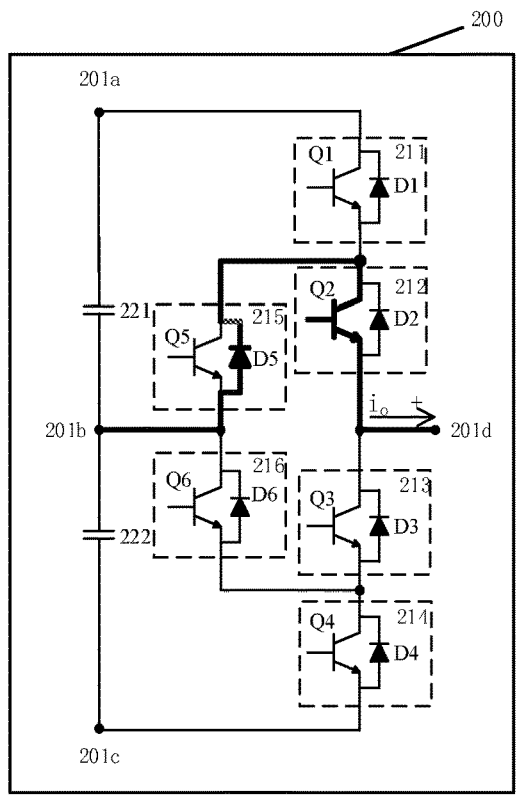

After the bridge leg 200 receives the control signal for controlling the first clamp switch 215 to turn on and the second clamp switch 216 to turn off, the state of the bridge leg 200 is shown in FIG. 18d. In response to receiving the signal of turning on, the first clamp switch 215 remains on; in response to receiving the signal of turning off, the second clamp switch 216 is switched from on to off In this case, the first internal switch 212 and the first clamp switch 215 are turned on, and the remaining switches 211, 213, 214, and 216 are turned off. The output current $i_o$ flows through the second input terminal 201b, the diode in the first clamp switch 215, the IGBT in the first internal switch 212, and the output terminal 201d.

As can be seen from FIG. 18c and FIG. 18d, during the process that the second clamp switch 216 is turned off, the current is switched from the diode in the second internal switch 213 and the IGBT in the second clamp switch 216 to the IGBT in the first internal switch 211 and the diode in the first clamp switch 215, the voltage stress experienced by the first internal switch 212 is merely from the voltage on the parasitic inductance in the commutation loop.

Figure 18E:
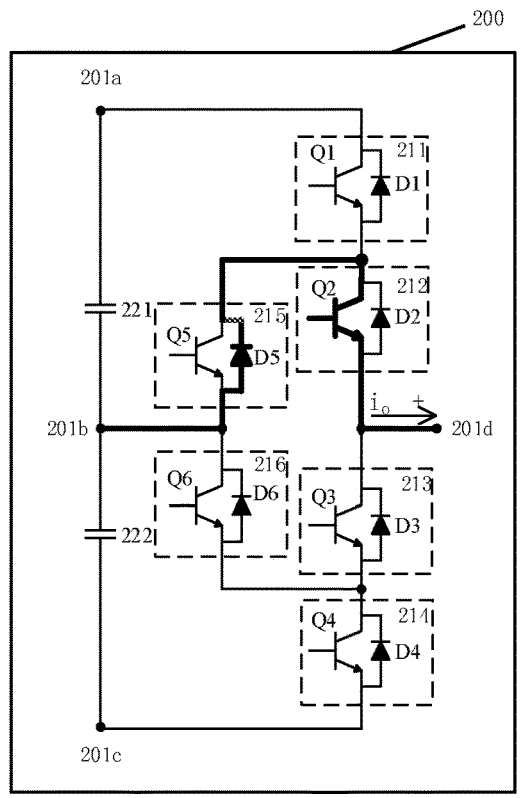

After the bridge leg 200 receives the control signal for controlling the first external switch 211 and the second external switch 214 to turn off, the state of the bridge leg 200 is shown in FIG. 18e. In response to receiving the signal of turning off, the first external switch 211 and the second external switch 214 remain off. In this case, the state of the bridge leg 200 is the same as described with reference to FIG. 18d.

FIGS. 19a-19e are schematic diagrams illustrating a process in which a bridge leg starts to operate when the bridge leg will be in the second state and the output current will be a negative current in the normal working state according to some exemplary embodiments of the present disclosure.

Figure 19A:
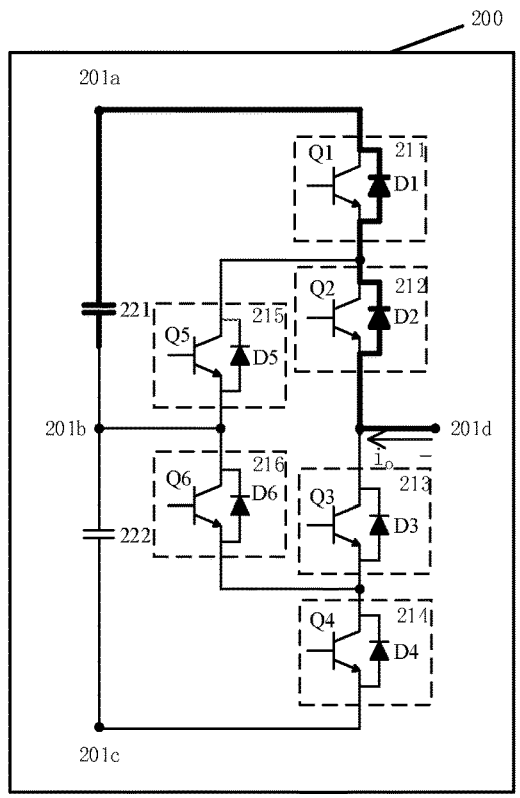
FIGS. 19a-19e are schematic diagrams illustrating a process in which a bridge leg starts to operate when the bridge leg will be in the second state and the output current will be a negative current in the normal working state according to some exemplary embodiments of the present disclosure.
Figure 19B:
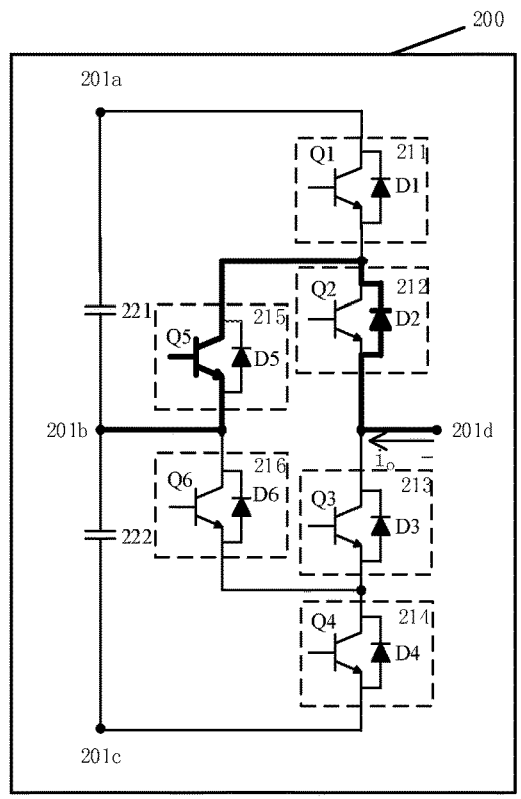
Figure 19C:
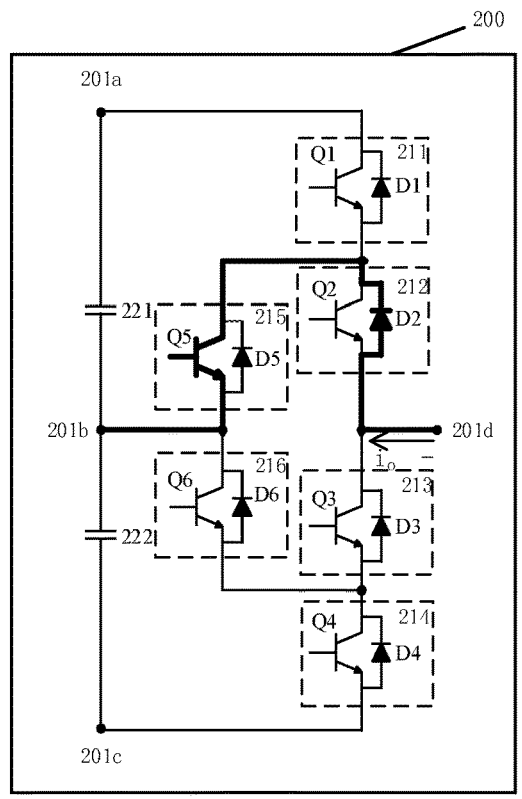

FIGS. 19a-19c show the process from the start of the operation of the bridge leg to the recovery of the normal control signal of the internal switch. FIG. 19a shows the state where the output current is a negative current when the bridge leg starts to operate. FIG. 19b shows the state where the bridge leg receives the control signal for controlling the first clamp switch 215 and second clamp switch 216 to turn on. FIG. 19c shows the state where the bridge leg receives the control signal for controlling the first internal switch 212 to turn on and the second internal switch 213 to turn off. The state of bridge leg 200 in FIGS. 19a-19c is the same as the state of bridge leg 200 in FIG. 17a-17c.

Figure 19D:
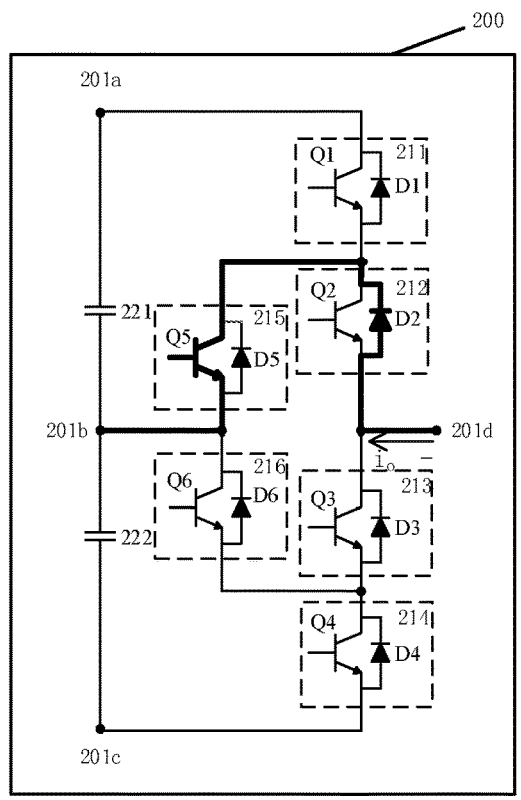

After the bridge leg 200 receives the control signal for controlling the first clamp switch 215 to turn on and the second clamp switch 216 to turn off, the state of the bridge leg 200 is shown in FIG. 19d. In this case, the first internal switch 212 and the first clamp switch 215 are turned on, and the remaining switches 211, 213, 214, and 216 are turned off. The output current $i_o$ flows through the output terminal 201d, the diode in the first internal switch 212, the IGBT in the first clamp switch 215, and the second input terminal 201b.

With reference to FIGS. 19b-19d, the flowing path of the current does not change.

Figure 19E:
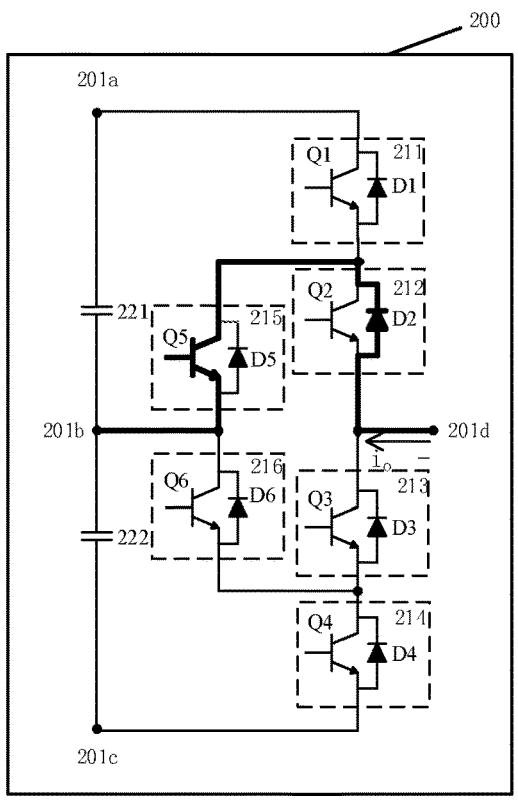
Figure 20A:
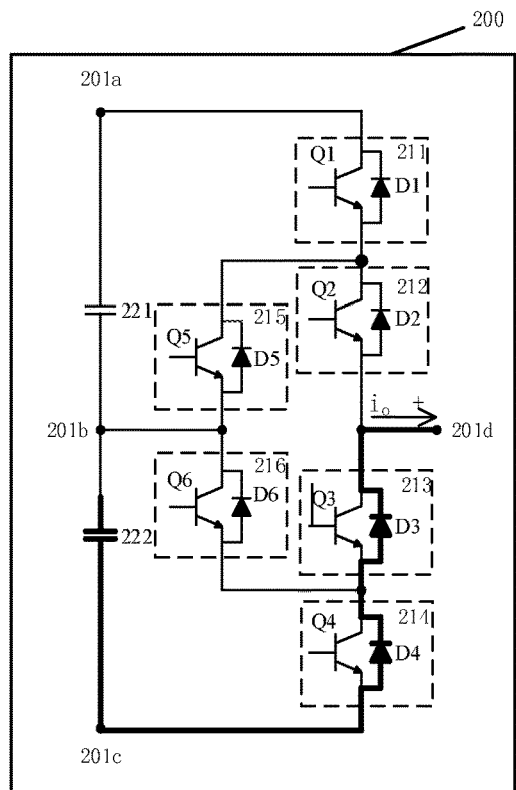
FIGS. 20a-20e are schematic diagrams illustrating a process in which a bridge leg starts to operate when the bridge leg will be in the third state and the output current will be a positive current in the normal working state according to some exemplary embodiments of the present disclosure.
Figure 20B:
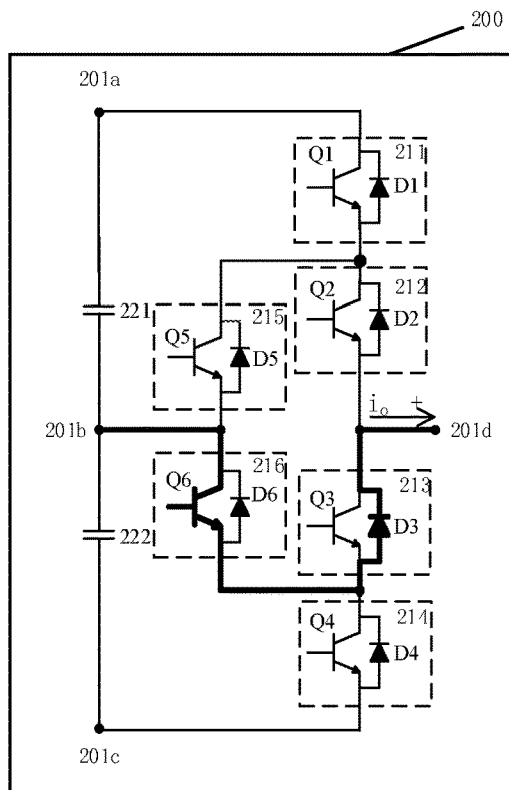
Figure 20C:
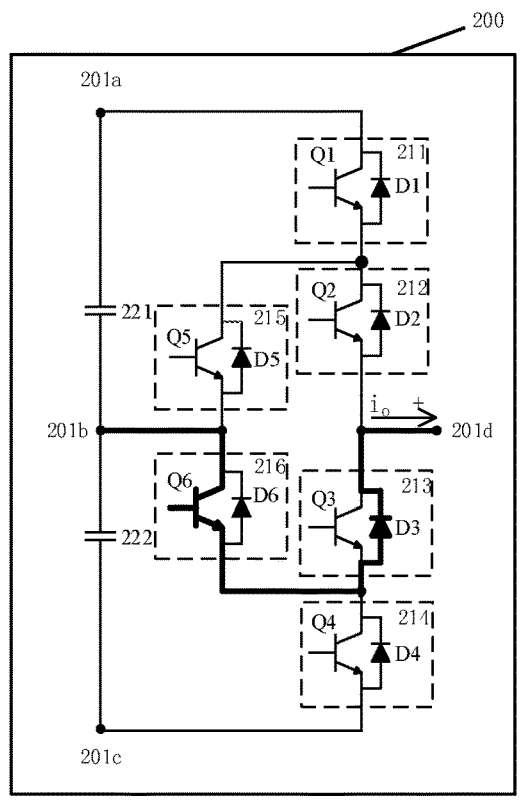
Figure 20D:
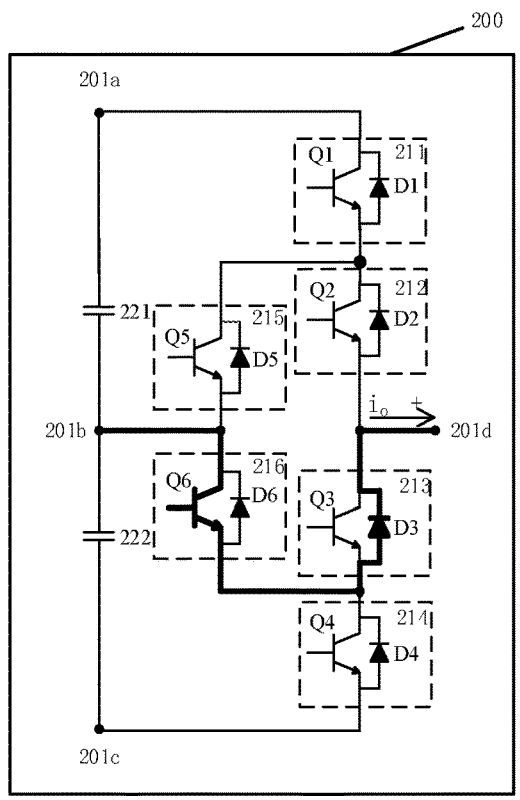
Figure 20E:
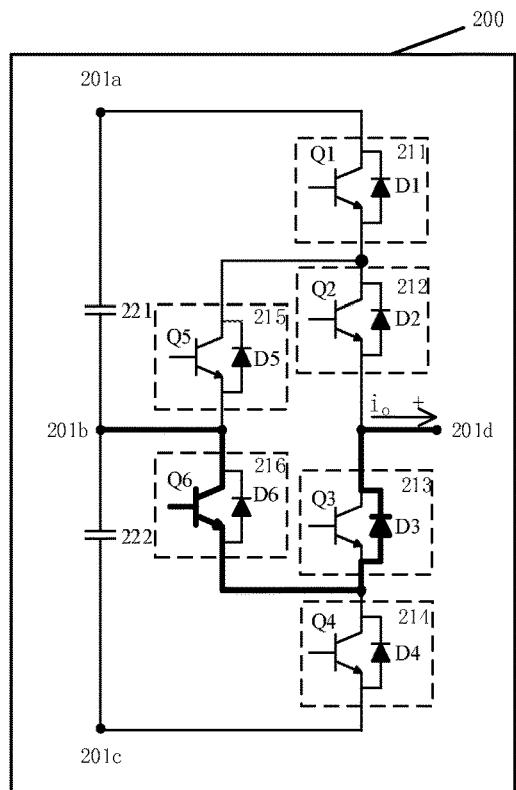
Figure 21A:
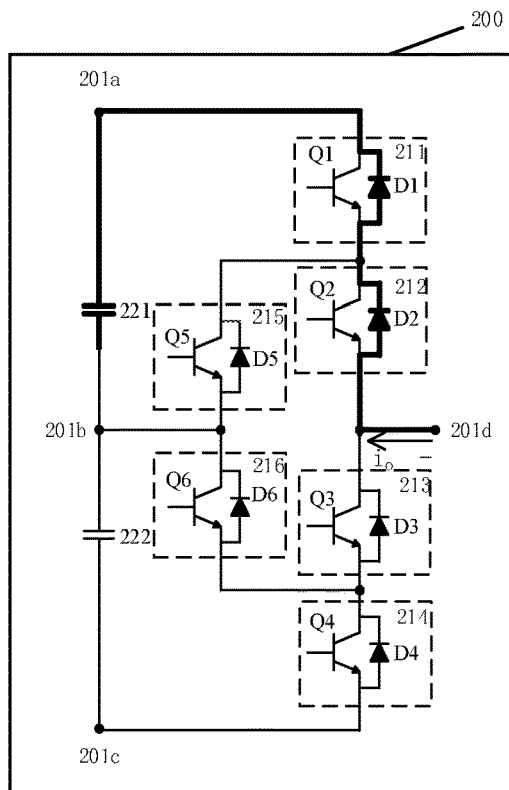
FIGS. 21a-21e are schematic diagrams illustrating a process in which a bridge leg starts to operate when the bridge leg will be in the third state and the output current will be a negative current in the normal working state according to some exemplary embodiments of the present disclosure.
Figure 21B:
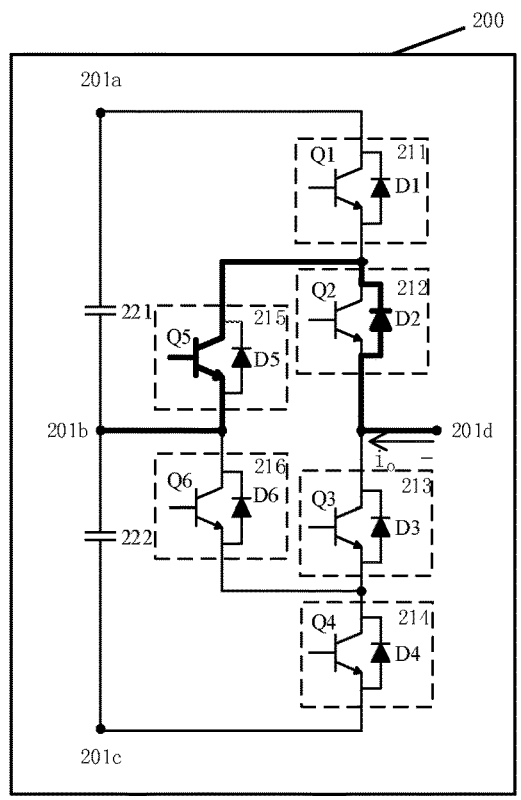
Figure 21C:
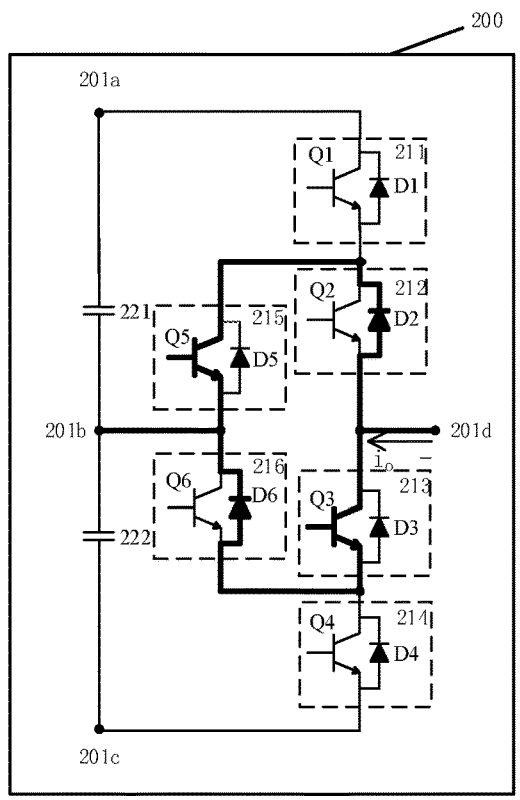
Figure 21D:
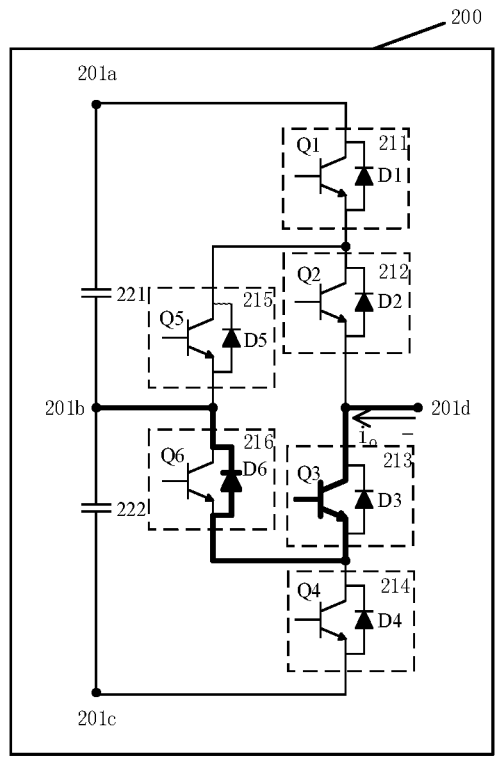
Figure 21E:
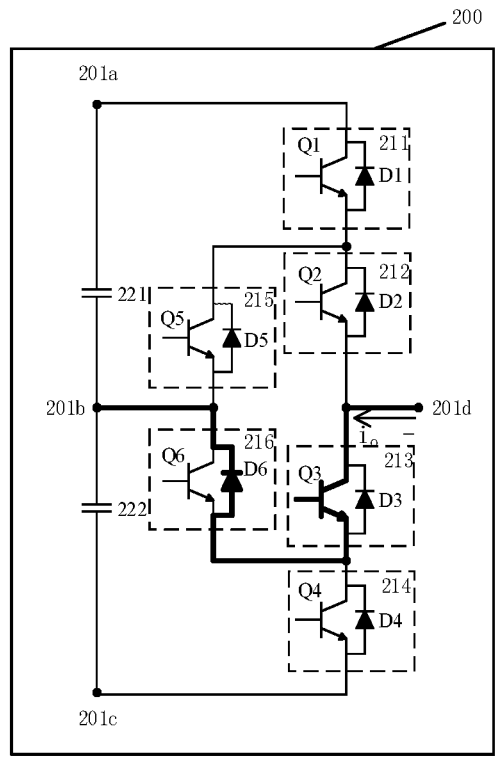

After the bridge leg 200 receives the control signal for controlling the first external switch 211 and the second external switch 214 to turn off, the state of the bridge leg 200 is shown in FIG. 19e. In response to receiving the signal of turning off, the first external switch 211 and the second external switch 214 remain off. In this case, the state of the bridge leg 200 is the same as described with reference to FIG. 19d.

FIGS. 20a-20e are schematic diagrams illustrating a process in which a bridge leg starts to operate when the bridge leg will be in the third state and the output current will be a positive current in the normal working state according to some exemplary embodiments of the present disclosure. The process in which the bridge leg 200 starts to operate is similar to the process in which the bridge leg starts to operate when the bridge leg is in the second state and the output current is the negative current as described with reference to FIGS. 19a-19e.

FIGS. 21a-21e are schematic diagrams illustrating a process in which a bridge leg starts to operate when the bridge leg will be in the third state and the output current will be a negative current in the normal working state according to some exemplary embodiments of the present disclosure. The process in which the bridge leg 200 starts to operate is similar to the process in which the bridge leg starts to operate when the bridge leg is in the second state and the output current is the positive current as described with reference to FIGS. 18a-18e.

As described in Table 1, when the bridge leg is in the fourth state after normal operation, the first internal switch 212, the first clamp switch 215, the second internal switch 213, the second clamp switch 216 are turned on, and the remaining switches 211, 214 are turned off. Thus, the normal control signals of the first internal switch 212, the first clamp switch 215, the second internal switch 213, and the second clamp switch 216 are the signals of turning on, and the normal control signals of the remaining switches 211, 214 are the signals of turning off.

FIGS. 22a-22e are schematic diagrams illustrating a process in which a bridge leg starts to operate when the bridge leg will be in the fourth state and the output current will be a positive current in the normal working state according to some exemplary embodiments of the present disclosure.

Figure 22A:
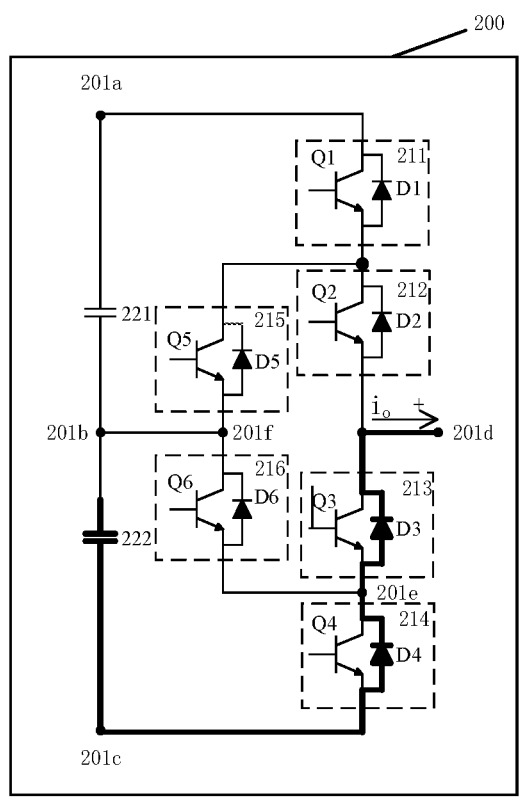
FIGS. 22a-22e are schematic diagrams illustrating a process in which a bridge leg starts to operate when the bridge leg will be in the fourth state and the output current will be a positive current in the normal working state according to some exemplary embodiments of the present disclosure.

When the bridge leg 200 is in the state of stopping operation and the output current $i_o$ is a positive current, the state of the bridge leg 200 is shown in FIG. 22a. In this case, the output current $i_o$ flows through the third input terminal 201c, the diode in the second external switch 214, the diode in the second internal switch 213, and the output terminal 201d.

Figure 22B:
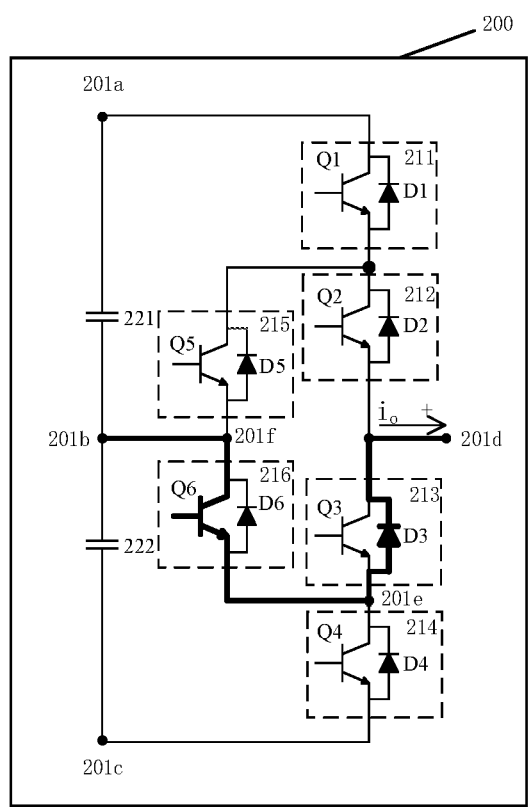

After the bridge leg 200 receives the control signal for controlling the first clamp switch 215 and the second clamp switch 216 to turn on, the state of the bridge leg 200 is shown in FIG. 22b. After the first delay time, and after the bridge leg 200 receives the control signal for controlling the first internal switch 212 and the second internal switch 213 to turn on, the state of the bridge leg 200 is shown in FIG. 22c.

As shown in FIG. 22b, in response to receiving the signal of turning on, the first clamp switch 215 and the second clamp switch 216 are switched from off to on. The output current $i_o$ flows through the second input terminal 201b, the IGBT in the second clamp switch 216, the diode in the second internal switch 213, and the output terminal 201d.

As can be seen from FIG. 22a and FIG. 22b, during the process that the first clamp switch 215 and the second clamp switch 216 are turned on, the current is switched from the second external switch 214 to the second clamp switch 216. Thus, the voltage stress experienced by the second external switch 214 is $U_{dc}+U_{para}$, where $U_{para}$ is the voltage on the parasitic inductance of the commutation loop.

Figure 22C:
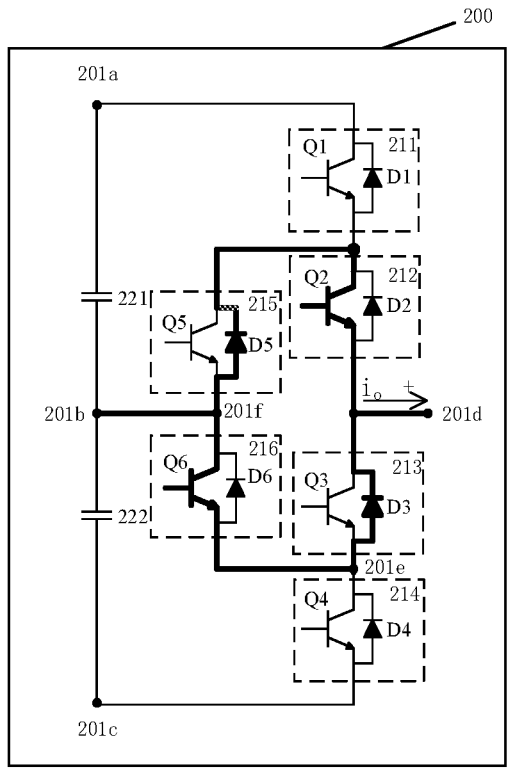

As shown in FIG. 22c, in response to receiving the signal of turning on, the first internal switch 212 and the second internal switch 213 are switched from off to on. In this case, the first internal switch 212, the second internal switch 213, the first clamp switch 215, and the second clamp switch 216 are turned on, and the remaining switches 211, 214 are turned off. The output current $i_o$ flows through the second input terminal 201b, two sets of switches 212, 213, 215, 216 connected in parallel, and the output terminal 201d. The output current $i_o$ flows through the diode in the first clamp switch 215 and the IGBT in the first internal switch 212, and flows through the IGBT in the second clamp switch 216 and the diode in the second internal switch 213.

After the bridge leg 200 simultaneously receives the control signal for controlling the first internal switch 212, the second internal switch 213, the first clamp switch 215, and the second clamp switch 216 to turn on, the first internal switch 212, the second internal switch 213, the first clamp switch 215, and the second clamp switch 216 are switched from off to on, and the remaining switches 211 and 214 remain off. The state of bridge leg 200 is the same as described with reference to FIG. 22c.

As can be seen from FIG. 22a and FIG. 22c that, during the process that the first internal switch 212, the second internal switch 213, the first clamp switch 215, and the second clamp switch 216 are on, the current is switched from flowing through the second external switch 214, the second internal switch 213 to flowing through the two sets of internal switches and clamp switches connected in parallel, the voltage stress experienced by the second external switch 214 is $U_{dc}+U_{para1}+U_{para2}$, wherein $U_{para1}$ is the voltage of the parasitic inductance on the path of node 201f-node 201e, $U_{para2}$ is the voltage of the parasitic inductance on the path of node 201e-the third input terminal 201c-the second input terminal 201b-node 201f.

Figure 22D:
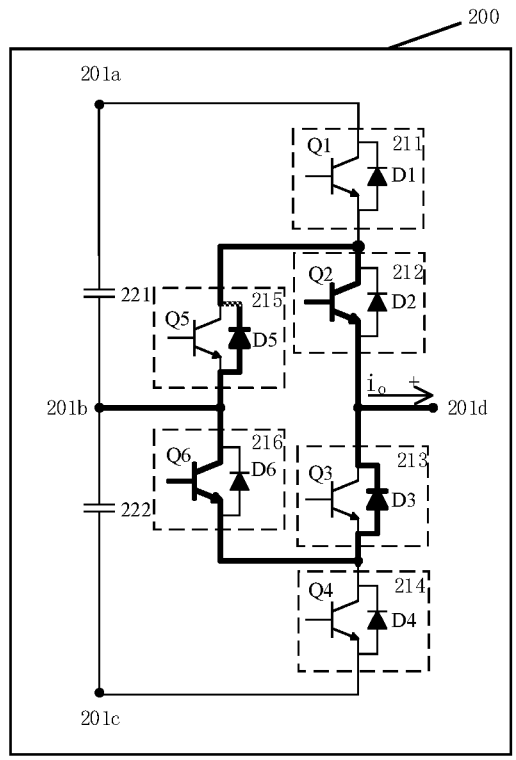

After the bridge leg 200 receives the control signal for controlling the first clamp switch 215 and the second clamp switch 216 to turn on, the state of the bridge leg 200 is shown in FIG. 22d. In response to receiving the signal of turning on, the first clamp switch 215 and the second clamp switch 216 remain on. In this case, the state of the bridge leg 200 is the same as described with reference to FIG. 22c.

Figure 22E:
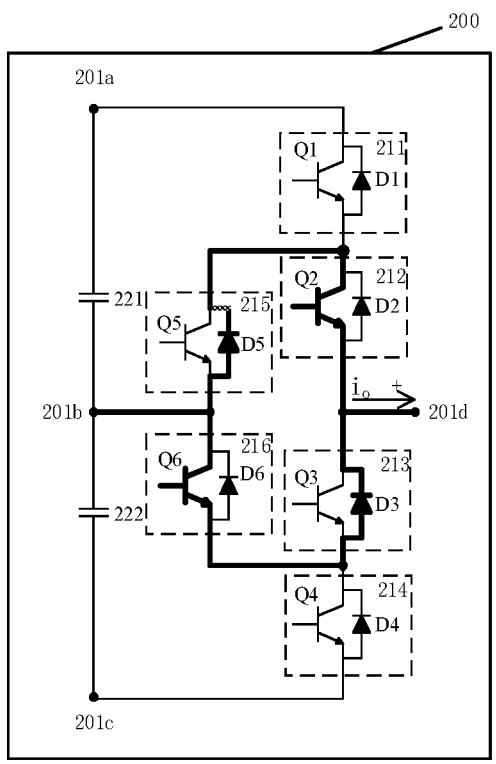

After the bridge leg 200 receives the control signal for controlling the first external switch 211 and the second external switch 214 to turn off, the state of the bridge leg 200 is shown in FIG. 22e. In response to receiving the signal of turning on, the first external switch 211 and the second external switch 214 remain off. In this case, the state of the bridge leg 200 is the same as described with reference to FIG. 22c.

FIGS. 23a-23e are schematic diagrams illustrating a process in which a bridge leg starts to operate when the bridge leg will be in the fourth state and the output current will be a negative current in the normal working state according to some exemplary embodiments of the present disclosure.

Figure 23A:
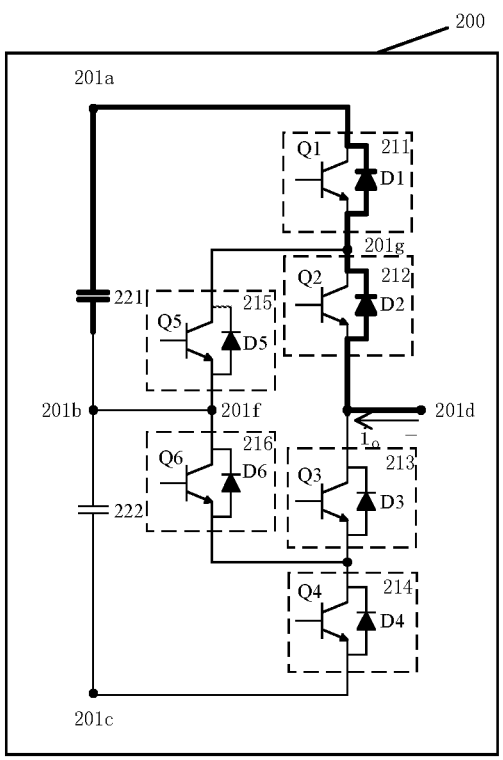
FIGS. 23a-23e are schematic diagrams illustrating a process in which a bridge leg starts to operate when the bridge leg will be in the fourth state and the output current will be a negative current in the normal working state according to some exemplary embodiments of the present disclosure.

When the bridge leg 200 is in the state of stopping operation and the output current $i_o$ is a negative current, the state of the bridge leg 200 is shown in FIG. 23a. In this case, the output current $i_o$ of the bridge leg 200 flows through the output terminal 201d, the diode in the first internal switch 212, the diode in the first external switch 211, and the first input terminal 201a.

Figure 23B:
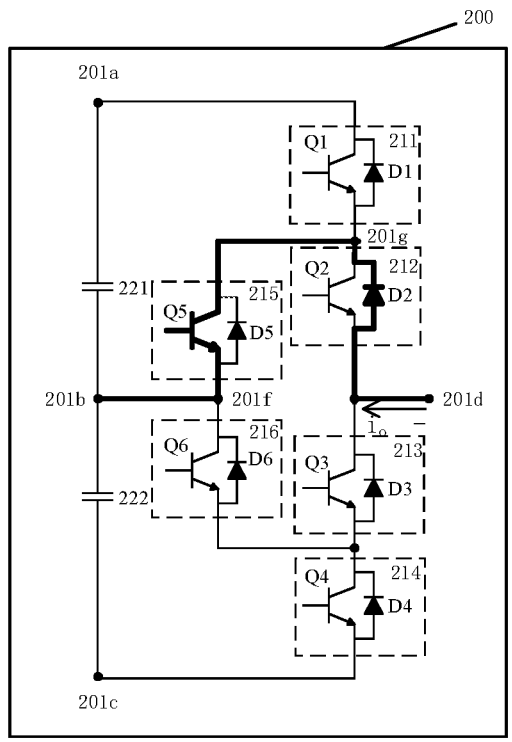

After the bridge leg 200 receives the control signal for controlling the first clamp switch 215 and the second clamp switch 216 to turn on, the state of the bridge leg 200 is shown in FIG. 23b. After the first delay time, and after the bridge leg 200 receives the control signal for controlling the first internal switch 212 and the second internal switch 213 to turn on, the state of the bridge leg 200 is shown in FIG. 23c.

As shown in FIG. 23b, in response to receiving the signal of turning on, the first clamp switch 215 and the second clamp switch 216 are switched from off to on. In this case, the first clamp switch 215 and the second clamp switch 216 are turned on, and the remaining switches 211-214 are turned off. The output current $i_o$ flows through the output terminal 201d, the diode in the first internal switch 212, the IGBT in the first clamp switch 215, and the second input terminal 201b.

As can be seen from FIG. 23a and FIG. 23b that, during the process that the first clamp switch 215 and the second clamp switch 216 are turned on, the current is switched from the first external switch 211 to the first clamp switch 215, and the voltage stress experienced by the first external switch 211 is $U_{dc}+U_{para}$, wherein $U_{para}$ is the voltage on the parasitic inductance of the commutation loop. The commutation loop is node 201f-node 201g-the first input terminal 201a-the second input terminal 201b-node 201f.

Figure 23C:
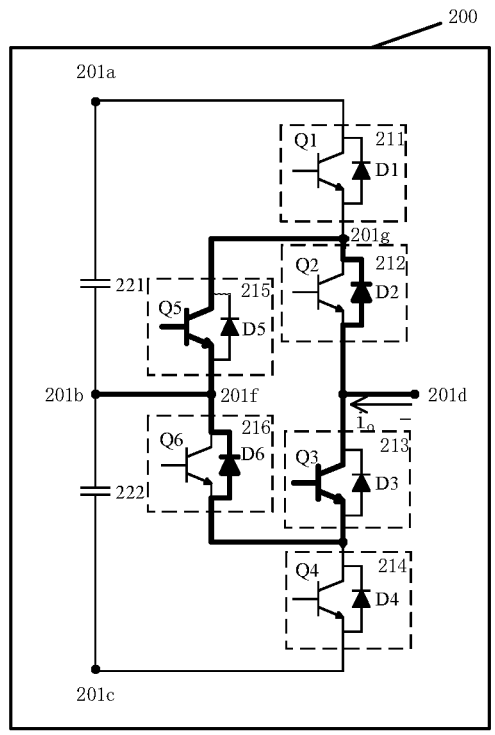

As shown in FIG. 23c, in response to receiving the signal of turning on, the first internal switch 212 and the second internal switch 213 are switched from off to on. In this case, the first internal switch 212, the second internal switch 213, the first clamp switch 215, and the second clamp switch 216 are turned on, and the remaining switches 211, 214 are turned off. The output current $i_o$ flows through the output terminal 201d, two sets of witches 212, 213, 215, 216 connected in parallel, and the second input terminal 201b, wherein the output current $i_o$ flows through the IGBT in the first clamp switch 215 and the diode in the first internal switch 212, and flows through the diode in the second clamp switch 216 and the IGBT in the second internal switch 213.

After the bridge leg 200 simultaneously receives the control signals for controlling the first internal switch 212, the second internal switch 213, the first clamp switch 215, and the second clamp switch 216 to turn on, the first internal switch 212, the second internal switch 213, the first clamp switch 215 and the second clamp switch 216 are switched from off to on, and the remaining switches 211 and 214 remain off. The state of the bridge leg 200 is the same as described with reference to FIG. 23c.

As can be seen from FIG. 23a and FIG. 23c that, during the process that the first internal switch 212, the second internal switch 213, the first clamp switch 215, and the second clamp switch 216 are turned on, the current is switched from flowing through the first external switch 211 and the second internal switch 212 to flowing through two sets of internal switches and clamp switches connected in parallel. Based on Kirchhoff voltage law, the voltage stress experienced by the first external switch 211 is $U_{dc}+U_{para3}+U_{para4}$, where $U_{para3}$ is the voltage of the parasitic inductance on the path of node 201f-node 201g, and $U_{para4}$ is the voltage of the parasitic inductance on the path of node 201f-the second input terminal 201b-the first input terminal 201a-node 201g.

Compared with the case where the current is switched from the first external switch 211 and the first internal switch 212 to the first clamp switch 215 and the first internal switch 212 as described with reference to FIG. 23a and FIG. 23b, when the current is switched from flowing through the first external switch 211 and the first internal switch 212 to flowing through two sets of internal switches and clamp switches connected in parallel, the voltage of the parasitic inductance on the path of the node 201f-the second input terminal 201b-the first input terminal 201a-the node 201g is the same. Since the current is merely partially switched to the first clamp switch 215, the voltage of the parasitic inductance on the path from node 201f-node 201g is reduced. Thus, when the current is switched from flowing through the first external switch 211 and the first internal switch 212 to two sets of internal switches and clamp switches connected in parallel, the voltage stress experienced by the first external switch 211 should be less than that of the first external switch 211 when the current is switched from the first external switch 211, the first internal switch 212 to the first clamp switch 215 and the first internal switch 212.

Figure 23D:
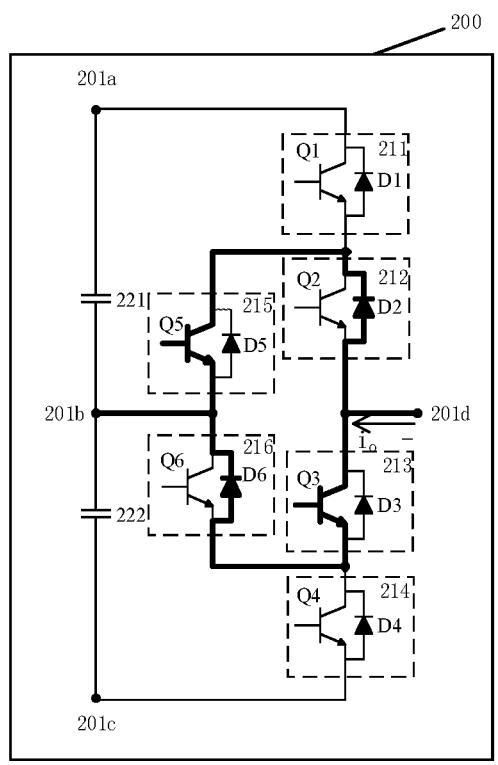

After the bridge leg 200 receives the control signal for controlling the first clamp switch 215 and the second clamp switch 216 to turn on, the state of the bridge leg 200 is shown in FIG. 23d. In response to receiving the signal of turning on, the first clamp switch 215 and the second clamp switch 216 remain on. In this case, the state of the bridge leg 200 is the same as described with reference to FIG. 23c.

Figure 23E:
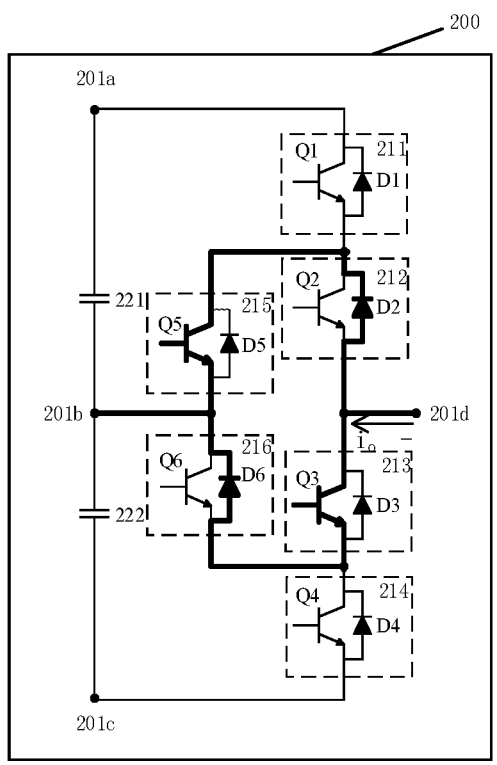
Figure 24A:
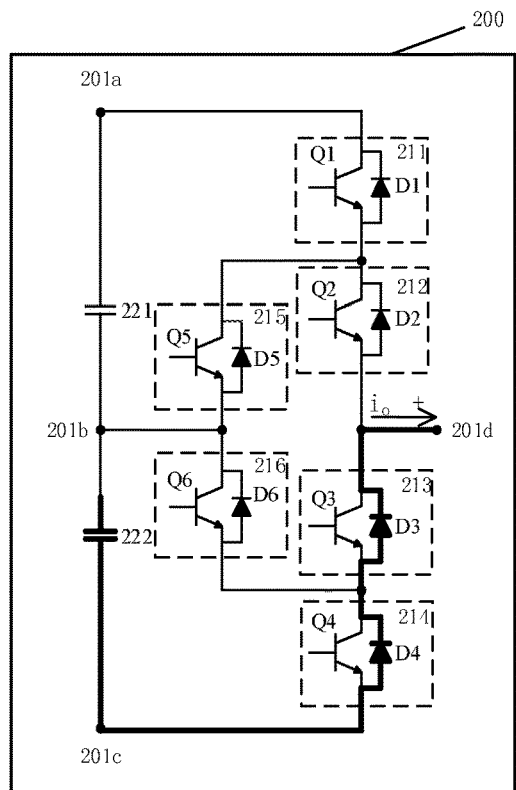
FIGS. 24a-24e are schematic diagrams illustrating a process in which a bridge leg starts to operate when the bridge leg will be in a fifth state and the output current will be a positive current in the normal working state according to some exemplary embodiments of the present disclosure.
Figure 24B:
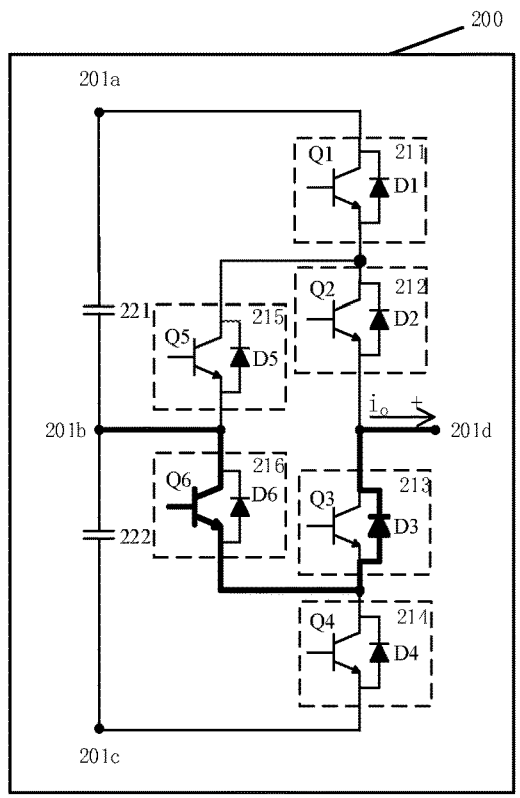
Figure 24C:
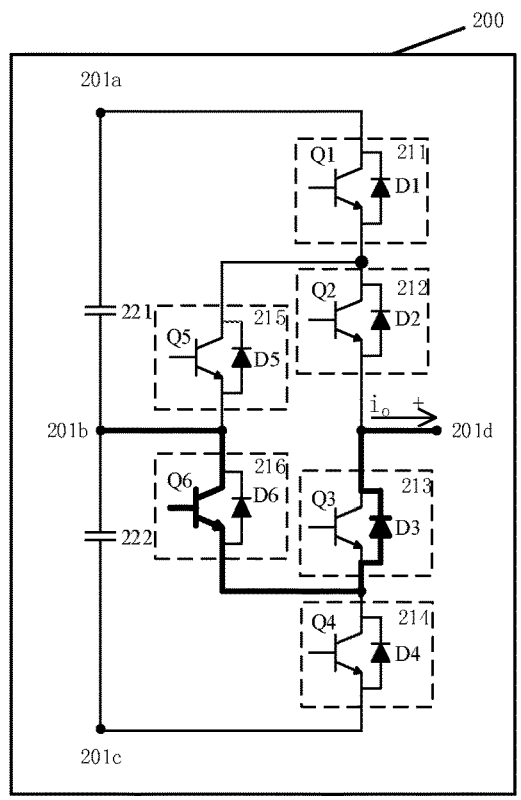
Figure 24D:
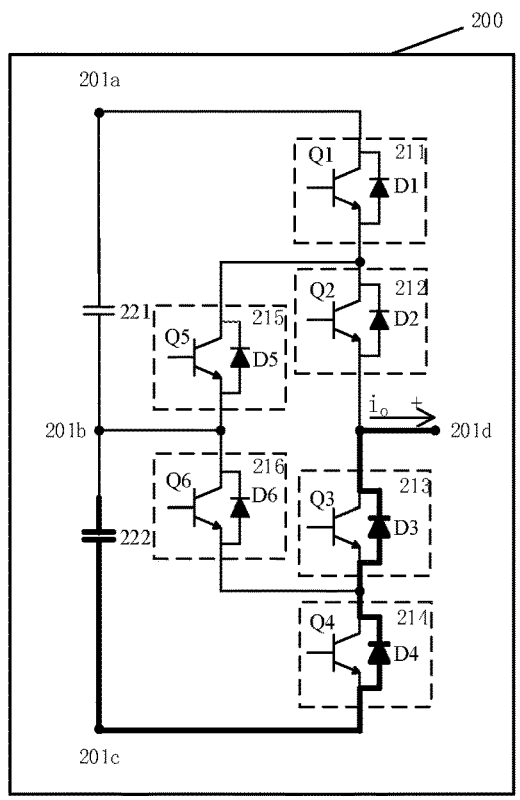
Figure 24E:
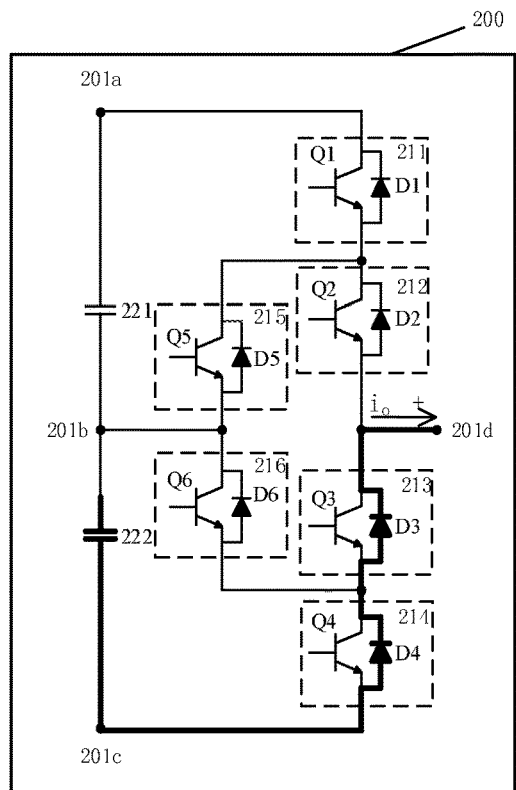
Figure 25A:
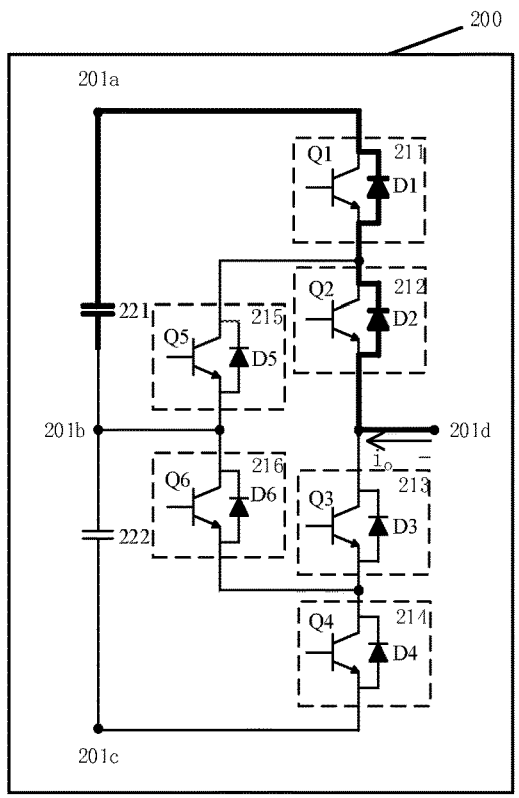
FIGS. 25a-25e are schematic diagrams illustrating a process in which a bridge leg starts to operate when the bridge leg will be in a fifth state and the output current will be a negative current in the normal working state according to some exemplary embodiments of the present disclosure.
Figure 25B:
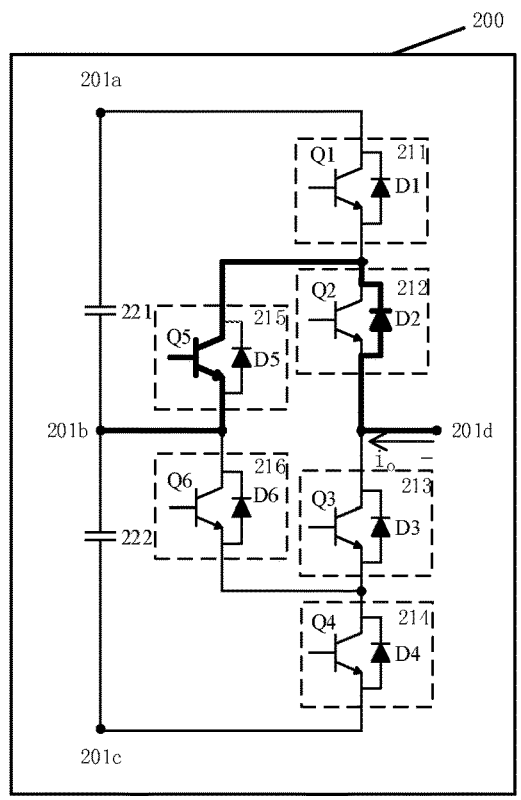
Figure 25C:
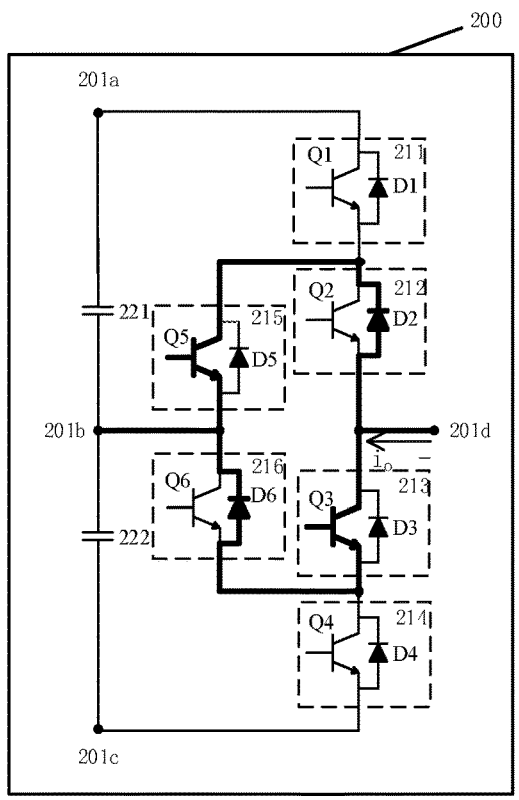
Figure 25D:
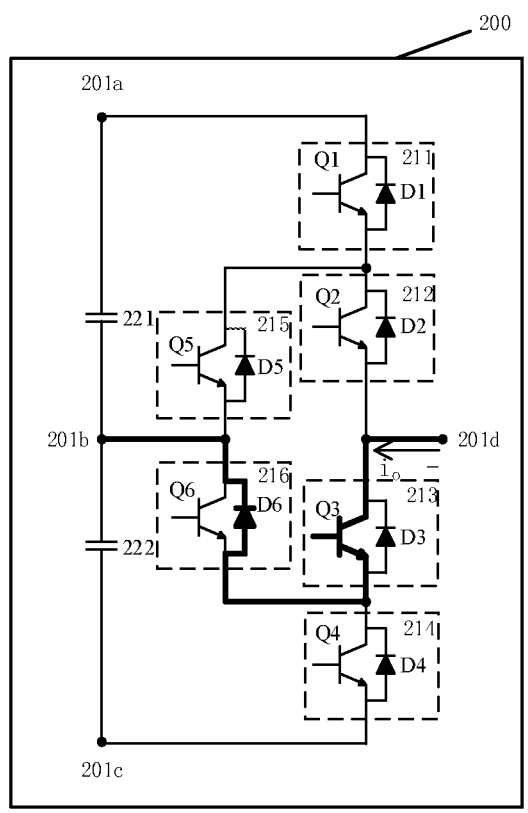
Figure 25E:
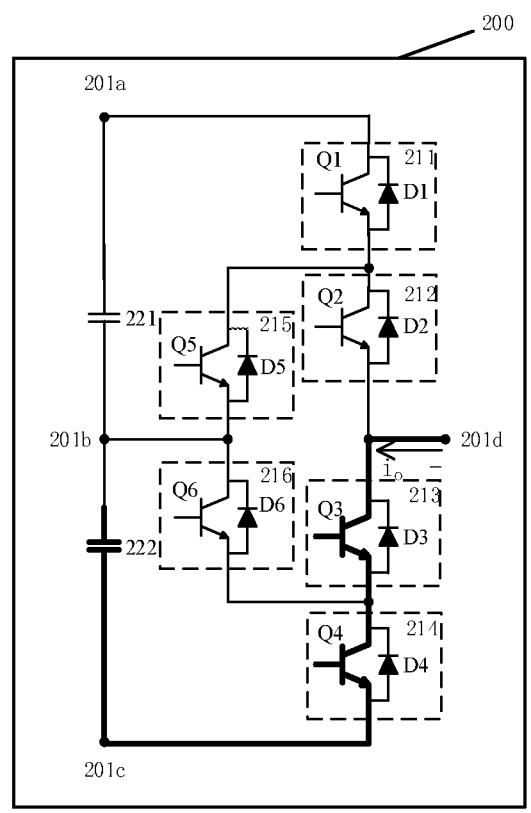

After the bridge leg 200 receives the control signal for controlling the first external switch 211 and the second external switch 214 to turn off, the state of the bridge leg 200 is shown in FIG. 23e. In response to receiving the signal of turning on, the first external switch 211 and the second external switch 214 remain off. In this case, the state of the bridge leg 200 is the same as described with reference to FIG. 23c.

FIGS. 24a-24e are schematic diagrams illustrating a process in which a bridge leg starts to operate when the bridge leg will be in a fifth state and the output current will be a positive current in the normal working state according to some exemplary embodiments of the present disclosure. The process in which the bridge leg 200 starts to operate is similar to the process in which the bridge leg starts to operate when the bridge leg will be in the first state and the output current will be the negative current in the normal working state as described with reference to FIGS. 17a-17e.

FIGS. 25a-25e are schematic diagrams illustrating a process in which a bridge leg starts to operate when the bridge leg will be in a fifth state and the output current will be a negative current in the normal working state according to some exemplary embodiments of the present disclosure. The process in which the bridge leg 200 starts to operate is similar to the process in which the bridge leg starts to operate when the bridge leg will be in the first state and the output current will be the positive current in the normal working state as described with reference to FIGS. 16a-16e.

As described above with reference to FIGS. 16a-25e, when the converter starts to operating, the current switching in the bridge leg is one of the following three cases.

(1) The current in the bridge leg is switched between the external switch and the clamp switch on the same side (for example, between the first external switch 211 and the first clamp switch 215), in this case, the voltage stress experienced by the switch $U_{dc}+U_{para}$, wherein $U_{para}$ is the voltage on the parasitic inductance of the commutation loop.

(2) The current in the bridge leg is switched from the external switch and the internal switch to two sets of internal switches and clamp switches connected in parallel (for example, switching from the first external switch 211 and the first internal switch 212 to the first internal switch 212, the first clamp switch 215, the second internal switch 213, and the second clamp switch 216 connected in parallel), as described above with reference to FIGS. 16a and 16c and FIGS. 23a and 23c, the voltage stress experienced by the switch is less than the voltage stress experienced by the switch in case (1).

(3) The current in the bridge leg is switched from the internal switch and clamp switch on the same side to the internal switch and clamp switch on the other side (for example, from the first internal switch 212 and the first clamp switch 215 to the second internal switch 213 and second clamp switch 216), in this case, the voltage stress experienced by is merely the voltage on the parasitic inductance of the commutation loop.

When the current in the bridge leg is switched between the external switch and clamp switch on the same side, or from the internal switch and clamp switch on the same side to the internal switch and clamp switch on the other side, the commutation loop of the current in the bridge leg is short, thus the parasitic inductance value in the commutation loop is low, the voltage stress experienced by the switch is small, and the switches can be protected from the damage caused by excessive voltage stress. When the current in the bridge leg is switched from the external switch and the internal switch to the two sets of internal switches and clamp switches connected in parallel, the voltage stress experienced by the switch is smaller than that of the switch when the current in the bridge leg is switched between the external switch and the clamp switch on the same side. Therefore, in the method for controlling the ANPC three-level converter to start to operate as described in the present disclosure, no matter which state the bridge leg is in after normal operation, the voltage stress experienced by the switch is small during the switching process of the switch, and the switches can be protected from the damage caused by excessive voltage stress.

Some exemplary embodiments of the present disclosure are described below.

Aspect 1. A method for controlling an active neutral-point clamped (ANPC) three-level converter, wherein the ANPC three-level converter comprises at least one bridge leg, each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch, wherein the method comprises:

in response to an instruction of stopping operation, controlling the first external switch and the second external switch in each bridge leg to turn off;

after a first delay time, controlling the first clamp switch and the second clamp switch in each bridge leg to turn on, and simultaneously or after a second delay time, controlling the first internal switch and the second internal switch in each bridge leg to turn off; and after a third delay time, controlling the first clamp switch and the second clamp switch in each bridge leg to turn off.

Aspect 2. The method of Aspect 1, wherein the instruction of stopping operation comprises a turn-off instruction or a fault shutdown instruction.

Aspect 3. The method of Aspect 2, wherein a fault corresponding to the fault shutdown instruction is an output current overcurrent fault.

Aspect 4. The method of Aspect 2, wherein a fault corresponding to the fault shutdown instruction comprises at least one of:

an output voltage overvoltage fault, an over-temperature fault, a bus voltage bias fault, a bus voltage overvoltage fault, and a leakage current failure.

Aspect 5. A method for controlling an active neutral-point clamped (ANPC) three-level converter, wherein the ANPC three-level converter comprises at least one bridge leg, each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch, wherein the method comprises:

in response to an instruction of starting operation, controlling the first clamp switch and the second clamp switch in each bridge leg to turn on, and simultaneously or after a first delay time, recovering normal control signals of the first internal switch and the second internal switch in each bridge leg;

after a second delay time, recovering normal control signals of the first clamp switch and the second clamp switch in each bridge leg; and after a third delay time, recovering the normal control signals of the first external switch and the second external switch in each bridge leg.

Aspect 6. The method of Aspect 5, wherein the instruction of starting operation comprises a startup instruction or a fault elimination instruction.

Aspect 7. The method of Aspect 6, wherein a fault corresponding to the fault elimination instruction is an output current overcurrent fault.

Aspect 8. The method of Aspect 6, wherein a fault corresponding to the fault elimination instruction comprises at least one of:

an output voltage overvoltage fault, an over-temperature fault, a bus voltage bias fault, a bus voltage overvoltage fault, and a leakage current failure.

Aspect 9. A controller for controlling an active neutral-point clamped (ANPC) three-level converter, wherein the ANPC three-level converter comprises at least one bridge leg, each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch, wherein the controller is configured to:

in response to an instruction of stopping operation, control the first external switch and the second external switch in each bridge leg to turn off;

after a first delay time, control the first clamp switch and the second clamp switch in each bridge leg to turn on, and simultaneously or after a second delay time, control the first internal switch and the second internal switch in each bridge leg to turn off; and after a third delay time, control the first clamp switch and the second clamp switch in each bridge leg to turn off.

Aspect 10. The controller of Aspect 9, wherein the instruction of stopping operation comprises a turn-off instruction or a fault shutdown instruction.

Aspect 11. The controller of Aspect 10, wherein a fault corresponding to the fault shutdown instruction is an output current overcurrent fault.

Aspect 12. The controller of Aspect 10, wherein a fault corresponding to the fault shutdown instruction comprises at least one of:

an output voltage overvoltage fault, an over-temperature fault, a bus voltage bias fault, a bus voltage overvoltage fault, and a leakage current failure.

Aspect 13. A controller for controlling an active neutral-point clamped (ANPC) three-level converter, wherein the ANPC three-level converter comprises at least one bridge leg, each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch, wherein the controller is configured to:

in response to an instruction of starting operation, control the first clamp switch and the second clamp switch in each bridge leg to turn on, and simultaneously or after a first delay time, recover normal control signals of the first internal switch and the second internal switch in each bridge leg;

after a second delay time, recover normal control signals of the first clamp switch and the second clamp switch in each bridge leg; and after a third delay time, recover the normal control signals of the first external switch and the second external switch in each bridge leg.

Aspect 14. The controller of Aspect 13, wherein the instruction of starting operation comprises a startup instruction or a fault elimination instruction.

Aspect 15. The controller of Aspect 14, wherein a fault corresponding to the fault elimination instruction is an output current overcurrent fault.

Aspect 16. The controller of Aspect 14, wherein a fault corresponding to the fault elimination instruction comprises at least one of:

an output voltage overvoltage fault, an over-temperature fault, a bus voltage bias fault, a bus voltage overvoltage fault, and a leakage current failure.

Aspect 17. An active neutral-point clamped (ANPC) three-level converter, comprising:

at least one bridge leg, wherein each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch; and a controller, configured to:

in response to an instruction of stopping operation, control the first external switch and the second external switch in each bridge leg to turn off;

after a first delay time, control the first clamp switch and the second clamp switch in each bridge leg to turn on, and simultaneously or after a second delay time, control the first internal switch and the second internal switch in each bridge leg to turn off; and after a third delay time, control the first clamp switch and the second clamp switch in each bridge leg to turn off.

Aspect 18. The ANPC three-level converter of Aspect 17, wherein the instruction of stopping operation comprises a turn-off instruction or a fault shutdown instruction.

Aspect 19. The ANPC three-level converter of Aspect 18, wherein a fault corresponding to the fault shutdown instruction is an output current overcurrent fault.

Aspect 20. The ANPC three-level converter of Aspect 18, wherein a fault corresponding to the fault shutdown instruction comprises at least one of:

an output voltage overvoltage fault, an over-temperature fault, a bus voltage bias fault, a bus voltage overvoltage fault, and a leakage current failure.

Aspect 21. The ANPC three-level converter of Aspect 17, wherein the controller is further configured to:

in response to an instruction of starting operation, control the first clamp switch and the second clamp switch in each bridge leg to turn on, and simultaneously or after a first delay time, recover normal control signals of the first internal switch and the second internal switch in each bridge leg;

after a second delay time, recover normal control signals of the first clamp switch and the second clamp switch in each bridge leg; and after a third delay time, recover the normal control signals of the first external switch and the second external switch in each bridge leg.

Aspect 22. The ANPC three-level converter of Aspect 21, wherein the instruction of starting operation comprises a startup instruction or a fault elimination instruction.

Aspect 23. The ANPC three-level converter of Aspect 22, wherein a fault corresponding to the fault elimination instruction is an output current overcurrent fault.

Aspect 24. The ANPC three-level converter of Aspect 22, wherein a fault corresponding to the fault elimination instruction comprises at least one of:

an output voltage overvoltage fault, an over-temperature fault, a bus voltage bias fault, a bus voltage overvoltage fault, and a leakage current failure.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

The invention claimed is:

1. A controller for controlling an active neutral-point clamped (ANPC) three-level converter, wherein the ANPC three-level converter comprises at least one bridge leg, each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internalswitch wherein the controller is configured to:
in response to an instruction of stopping operation, control the first external switch and the second external switch in each bridge leg to turn off;
after a first delay time, control the first clamp switch and the second clamp switch in each bridge leg to turn on, and simultaneously or after a second delay time, control the first internal switch and the second internal switch in each bridge lea to turn off; and
after a third delay time, control the first clamp switch and the second clamp switch in each bridge leg to turn off.

2. The controller of claim 1, wherein the instruction of stopping operation comprises a turn-off instruction or a fault shutdown instruction.

3. The controller of claim 2, wherein a fault corresponding to the faultshutdown instruction is an output current overcurrent fault.

4. The controller of claim 2, wherein a fault corresponding to the fault shutdown instruction comprises at least one of: an output voltage overvoltage fault, an over-temperature fault, a bus voltage bias fault, a bus voltage overvoltage fault, and a leakage current failure.

5. A controller for controlling an active neutral-point clamped (ANPC) three-level converter, wherein the ANPC three-level converter comprises at least one bridge leg, each of the at least one bridge leg comprises a plurality of input terminals, an output terminal, and a plurality of switches connected between the plurality of input terminals and the output terminal, the plural of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch, wherein the controller is configured to:
in response to an instruction of starting operation, control the first clamp switch and the second clamp switch in each bridge leg to turn on, and simultaneously or after a first delay time, recover normal control signals of the first internal switch and the second internal switch in each bridge leg; after a second delay time, recover normal control signals of the first clamp switch and the second clamp switch in each bridge leg; and
after a third delay time, recover the normal control signals of the first external switch second external switch in each bridge leg.

6. The controller of claim 5, wherein the inst operation comprises a startup instruction or a fault elimination instruction.

7. The controller of claim 6, wherein a fault corresponding to the fault elimination instruction is an output current overcurrent fault.

8. The controller of claim 6, wherein a fault corresponding to the fault elimination instruction comprises at least one of: an output voltage overvoltage fault, an over-temperature fault, a bus voltage bias fault, a bus voltage overvoltage fault, and a leakage current failure.

9. An active neutral-point clamped (ANPC) three-level converter, comprising:
at least one bridge leg, wherein each of the at least one bridge leg comprises a plurality of input terminals, an output terminal, and a plurality of switches connected between the plurality of input terminals and the output terminal, the plurality of input terminals comprise a first input terminal, a second input terminal, and a third input terminal, the plurality of switches comprise a first external switch, a first internal switch, a second internal switch, a second external switch, a first clamp switch, and a second clamp switch, where the first external switch, the first internal switch, the second internal switch, and the second external switch are sequentially connected in series, an end of the first external switch is connected to the first input terminal, and another end of the first external switch is connected to the first internal switch, an end of the first clamp switch is connected to the second input terminal, and another end of the first clamp switch is connected to a connection point of the first external switch and the first internal switch, an end of the second external switch is connected to the third input terminal, and another end of the second external switch is connected to the second internal switch, an end of the second clamp switch is connected to the second input terminal, and another end of the second clamp switch is connected to a connection point of the second external switch and the second internal switch, the output terminal is connected to a connection point of the first internal switch and the second internal switch; and a controller, configured to:
in response to an instruction of stopping operation, control the first external switch and the second external switch in each bridge leg to turn off;
after a first delay time, control the first clamp switch and the second clamp switch in each bridge leg to turn on, and simultaneously or after a second delay time, control the first internal switch and the second internal switch in each bridge leg to turn off; and
after a third delay time, control the first clamp switch and the second clamp switch in each bridge leg to turn off.

10. The ANPC three-level converter of claim 9, wherein the instruction of stopping operation comprises a turn-off instruction or a fault shutdown instruction.

11. The ANPC three-level converter of claim 10, wherein a fault corresponding to the fault shutdown instruction is an output current overcurrent fault.

12. The ANPC three-level converter of claim 10, wherein a fault corresponding to the fault shutdown instruction comprises at least one of:
an output voltage overvoltage fault, an over-temperature fault, a bus voltage bias fault, a bus voltage overvoltage fault, and a leakage current failure.

13. The ANPC three-level converter of claim 9, wherein the controller is further configured to:
in response to an instruction of starting operation, control the first clamp switch and the second clamp switch in each bridge leg to turn on, and simultaneously or after a first delay time, recover normal control signals of the first internal switch and the second internal switch in each bridge leg;
after a second delay time, recover normal control signals of the first clamp switch and the second clamp switch in each bridge leg; and
after a third delay time, recover the normal control signals of the first external switch and the second external switch in each bridge leg.

14. The ANPC three-level converter of claim 13, wherein the instruction of starting operation comprises a startup instruction or a fault elimination instruction.

15. The ANPC three-level converter of claim 14, wherein a fault corresponding to the fault elimination instruction is an output current overcurrent fault.

16. The ANPC three-level converter of claim 14, wherein a fault corresponding to the fault elimination instruction comprises at least one of:
an output voltage overvoltage fault, an over-temperature fault, a bus voltage bias fault, a bus voltage overvoltage fault, and a leakage current failure.

* * * * *